US010511012B2

(12) United States Patent
Fasching et al.

(10) Patent No.: US 10,511,012 B2
(45) Date of Patent: *Dec. 17, 2019

(54) PROTECTIVE COATINGS FOR CONVERSION MATERIAL CATHODES

(71) Applicant: QuantumScape Corporation, San Jose, CA (US)

(72) Inventors: Rainer Fasching, San Jose, CA (US); Joseph Han, San Jose, CA (US); Jon Shan, San Jose, CA (US); Ghyrn E. Loveness, San Jose, CA (US); Eric Tulsky, San Jose, CA (US); Timothy Holme, San Jose, CA (US)

(73) Assignee: QuantumScape Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/337,566

(22) Filed: Oct. 28, 2016

(65) Prior Publication Data

US 2017/0098824 A1    Apr. 6, 2017

Related U.S. Application Data

(63) Continuation of application No. 14/272,518, filed on May 8, 2014, now Pat. No. 9,543,564, which is a (Continued)

(51) Int. Cl.
*H01M 4/04*    (2006.01)
*H01M 4/36*    (2006.01)
(Continued)

(52) U.S. Cl.
CPC ........... *H01M 4/04* (2013.01); *H01M 4/0402* (2013.01); *H01M 4/0423* (2013.01);
(Continued)

(58) Field of Classification Search
None
See application file for complete search history.

(56) References Cited

U.S. PATENT DOCUMENTS 2,722,490 A    11/1955    Haynes et al.
2,722,559 A    11/1955    Farlow et al.
(Continued)

FOREIGN PATENT DOCUMENTS

CN    1547277 A    11/2004
CN    101443932    5/2009
(Continued)

OTHER PUBLICATIONS

Definition of coextensive (www.dictionary.com) (Feb. 20, 2017).*
(Continued)

*Primary Examiner* — Carmen V Lyles-Irving
(74) *Attorney, Agent, or Firm* — Squire Patton Boggs (US) LLP

(57) ABSTRACT

Battery systems using coated conversion materials as the active material in battery cathodes are provided herein. Protective coatings may be an oxide, phosphate, or fluoride, and may be lithiated. The coating may selectively isolate the conversion material from the electrolyte. Methods for fabricating batteries and battery systems with coated conversion material are also provided herein.

10 Claims, 6 Drawing Sheets

Related U.S. Application Data continuation-in-part of application No. 13/922,214, filed on Jun. 19, 2013, now Pat. No. 9,692,039.

(60) Provisional application No. 61/814,821, filed on Apr. 23, 2013, provisional application No. 61/674,961, filed on Jul. 24, 2012.

(51) Int. Cl.

| | | |
|---|---|---|
| *H01M 4/1395* | (2010.01) | |
| *H01M 4/1397* | (2010.01) | |
| *H01M 4/58* | (2010.01) | |
| *H01M 4/62* | (2006.01) | |
| *H01M 10/0585* | (2010.01) | |
| *H01M 6/40* | (2006.01) | |
| *H01M 4/139* | (2010.01) | |
| *B82Y 30/00* | (2011.01) | |
| *H01M 4/70* | (2006.01) | |
| *H01M 10/04* | (2006.01) | |
| *H01M 10/052* | (2010.01) | |
| *H01M 10/0562* | (2010.01) | |
| *H01M 4/02* | (2006.01) | |

(52) U.S. Cl.
CPC ....... *H01M 4/0426* (2013.01); *H01M 4/0428* (2013.01); *H01M 4/139* (2013.01); *H01M 4/1395* (2013.01); *H01M 4/1397* (2013.01); *H01M 4/364* (2013.01); *H01M 4/366* (2013.01); *H01M 4/58* (2013.01); *H01M 4/582* (2013.01); *H01M 4/62* (2013.01); *H01M 4/624* (2013.01); *H01M 6/40* (2013.01); *H01M 10/0585* (2013.01); *B82Y 30/00* (2013.01); *H01M 4/0419* (2013.01); *H01M 4/70* (2013.01); *H01M 10/0436* (2013.01); *H01M 10/052* (2013.01); *H01M 10/0562* (2013.01); *H01M 2004/021* (2013.01); *H01M 2004/028* (2013.01); *H01M 2010/0495* (2013.01); *H01M 2220/30* (2013.01); *Y02E 60/122* (2013.01); *Y02P 70/54* (2015.11); *Y10T 29/49108* (2015.01)

(56) References Cited

U.S. PATENT DOCUMENTS

| | | | |
|---|---|---|---|
| 3,764,380 A | | 10/1973 | Grossman |
| 3,918,988 A | | 11/1975 | Abens |
| 3,972,729 A | * | 8/1976 | Mosetti ............... H01M 4/04 252/182.1 |
| 4,007,122 A | | 2/1977 | Owens et al. |
| 4,127,708 A | | 11/1978 | Liang et al. |
| 4,312,718 A | | 1/1982 | Watanabe et al. |
| 4,367,267 A | | 1/1983 | Oi |
| 4,463,212 A | | 7/1984 | Imai |
| 4,476,204 A | | 10/1984 | Auborn |
| 4,544,615 A | | 10/1985 | Shishikura et al. |
| 4,560,633 A | | 12/1985 | Kobayashi et al. |
| 4,589,197 A | | 5/1986 | North |
| 4,840,859 A | | 6/1989 | Williams et al. |
| 4,845,015 A | | 7/1989 | Kurematsu et al. |
| 5,069,764 A | | 12/1991 | Watanabe et al. |
| 5,296,318 A | | 3/1994 | Gozdz et al. |
| 5,360,686 A | | 11/1994 | Peled et al. |
| 5,522,955 A | | 6/1996 | Brodd |
| 5,670,277 A | | 9/1997 | Barker et al. |
| 5,738,957 A | | 4/1998 | Amine et al. |
| 5,744,258 A | | 4/1998 | Bai et al. |
| 5,759,720 A | | 6/1998 | Amatucci |
| 5,783,332 A | | 7/1998 | Amine et al. |
| 5,788,738 A | | 8/1998 | Pizada et al. |
| 5,792,574 A | | 8/1998 | Mitate et al. |
| 5,824,434 A | | 10/1998 | Kawakami et al. |
| 5,945,163 A | | 8/1999 | Powel et al. |
| 5,965,293 A | | 10/1999 | Idota et al. |
| 6,037,095 A | | 3/2000 | Miyasaka |
| 6,037,241 A | | 3/2000 | Powell et al. |
| 6,087,042 A | | 7/2000 | Sugiyama et al. |
| 6,168,884 B1 | | 1/2001 | Neudecker et al. |
| 6,204,219 B1 | | 3/2001 | Brezny et al. |
| 6,333,128 B1 | | 12/2001 | Sunagawa et al. |
| 6,379,841 B1 | | 4/2002 | Potanin et al. |
| 6,413,673 B1 | | 7/2002 | Kasai et al. |
| 6,420,069 B2 | | 7/2002 | Amine et al. |
| 6,423,131 B1 | | 7/2002 | Seeger et al. |
| 6,432,581 B1 | | 8/2002 | Amatucci et al. |
| 6,495,481 B1 | | 12/2002 | Margaryan |
| 6,517,974 B1 | | 2/2003 | Kobayashi et al. |
| 6,635,114 B2 | | 10/2003 | Zhao et al. |
| 6,645,452 B1 | | 11/2003 | Barker et al. |
| 6,677,082 B2 | | 1/2004 | Thackeray et al. |
| 6,680,143 B2 | | 1/2004 | Thackeray et al. |
| 6,680,145 B2 | | 1/2004 | Obrovac et al. |
| 6,686,090 B2 | | 2/2004 | Inagaki et al. |
| 6,689,192 B1 | | 2/2004 | Phillips et al. |
| 6,719,848 B2 | | 4/2004 | Faykosh et al. |
| 6,753,112 B2 | | 6/2004 | Ooya et al. |
| 6,756,155 B1 | | 6/2004 | Kweon et al. |
| 6,835,499 B2 | | 12/2004 | Philips |
| 6,890,686 B1 | | 5/2005 | Barker |
| 6,964,828 B2 | | 11/2005 | Lu et al. |
| 6,974,486 B1 | | 12/2005 | Kweon et al. |
| 6,982,132 B1 | | 1/2006 | Goldner et al. |
| 7,078,128 B2 | | 7/2006 | Lu et al. |
| 7,135,252 B2 | | 11/2006 | Thackeray et al. |
| 7,169,471 B1 | | 1/2007 | Dreher et al. |
| 7,205,073 B2 | | 4/2007 | Kim et al. |
| 7,314,684 B2 | | 1/2008 | Kang et al. |
| 7,371,338 B2 | | 5/2008 | Amatucci |
| 7,468,223 B2 | | 12/2008 | Thackeray et al. |
| 7,517,613 B2 | | 4/2009 | Yuasa et al. |
| 7,625,671 B2 | | 12/2009 | Amatucci |
| 7,709,149 B2 | | 5/2010 | Paulsen et al. |
| 7,780,787 B2 | | 8/2010 | Nolan |
| 7,793,611 B2 | | 9/2010 | Oladeji |
| 7,910,166 B2 | | 3/2011 | Powell et al. |
| 7,927,659 B2 | | 4/2011 | Powell et al. |
| 7,931,937 B2 | | 4/2011 | Powell et al. |
| 7,947,392 B2 | | 5/2011 | Amatucci et al. |
| 7,968,145 B2 | | 6/2011 | Powell et al. |
| 7,968,235 B2 | | 6/2011 | Amine et al. |
| 8,039,149 B2 | | 10/2011 | Amatucci et al. |
| 8,225,744 B2 | | 7/2012 | Oladeji |
| 8,241,791 B2 | | 8/2012 | Lu et al. |
| 8,268,198 B2 | | 9/2012 | Shin et al. |
| 8,277,683 B2 | | 10/2012 | Deng et al. |
| 8,388,754 B2 | | 3/2013 | Powell et al. |
| 8,389,160 B2 | | 3/2013 | Venkatachalam et al. |
| 8,449,950 B2 | | 5/2013 | Shang et al. |
| 8,465,602 B2 | | 6/2013 | Shmyreva et al. |
| 8,492,030 B2 | | 7/2013 | Park et al. |
| 8,518,604 B2 | | 8/2013 | Amatucci et al. |
| 8,591,774 B2 | | 11/2013 | Koenig et al. |
| 8,623,549 B2 | | 1/2014 | Pereira et al. |
| 8,685,565 B2 | | 4/2014 | Lu et al. |
| 8,865,348 B2 | | 10/2014 | Sun et al. |
| 8,951,668 B2 | | 2/2015 | Pereira et al. |
| 9,048,497 B2 | | 6/2015 | Amatucci et al. |
| 9,065,137 B2 | | 6/2015 | Amatucci et al. |
| 9,070,945 B2 | | 6/2015 | Amatucci et al. |
| 9,203,082 B2 | | 12/2015 | Pereira et al. |
| 9,543,564 B2 | * | 1/2017 | Fasching ............... H01M 4/04 |
| 2001/0046629 A1 | | 11/2001 | Inagaki et al. |
| 2002/0086208 A1 | | 7/2002 | Hayashi et al. |
| 2002/0098411 A1 | | 7/2002 | Gan et al. |
| 2002/0136954 A1 | | 9/2002 | Thackeray et al. |
| 2002/0168573 A1 | | 11/2002 | Baker et al. |
| 2003/0013019 A1 | | 1/2003 | Barker et al. |
| 2003/0148188 A1 | | 8/2003 | Umemoto |
| 2003/0170550 A1 | | 9/2003 | Ugawa et al. |
| 2004/0062994 A1 | | 4/2004 | Amatucci et al. |

(56) References Cited

U.S. PATENT DOCUMENTS

| | | |
|---|---|---|
| 2004/0121235 A1 | 6/2004 | Amatucci |
| 2004/0126300 A1 | 7/2004 | Barker et al. |
| 2004/0126659 A1 | 7/2004 | Graetz et al. |
| 2004/0185346 A1 | 9/2004 | Takeuchi |
| 2004/0191633 A1 | 9/2004 | Johnson et al. |
| 2005/0003270 A1 | 1/2005 | Phillips |
| 2005/0136328 A1 | 6/2005 | Eylem et al. |
| 2005/0164084 A1 | 7/2005 | Adamson et al. |
| 2006/0014078 A1 | 1/2006 | Swoyer et al. |
| 2006/0019163 A1 | 1/2006 | Amatucci et al. |
| 2006/0035147 A1 | 2/2006 | Lam et al. |
| 2006/0036474 A9 | 2/2006 | Brugger et al. |
| 2006/0199886 A1 | 9/2006 | Ryang |
| 2007/0007109 A1 | 1/2007 | Powell et al. |
| 2007/0009800 A1 | 1/2007 | Barker et al. |
| 2007/0042264 A1 | 2/2007 | Desilvestro et al. |
| 2007/0134427 A1 | 6/2007 | Kalynushkin et al. |
| 2007/0188979 A1 | 8/2007 | Takeda et al. |
| 2007/0190414 A1 | 8/2007 | Amatucci et al. |
| 2007/0221635 A1 | 9/2007 | Boulos et al. |
| 2007/0237894 A1 | 10/2007 | Powell |
| 2007/0243466 A1 | 10/2007 | Amatucci et al. |
| 2008/0003496 A1 | 1/2008 | Neudecker et al. |
| 2008/0034579 A1 | 2/2008 | Potanin |
| 2008/0044571 A1 | 2/2008 | Maltby |
| 2008/0081259 A1 | 4/2008 | Freitag et al. |
| 2008/0102373 A1 | 5/2008 | Potanin |
| 2008/0153002 A1 | 6/2008 | Nazar et al. |
| 2008/0199772 A1 | 8/2008 | Amatucci et al. |
| 2008/0238294 A1 | 10/2008 | Xu et al. |
| 2008/0283048 A1 | 11/2008 | Petersen |
| 2008/0299703 A1 | 12/2008 | Oladeji |
| 2008/0314482 A1 | 12/2008 | Suzuki et al. |
| 2009/0004560 A1 | 1/2009 | Amatucci et al. |
| 2009/0029237 A1 | 1/2009 | Yazami |
| 2009/0087362 A1 | 4/2009 | Sun et al. |
| 2009/0246940 A1 | 10/2009 | Powell |
| 2010/0068376 A1 | 3/2010 | Chen et al. |
| 2010/0151332 A1 | 6/2010 | Lopez et al. |
| 2010/0159324 A1 | 6/2010 | Irvin et al. |
| 2010/0210059 A1 | 8/2010 | Milshtein |
| 2010/0210453 A1 | 8/2010 | Hu et al. |
| 2010/0297502 A1* | 11/2010 | Zhu ............... H01M 4/134 429/231.8 |
| 2010/0323098 A1 | 12/2010 | Kosuzu et al. |
| 2011/0006254 A1 | 1/2011 | Richard et al. |
| 2011/0027940 A1 | 2/2011 | Oladeji |
| 2011/0039401 A1 | 2/2011 | Nolan |
| 2011/0045206 A1 | 2/2011 | Shang etal. |
| 2011/0065001 A1 | 3/2011 | Pereira et al. |
| 2011/0076556 A1* | 3/2011 | Karthikeyan ......... H01M 4/366 429/188 |
| 2011/0132261 A1 | 6/2011 | Powell et al. |
| 2011/0132262 A1 | 6/2011 | Powell et al. |
| 2011/0132263 A1 | 6/2011 | Powell et al. |
| 2011/0171398 A1 | 7/2011 | Oladeji |
| 2011/0171528 A1 | 7/2011 | Oladeji |
| 2011/0200883 A1 | 8/2011 | Cui et al. |
| 2011/0260099 A1 | 10/2011 | Paulsen et al. |
| 2012/0009469 A1 | 1/2012 | Visco et al. |
| 2012/0032118 A1 | 2/2012 | Fichtner et al. |
| 2012/0056470 A1 | 3/2012 | Kim |
| 2012/0064395 A1 | 3/2012 | Chang et al. |
| 2012/0077082 A1* | 3/2012 | Se-Hee ............. H01M 4/485 429/209 |
| 2012/0100431 A1* | 4/2012 | Yao ............... H01M 4/131 429/231.1 |
| 2012/0171469 A1 | 7/2012 | Shmyreva |
| 2012/0225356 A1 | 9/2012 | Wietelmann |
| 2012/0244429 A1 | 9/2012 | Lam et al. |
| 2012/0263998 A1 | 10/2012 | Thackeray et al. |
| 2013/0048924 A1 | 2/2013 | Amatucci et al. |
| 2013/0177821 A1 | 7/2013 | Tsuchida et al. |
| 2013/0202502 A1 | 8/2013 | Schulz-Dobrick et al. |
| 2013/0224594 A1 | 8/2013 | Yushin |
| 2013/0236764 A1 | 9/2013 | Hu |
| 2013/0252064 A1 | 9/2013 | Kuriki et al. |
| 2013/0302682 A1 | 11/2013 | Amatucci et al. |
| 2013/0335030 A1 | 12/2013 | Joe |
| 2013/0344391 A1 | 12/2013 | Yushin et al. |
| 2014/0050656 A1 | 2/2014 | Kang et al. |
| 2014/0087092 A1 | 3/2014 | Nieh et al. |
| 2014/0117291 A1 | 5/2014 | Amatucci et al. |
| 2014/0170493 A1 | 6/2014 | Holme et al. |
| 2014/0193714 A1 | 7/2014 | Kim et al. |
| 2014/0234715 A1 | 8/2014 | Fasching et al. |
| 2014/0264190 A1 | 9/2014 | Tong |
| 2014/0272564 A1 | 9/2014 | Holme et al. |
| 2014/0272568 A1 | 9/2014 | Frianeza-Kullberg |
| 2014/0284526 A1 | 9/2014 | Shan |
| 2014/0317912 A1 | 10/2014 | Holme et al. |
| 2014/0322603 A1 | 10/2014 | Holme et al. |
| 2015/0050522 A1 | 2/2015 | Manthiram et al. |
| 2015/0099169 A1 | 4/2015 | Dudney et al. |
| 2015/0207140 A1 | 7/2015 | Amatucci et al. |
| 2015/0236341 A1 | 8/2015 | Amatucci et al. |
| 2016/0049655 A1 | 2/2016 | Fasching et al. |
| 2016/0093874 A1 | 3/2016 | Stimson et al. |
| 2016/0164135 A1 | 6/2016 | Fasching et al. |

FOREIGN PATENT DOCUMENTS

| | | |
|---|---|---|
| CN | 101901936 | 12/2010 |
| CN | 102388487 A | 3/2012 |
| DE | 39 30 804 | 3/1991 |
| EP | 0 149 421 | 7/1985 |
| EP | 0 651 450 | 5/1995 |
| EP | 0 938 147 | 8/1999 |
| EP | 1 049 182 | 11/2000 |
| EP | 1 914 823 | 2/2010 |
| EP | 1540752 | 3/2010 |
| EP | 2 816 639 A2 | 12/2014 |
| JP | H08138635 | 5/1996 |
| JP | 2008-527652 | 7/2008 |
| JP | 2009-016234 | 1/2009 |
| JP | 2009-529222 | 8/2009 |
| JP | 2013-073792 A | 4/2013 |
| KR | 2001063879 | 7/2001 |
| WO | WO 2001/063879 A1 | 8/2001 |
| WO | WO 2002/097907 A2 | 12/2002 |
| WO | WO 2004/034489 A2 | 4/2004 |
| WO | WO 2006/026773 A2 | 3/2006 |
| WO | WO 2006/078472 A3 | 7/2006 |
| WO | WO 2006/137903 A3 | 12/2006 |
| WO | WO 2007/146453 A2 | 12/2007 |
| WO | WO 2008/095197 | 8/2008 |
| WO | WO 2009/143324 A1 | 11/2009 |
| WO | WO 2011/057263 | 5/2011 |
| WO | WO 2012/176907 A1 | 12/2012 |
| WO | WO 2013/133906 A2 | 9/2013 |
| WO | WO 2013/192205 | 12/2013 |
| WO | WO 2014/159545 A1 | 10/2014 |
| WO | WO 2014/186634 A2 | 11/2014 |
| WO | WO 2014/197751 A1 | 12/2014 |
| WO | WO 2015/054320 A2 | 4/2015 |
| WO | WO 2015/130831 A1 | 9/2015 |

OTHER PUBLICATIONS

Definition of overlap (www.dictionary.com) (Feb. 20, 2017).*
Al-Sharab, J. F., et al. "EELS Compositional and Valence Mapping in Iron Flouride-Carbon Nanocomposites", Journal of Nanoparticle Research, 15: 1500; Mar. 2013, 12 pages.
Amatucci, G. G., et al. "Formation of Lithium Fluoride/Metal Nanocomposites for Energy Storage through Solid State Reduction of Metal Fluorides", Journal of Fluorine Chemistry, 2011, vol. 132, pp. 1086-1094.
Arai, H., "Cathode Performance and Voltage Estimation of Metal Trihalides", Journal of Power Sources, 68, 1997, p. 716-719.
Arai, H., et al. "Characterization and Cathode Performance of $Li_{1-x}Ni_{1+x}O_2$ Prepared with the Excess Lithium Method", Solid State Ionics 80, 1995, pp. 261-269.

(56) References Cited

OTHER PUBLICATIONS

Badway, F., et al. "Carbon Metal Flouride Nanocomposites: High-Capacity Reversible Metal Flouride Conversion Materials as Rechargeable Positive Electrodes for Li Batteries", Journal of the Electrochemical Society, vol. 150, Issue 10, 2003, pp. A1318-A1327.
Badway, F., et al. "Structure and Electrochemistry of Copper Fluoride Nanocomposites Utilizing Mixed Conducting Matrices", Chemistry of Materials, 2007, vol. 19 (17), pp. 4129-4141.
Behl, W. K., and Read, J. A. "A Study of Cobalt and Manganese Fluorides as Cathode Materials for Rechargeable Lithium Cells", ECS Transactions, 2012, vol. 41, Issue 41, pp. 97-106.
Bervas, M. et al., "Bismuth fluoride nanocomposites as a positive electrode material for rechargeable lithium batteries", Electrochem. Solid-State Letters, 2005, available electronically Feb. 10, 2005, vol. 8, No. 5, pp. A179-A183.
Bervas, M., et al. "Investigation of the Lithiation and Delithiation Conversion Mechanisms of Bismuth Fluoride Nanocomposites", Journal of the Electrochemical Society, 2006, vol. 153, Issue 4, pp. A799-A808.
Cabana, J., et al. "Beyond Intercalation-Based Li-Ion Batteries: The State of the Art and Challenges of Electrode Materials Reacting Through Gonversion Reactions", Advanced Materials, vol. 22, Issue 35, Sep. 15, 2010, pp. E170-E192.
Chevrier, V. L., et al. "First-Principles Study of Iron OxyFluorides and Lithiation of FeOF", Physical Review B 87, 094118, Mar. 29, 2013, 9 pages.
Cui, Y., et al. "The Investigation on Electrochemical Reaction Mechanism of CuF2 Thin Film with Lithium", Electrochimica Acta, 2011, vol. 56, pp. 2328-2335.
Ezema, F. I. and Nnabuchi, M. N. "Optical Properties of Chemical Bath Deposited Bismuth Fluoride (Bif3) Thin Films", Discovery and Innovation vol. 19 (1), 2007, pp. 33-36.
Fu, Z.W., et al. "Electrochemical Reaction of Lithium with Cobalt Fluoride Thin Film Electrode", Journal of the Electrochemical Society, 2005, vol. 152, Issue 2, pp. E50-E55.
Gmitter, A. J., et al. "Electrolyte Development for Improved Cycling Performance of Bismuth Fluoride Nanocomposite Positive Electrodes", Journal of Power Sources vol. 217, 2012, pp. 21-28.
Gmitter, A. J., et al. "Formation, Dynamics, and Implication of Solid Electrolyte Interphase in High Voltage Reversible Conversion Fluoride Nanocomposites", Journal of Materials Ghemistry, vol. 20, No. 20, May 28, 2010, p. 3997-4232.
Gocheva, I.D., et al. "Direct Synthesis of Cryolite Type $Li_3FeF_6$ and Its Characterization as Positive Electrode in Li Cell", Engineering Sciences Reports, Kyushu University, vol. 31, No. 1, pp. 7-11.
Johnson, Z., et al. "Advanced $FeF_3$ Cathode Enabled Lithium-ion Battery", SAE International Journal of Aerospace, Apr. 2009, vol. 1, No. 1, pp. 1018-1023.
Kim, S., et al. "Fabrication of $FeF_3$ Nanoflowers on CNT Branches and Their Application to High Power Lithium Rechargeable Batteries", Advanced Materials, 2010, vol. 22, pp. 5260-5264.
Larcher, D., et al. "Effect of Particle Size on Lithium Intercalation into $\alpha Fe_2O_3$", Journal of the Electrochemical Society, 2003, vol. 150 (1), pp. A133-A139.
Lee, D. H., et al. "Conversion Mechanism of Nickel Fluoride and NiO-Doped Nickel Fluoride in Li Ion Batteries", Electrochimica Acta, 2012, vol. 59, pp. 213-221.
Li, C., et al. "A Mesoporous Iron-Based Fluoride Cathode of Tunnel Structure for Rechargeable Lithium Batteries", Advanced Functional Materials, 2011, vol. 27, pp. 1391-1397.
Li, C., et al. "Carbon Nanotube Wiring of Electrodes for High-Rate Lithium Batteries Using an Imidazolium-Based Ionic Liquid Precursor as Dispersant and Binder: A Case Study on Iran Fluoride Nanoparticles", ACS Nano, 2011, vol. 5, Issue 4, pp. 2930-2938.
Li, C., et al. "Low-Temperature Ionic-Liquid-Based Synthesis of Nanostructured Iron-Based Fluoride Cathodes for Lithium Batteries", Advanced Materials, 2010, vol. 22, pp. 3650-3654.
Li, L., et al. "High-Capacity Lithium-Ion Battery Conversion Cathodes Based on Iron Fluoride Nanowires and Insights into the Conversion Mechanism", Nano Leiters, vol. 12 (11 ), pp. 6030-6037.
Li, R. F., et al. "Structural and Electronic Properties of Li-Ion Battery Cathode Material $FeF_3$", The Journal of Physical Ghemistry G, 2010, vol. 114(39), pp. 16813-16817.
Liao, P., et al. "Combinatorially Prepared $[LiF]_{1-x}Fe_x$ Nanocomposites for Positive Electrode Materials in Li-Ion Batteries", Chemistry of Materials, 2008, vol. 20 (2), pp. 454-461.
Liu, L., et al. "Excellent Cycle Performance of Co-doped $FeF_3$/C Nanocomposite Cathode Material for Lithium-Ion Batteries", Journal of Materials Chemistry, 2012, Issue 22, pp. 17539-17550.
Liu, P., et al. "Thermodynamics and Kinetics of the $Li/FeF_3$ Reaction by Electrochemical Analysis", The Journal of Physical Chemistry C, 2012, vol. 116(10), pp. 6467-6473.
Ma, D., et al. "Three-Dimensionally Ordered Macroporous $FeF_3$ and its in situ Homogenaus Polymerization Coating for High Energy and Power Density Lithium Ion Batteries", Energy & Environmental Science, 2012, 5, pp. 8538-8542.
Ma, Y. et al. "Atomistic Insights into the Gonversion Reaction in Iron Fluoride: A Dynamically Adaptive Force Field Approach", Journal of the Amerian Chemical Society, 2012, vol. 132, pp. 8205-8211.
Makimura, Y, et al. "Pulsed Laser Deposited Iron Fluoride Thin Films for Lithium-Ion Batteries", Applied Surface Science 252 (2006), p. 4587-4592.
Makimura, Y., et al. "Electrochemical behavior of low temperature grown iron fluoride thin films", Electrochemistry Communications, 2006, vol. 8, pp. 1769-1774.
Mansour, A.N., et al. "In Situ X-ray Absorption Spectroscopic Investigation of the Electrochemical Conversion Reactions of $CuF_2$-$MoO_3$ Nanocomposite", Journal of Solid State Chemistry, 2010, vol. 183, pp. 3029-3038.
Naghash, A. R. and Lee, J. Y. "Lithium Nickel Oxyfluoride $(Li_{1-z}Ni_{1+z}F_yO_{2-y})$ and Lithium Magnesium Nickel Oxide $(Li_{1-z}(Mg_xNi_{1-x})_{1+z}O_2)$ Cathodes for Lithium Rechargeable Batteries: Part I. Synthesis and Characterization of Bulk Phases", Electrochimica Acta, 2001, vol. 46, pp. 941-951.
Nishijima, M., et al. "Cathode Properties of Metal Trifluorides in Li and Na Secondary Batteries", Journal of Power Sources, 2009, vol. 190, pp. 552-562.
Office action and Search Report of Chinese Application No. 201310302774.5, Publication No. 103779541A; 18 pages.
Office Action dated Apr. 24, 2015 in U.S. Appl. No. 14/318,678, 14 pages.
Office Action dated Sep. 24, 2014 in U.S. Appl. No. 14/318,677, 16 pages.
Parkinson, M. F., et al. "Effect of Vertically Structured Porosity on Electrochemical Performance of $FeF_2$ Films for Lithium Batteries", Electrochemica Acta, Apr. 2014, vol. 125, p. 71-82.
Pereira, N., et al. "Iron Oxyfluorides as High Capacity Cathode Materials for Lithium Batteries", Journal of the Electrochemical Society , 2009, vol. 156 (6), pp. A407-A416.
Plitz, I., et al. "Structure and Electrochemistry of Carbon-Metal Fluoride Nanocomposites Fabricated by Solid-State Redox Conversion Reaction", Journal of the Electrochemical Society, 152 (2), 2005, A307-A315.
Poizot, P., et al. "Nano-sized Transition-Metal Oxides as Negative-Electrode Materials for Lithium-Ion Batteries", Letters to Nature, Sep. 28, 2000, vol. 407, pp. 496-499.
Prakash, R., et al. "A Ferrocene-Based Carbon-Iron Lithium Fluoride Nanocomposite as a Stable Electrode Material in Lithium Batteries", Journal of Materials Chemistry, 2010, vol. 20, pp. 1871-1876.
Prakash, R., et al. "Modified Synthesis of [FE/LiF/C] Nanocomposite, and its Application as Conversion Cathode Material in Lithium Batteries", Journal of Power Sources, 196, 2011, p. 5936-5944.
Rangan, S., et al. "Conversion Reaction of $FeF_2$ Thin Films Upon Exposure to Atomic Lithium", Journal of Physical Chemistry, 2012, vol. 116 (19), pp. 10498-10503.

(56) References Cited

OTHER PUBLICATIONS

Rangan, S., et al. "Electronic Structure and Chemical Composition of Candidate Conversion Material Iron Oxifluoride", 220th ECS Meeting.
Reddy, M. A. and Fichtner, M. "Batteries Based on Fluoride Shuttle", Journal of Materials Chemistry, 2011, vol. 21, pp. 17059-17062.
Reddy, M. A., et al. "CFx Derived Carbon-FeF$_2$ Nanocomposites for Reversible Lithium Storage", Advanced Energy Materials, vol. 3, Issue 3, Mar. 2013, pp. 308-313.
Sharafat, S., et al. "Chemical Compatibility of Structural Materials with Liquid Li and Sn-Li", APEX Meeting, May 10-12, 2000, Argonne National Laboratory, 31 pages.
Shearer-Turrell, S., et al. "Structural Studies of Iron Hexafluorides: Infrared Spectra of M$_3$FeF$_6$ (M=Li, Na, K, Rb, Cs, Ag, Ti)", Journal of Molecular Structure, 1971, vol. 7, pp. 289-300.
Tressaud, et al. "Les Hesxafluoferrites M$_3$FeF$_6$ (M=Li, Na, K, Rb, Cs, Ag, Ti, NH4): Etude Radiocristallo-graphique, Spectroscopique et Magnetique", Journal of Inorganic and Nuclear Chemistry, 1970, vol. 32, pp. 2179-2186.
Wang, F., et al. "Conversion Reaction Mechanisms in Lithium Ion Batteries: Study of the Binary Metal Fluoride Electrodes", Journal of the American Chemical Society, vol. 133 (46), pp. 18828-18836.
Wang, F., et al. "Ionic and Electronic Transport in Metal Fluoride Conversion Electrodes", Northeastern Center for Chemical Energy Storage, PRiME 2012, 222nd Meeting Electrochemical Society, Oct. 9, 2012, 23 pages.
Wang, F., et al. "Tracking Lithium Transport and Electrochemical Reactions in Nanoparticles", Nature Communications, vol. 3, Nov. 13, 2012, 8 pages.
Wiaderek, K. M., et al. "Comprehensive Insights into the Structural and Chemical Changes in Mixed-Anion FeOF Electrodes by Using Operando POF and NMR Spectroscopy", Journal of the American Chemical Society, Jan. 8, 2013, 9 pages.
Yamakawa, N., et al. "Identifying the Local Structures Formed During Lithiation of the Conversion Material, Iron Fluoride, in a Li Ion Battery: A Solid-State NMR, X-ray Diffraction, and Pair Distribution Function Analysis Study", Journal of American Chemical Society, 131, 2009, p. 10525-10536.
Yamakawa, N., et al. "Investigation of the Conversion Reaction Mechanisms for Binary Copper (II) Compounds by Solid-State NMR Spectroscopy and X-ray Diffraction", Chemistry of Materials, 2009, vol. 21, pp. 3162-3176.
Yang, Z., et al. "First Principles Study on the Structural, Magnetic and Electronic Properlies of Codoped FeF$_3$", Computational and Theoretical Chemistry, 2012, vol. 980, pp. 44-48.
Yao, W., et al. "Multilayered Cobalt Oxide Platelets for Negative Electrode Material of a Lithium-Ion Battery", Journal of the Electrochemical Society, 2008, vol. 155, Issue 12, pp. A903-A908.
Zhang, H., et al. "Nanostructured Nickel FluorideThin Film as a New Li Storage Material", Solid State Sciences, 2008, vol. 10, pp. 1166-1172.
Zhang, W., et al. "Synthesis and Characterization of in Situ Fe$_2$O$_3$-Coated FeF$_3$ Cathode Materials for Rechargeable Lithium Batteries", Journal of Materials Chemistry, 2012, vol. 22, pp. 24769-24775.
Zhou, M., et al. "Thermal Stability of FeF$_3$ Cathode for Li-ion batteries", Journal of Power Sources, 195, 2010, p. 4952-4956.
Zhou, Y., et al. "LiF/Co Nanocomposite as a New Li Storage Material", Electrochemical and Solid-State Letters, vol. 9, No. 3, 2006, p. A147-A150.
Zu, C. and Li, H. "Thermodynamic Analysis on Energy Densities of Batteries", Energy & Environmental Science, 2011, vol. 4, pp. 2614-2624.
Adam, "Fluoride glass research in France: fundamentals and applications", Journal of Fluorine Chemistry, vol. 107, Feb. 2001, pp. 265-270.
Amatucci et al., "Fluoride Based Electrode Materials for Advanced Energy Storage Devices", Journal of Fluorine Chemistry 128, 2007, available online Dec. 13, 2006, pp. 243-262.

Arico et al., "Nanostructured Materials for Advanced Energy conversion and Storage Devices", Nature Materials, May 2005, vol. 4, pp. 366-377.
Armstrong et al., "Synthesis of Layered LiMnO$_2$ as an Electrode for Rechargeable Lithium Batteries", Nature, Jun. 6, 1996, vol. 381, pp. 499-500.
Badway et al., "Carbon Metal Fluoride Nanocomposites", Journal of Electrochemcial Society, 2003, available electronically Jul. 17, 2003, vol. 150, No. 9, pp. A1209-A1218.
Bervas et al., "Reversible conversion reactions with lithium in bismuth oxyfluoride nanocomposites", J. Electrochem. Soc., 2006, available electronically Dec. 12, 2005, vol. 153, No. 1, pp. A159-A170.
Bobe et al., "Ion conductivity and diffusion in ZrF$_4$-based fluoride glasses containing LiF (0≤LiF≤0.60)", Journal of Non-Crystalline Solids, Jan. 1997, vol. 209, pp. 122-136.
Claims pending in Chinese Patent Application No. 201310302774.5 when Office action and Search Report of Chinese Application No. 201310302774.5 mailed; 7 pages.
Cui et al. "Electrochemical Properties of MnF$_2$ Films Fabricated by Pulsed Laser Deposition," Journal of Inorganic Materials, 2010, 25(2), pp. 145-150. Abstract in English on the first page.
Doe et al. "First Principles Investigation of Li—Fe—F Phase diagram and Equilibrium and Nonequilibrium Conversion Reactions of Iron Fluorides with Lithium", Chemistry of Materials, 2008, vol. 20, No. 16, pp. 5274-5283.
Doe et al. "First Principles Study of Li—Bi—F Phase Diagram and Bismuth Fluoride Conversion Reactions with Lithium", Electrochemical and Solid State Letters, 2009, vol. 12, No. 7, pp. A125-A128.
Dugat et al., "Crystal Structures of Li$_4$ZrF$_8$ and Li$_3$Zr$_4$F$_{19}$ and Reinvestigation of the LiF—ZrF$_4$ Phase Diagram", Journal of Solid State Chemistry, Nov. 15, 1995, vol. 120, pp. 187-196.
Extended European Search Report dated Apr. 14, 2015 in EP 14169514.8, 6 pages.
Fiordiponti et al., "Nonaqueous Batteries with BiF$_3$ Cathodes", Journal of The Electrochemical Society, Apr. 1978, vol. 125, No. 4, pp. 511-515.
Ghosh et al., "Electrical conductivity and conductivity relaxation in mixed alkali fluoride glasses", Solid State Ionics, 2002, accepted Mar. 28, 2002, vol. 149, pp. 67-72.
Ghosh et al., "Ion dynamics and mixed mobile ion effect in fluoride glasses", Journal of Applied Physics, Jun. 21, 2005, vol. 97, pp. 123525-1 through 123525-5.
Li et al., "Carbon Nanotube Wiring of Electrodes for High-Rate Lithium Batteries Using an Imidazolium-Based Ionic Liquid Precursor as Dispersant and Binder: A Case Study on Iron Fluoride Nanoparticles", ACS Nano, 2011, vol. 5, No. 4, pp. 2930-2938.
Li et al. "Low-Temperature Ionic-Liquid-Based Synthesis of Nanostructured Iron-Based Fluoride Cathodes for Lithium Batteries", Advanced Materials, 2010, vol. 22, pp. 3650-3654.
Li et al., "Li-Storage via Heterogeneous Reaction in Selected Binary Metal Fluorides and Oxides", Journal of Electrochemical Society, 2004, accepted Oct. 21, 2003, vol. 151, No. 11, pp. A1878-A1885.
Li et al., "Reversible formation and decomposition of LiF clusters using transition metal fluorides as precursors and their application in rechargeable Li batteries," Advanced Materials, May 2, 2003, vol. 15, No. 9, pp. 736-739.
Li et al. "Reversible Three-Electron Redox Behaviors of FeF$_3$ Nanocrystals as High-Capacity Cathode-Active Materials for Li-Ion Batteries", Journal of Physical Ghemistry C, Feb. 25, 2010, vol. 114, Issue 7, pp. 3190-3195.
Mizushima et al., "Li$_x$CoO$_2$ ( 0<x≤s): A New Cathode Material for Batteries of High Energy Density", Mat. Res. Bull, 1980, vol. 15, No. 6, pp. 783-789.
Nel et al., "Toxic Potential of Materials at the Nanolevel", Science, Feruary 3, 2006, vol. 311, pp. 622-627.
Padhi et al., "Effect of Structure on the Fe$^{3+}$/ Fe$^{2+}$ Redox Couple in Iron Phosphates", J. Electrochem. Soc., May 5, 1997, vol. 144, No. 5, pp. 1609-1613.

(56) References Cited

OTHER PUBLICATIONS

Padhi et al., "Phospho-olivines as Positive-Electrode Materials for Rechargeable Lithium Batteries", J. Electrochem. Soc., Apr. 4, 1997, vol. 144, No. 4, pp. 1188-1194.
Pereira et al., "The Electrochemistry of Germanium Nitride with Lithium", J. Electrochem. Soc., 2003, available electronically Jul. 1, 2003, vol. 150, No. 8, pp. A1118-A 1128.
Poulain, "Advanced Glasses", Ann. Chim. Sci. Mat., Apr. 2003, vol. 28, pp. 87-94.
Roth et al. "Nanocrystalline LiF via microemulsion systems", J. Mater. Chem., 1999, accepted Nov. 16, 1998, vol. 9, pp. 493-497.
Sorokin, "Anion-conducting fluoride and oxyfluoride glasses", Russian Chemical Reviews, 2001, vol. 70, No. 9, pp. 801-807.
Sural et al., "Conductivity relaxation in zirconium fluoride glasses: effect of substitution of $Zr^{4+}$ by $Y^{3+}$ ions", Solid State Ionics, Apr. 1999, vol. 120, pp. 27-32.
Tarascon et al., "Issues and challenges facing rechargeable lithium batteries", Nature, Nov. 2001, vol. 414, pp. 359-367.
Tarascon et al., "The Spinel Phase of $LiMn_2O_4$ as a Cathode in Secondary Lithium Cells", J. Electrochem. Soc., Oct. 1991, vol. 138, No. 10, pp. 2859-2864.
Thackeray et al., "Lithium Insertion into Manganese Spinels", Mater. Res. Bull., Feb. 1983, vol. 18, No. 4, pp. 461-472.
Thomas et al., "Synthesis and Structural Characterization of the Normal Spinel Li [$Ni_2$] $O_4$,", Mater. Res. Bull., Mar. 25, 1985, vol. 20, No. 10, pp. 1137-1146.
Trnovcova et al., "Physical Properties of Multicomponent Fluoride Glasses for Photonic and Superionic Applications", Ionics, Jul. 2001, vol. 7, Issue 4, pp. 456-462.
Tressaud, et al. "Les Hesxafluoferrites $M_3FeF_6$ (M=Li, Na, K, Rb, Cs, Ag, Ti, $NH_4$): Etude Radiocristallo-graphique, Spectroscopique et Magnetique", Journal of Inorganic and Nuclear Chemistry, 1970, vol. 32, pp. 2179-2186. Abstract in English on the first page.
Vlasse et al., "The Refinement of the Crystal Structure of Iron Oxyfluoride, FeOF", Journal of Solid State Chemistry, Oct. 1973, vol. 8, Issue 2, pp. 109-113.
Wang et al., "Ternary Metal Fluorides as New Cathodes of Rechargable Lithium Batteries with Ultrahigh Energy Desnity," The Electrochemical Society, Jun. 10, 2014, 2 pages.
Xiujian et al., "Mixed-alkali effect in fluorozirconate glasses", Journal of Materials Science Letters, Feb. 1987, vol. 6, Issue 2, pp. 143-144.
Prakash et al., "Modified synthesis of [Fe/LiF/C] nanocomposite, and its application as conversion cathode material in lithium batteries", Journal of Power Sources, 2011, vol. 196, pp. 5936-5944.
Third Office Action together its English translation of Chinese Patent Application No. 201310302774.5 dated Mar. 14, 2018; 14 pages.
Supplementary Search Report together with its English translation of Chinese Patent Application No. 201310302774.5 dated Mar. 6, 2018; 6 pages.
Lee et al., "Conversion mechanism of nickel fluoride and NiO-doped nickel fluoride in Li ion batteries", Electrochimica Acta 59, 2012, pp. 213-221.
Cabana et al., "Beyond Intercalation-Based Li-Ion Batteries: The State of the Art and Challenges of Electrode Materials Reacting Through Conversion Reactions", Adv. Mater. 2010, vol. 22, pp. E170-E192.
Prabu et al., "Synthesis, impedance and electrochemical studies of lithium iron fluorophosphate, $LiFePO_4F$ cathode", Electrochimica Acta 85, 2012, pp. 572-578.
"European Application Serial No. 14169514.8, Search Report dated Apr. 14, 2015", Apr. 14, 2015, 6 pgs.
Notification of Transmittal of the International Search Report and the Written Opinion of the International Searching Authority, or the Declaration for International Appin. No. PCT/US2015/045332 dated Nov. 23, 2015, 17 pages.

Amaresh et al., "Facile synthesis of $ZrO_2$ coated $Li_2CoPO_4F$ cathode materials for lithium secondary batteries with improved electrochemical properties," Journal of Power Sources, 2013, vol. 244, pp. 395-402.
Amine et al., "A New Three-Volt Spinel $Li_{1+x}Mn_{1.5}Ni_{0.5}O_4$ for Secondary Lithium Batteries," J. Electrochem. Soc., vol. 143, No. 5, May 1996, pp. 1607-1613.
Ariyoshi et al., "Structural change of $LiNi_{1/2}Mn_{1/2}O_2$ during charge and discharge in nonaqueous lithium cells," Journal of Physics and Chemistry of Solids, 2008, vol. 69, pp. 1238-1241.
Armstrong et al., "Demonstrating Oxygen Loss and Associated Structural Reorganization in the Lithium Battery Cathode $Li[Ni_{0.2} Li_{0.2}Mn_{0.6}]O_2$," J. Am. Chem. Soc. 2006, vol. 128, pp. 8694-8698.
Armstrong et al., "The Layered Intercalation Compounds $Li(Mn_{1-y}Coy)O_2$: Positive Electrode Materials for Lithium-Ion Batteries," Journal of Solid State Chemistry, vol. 145, 1999, pp. 549-556.
Ates et al., "A Li-Rich Layered Cathode Material with Enhanced Strucutural Stability and Rate Capability for Li-ion Batteries" Journal of the Electrochemical Society, 161 (3), 2014, pp. A355-A363.
Ates et al., "Mitigation of Layered to Spinel Conversion of a Li-Rich Layered Metal Oxide Cathode Material for Li-Ion Batteries," Journal of The Electrochemical Society, 161 (3), 2014, pp. A290-A301.
Aurbach et al., "Studies of Aluminum-Doped $LiNi_{0.5}Co_{0.2}Mn_{0.3}O_2$: Electrochemical Behavior, Aging, Structural Transformations, and Thermal Characteristics," Journal of The Electrochemical Society, 162 (6), (2015), pp. A1014-A1027.
Bains et al., "$Li(Ni_{0.40}Mn_{0.40}Co_{0.15}Al_{0.05})O_2$: A promising positive electrode material for high-power and safe lithium-ion batteries," Journal of Power Sources, 2011, vol. 196, pp. 8625-8631.
Bareño al., "Local Structure of Layered Oxide Electrode Materials for Lithium-Ion Batteries," Adv. Mater., 2010, vol. 22, pp. 1122-1127.
Bareño et al., "Long-Range and Local Structure in the Layered Oxide $Li_{1.2}Co_{0.4}Mn_{0.4}O_2$," Chem. Mater., 2011, vol. 23, pp. 2039-2050.
Benedek et al., "Theory of Overlithiation Reaction in $LiMO_2$ Battery Electrodes," Chem. Mater., 2006, vol. 18, pp. 1296-1302.
Bettge et al., "Improving high-capacity $Li_{1.2}Ni_{0.15}Mn_{0.55}Co_{0.1}O_2$-based lithium-ion cells by modifiying the positive electrode with alumina," Journal of Power Sources, 2013, vol. 233, pp. 346-357.
Bhattacharya et al., "Prediction of Quaternary Spinel Oxides as Li-Battery Cathodes: Cation Site Preference, Metal Mixing, Voltage and Phase Stability," Journal of The Electrochemical Society, 161 (9), 2014, pp. A1440-A1446.
Caldin et al., "Kinetics and Thermodynamics of the Complex-formation of Nickel(II) and Cobalt(II) Ions with Ammonia and Pyridine-2-azodimethylaniline in Water, at Pressures from 1 bar to 2 kbar," Journal of The Chemical Society, Faraday Transactions 1, vol. 68, 1972, pp. 2247-2258.
Camardese et al., "Synthesis of Spherical Core-Shell $Ni(OH)_2$—$Ni_{1/2}Mn_{1/2}(OH)_2$ Particles via a Continuously Stirred Tank Reactor," Journal of The Electrochemical Society, 161 (6), 2014, pp. A890-A895.
Cheng et al., "Enhanced Cycleabity in Lithium Ion Batteries: Resulting from Atomic Layer Depostion of $Al_2O_3$ or $TiO_2$ on $LiCoO_2$ Electrodes," J. Phys. Chem. C, 2012, 116, pp. 7629-7637.
Chiang et al., "High Capacity, Temperature-Stable Lithium Aluminum Manganese Oxide Cathodes for Rechargeable Batteries," Electrochemical and Solid-State Letters, 1999, vol. 2, No. 3, pp. 107-110.
Chiba et al., "$Na_xLi_{0.7-x}Ni_{1-y}Mn_yO_2$ as a new positive electrode material for lithium-ion batteries," Journal of Power Sources, 2016, vol. 311, pp. 103-110.
Cho, Jaephil et al., "A Breakthrough in the Safety of Lithium Secondary Batteries by Coating the Cathode Material with $AlPO_4$ Nanoparticles," Angew. Chem. Int. Ed. 2003, 42, pp. 1618-1621.
Cho, Woosuk et al., "Improved electrochemical and thermal properties of nickel rich $LiNi_{0.6}Co_{0.2}Mn_{0.2}O_2$ cathode materials by $SiO_2$ coating," Journal of Power Sources, 282, 2015, 45-50.

(56) References Cited

OTHER PUBLICATIONS

Cho, Yonghyun et al., "A New Type of Protective Surface Layer for High-Capacity Ni-Based Cathode Materials: Nanoscaled Surface Pillaring Layer," Nano Lett., 2013, 13, pp. 1145-1152.
Cho, Yonghyun et al., Supporting Information "New Type of Protective Surface Layer for High-Capacity Ni-Based Cathode Materials: Nanoscaled Surface Pillaring Layer," Nano Lett., 2013, vol. 13, 16 pages.
Choi et al., "Factors Influencing the Layered to Spinel-like Phase Transition in Layered Oxide Cathodes," Journal of The Electrochemical Society, 2002, 149 (9), pp. A1157-A1163.
Choi et al., "Investigation of the Irreversible Capacity Loss in the Layered $LiNi_{1/3}Mn_{1/3}Co_{1/3}O_2$ Cathodes," Electrochemical and Solid-State Letters, 8 (8), 2005, pp. C102-C105.
Chung et al., "Comparative studies between oxygen-deficient $LiMn_2O_4$ and Al-doped $LiMn_2O_4$," Journal of Power Sources, 146, 2005, pp. 226-231.
Clause et al., "Preparation and Characterization of Nickel-Aluminum Mixed Oxides Obtained by Thermal Decomposition of Hydrotalcite-Type Precursors," Journal of Catalysis, 1992, vol. 133, pp. 231-246.
Conry et al., "Structural Underpinnings of the Enhanced Cycling Stability upon Al-Substitution in $LiNi_{0.45}Mn_{0.45}Co_{0.1-y}Al_yO_2$ Positive Electrode Materials for Li-ion Batteries," Chem. Mater. 2012, 24, pp. 3307-3317.
Delmas et al. "Layered Li(Ni, M)O2 Systems as the Cathode Material in Lithium-Ion Batteries," MRS Bulletin, Aug. 2002, pp. 608-612.
Deng et al., "Influence of Cationic Substitutions on the Oxygen Loss and Reversible Capacity of Lithium-Rich Layered Oxide Cathodes," J. Phys. Chem. C, 2011, 115, pp. 7097-7103.
Deng et al., "Nanostructured Lithium Nickel Manganese Oxides for Lithium-Ion Batteries," Journal of The Electrochemical Society, 157 (4), 2010, pp. A447-A452.
Doan et al., "Recent developments in synthesis of $xLi_2MnO_3 \cdot (1-x)LiMO_2$ (M=Ni, Co, Mn) cathode powders for high-energy lithium rechargeable batteries," Frontiers in Energy Research, Sep. 2014, vol. 2, Article 36, 7 pages.
Dou, Shumei, "Review and prospect of layered lithium nickel manganese oxide as cathode materials for Li-ion batteries," J Solid State Electrochem (2013) 17, pp. 911-926.
Dyatkin et al., "The Acidic Properties of Fluorine-Containing Alcohols, Hydroxylamines and OximeS," Tetrahedron, 1965, vol. 21, pp. 2991-2995.
El Mofid et al., "A high performance layered transition metal oxide cathode material obtained by simultaneous aluminum and iron cationic substitution," Journal of Power Sources, 2014, vol. 268, pp. 414-422.
Eom, et al. "Dependence of Electrochemical Behavior on Concentration and Annealing Temperature of $Li_xCoPO_4$ Phase-Grown $LiNi_{0.8}Co_{0.16}Al_{0.04}O_2$ Cathode Materials," Journal of The Electrochemical Society, 155 (3), 2008, pp. A228-A233.
Fu, Xian-Zhu et al., "Nickel oxyhydroxides with various oxidation states prepared by chemicaloxidation of spherical $\beta$—$Ni(OH)_2$," Solid State Ionics, vol. 178, 2007, pp. 987-993.
Gallagher, et al., "Correlating hysteresis and voltage fade in lithium- and manganese-rich layered transition-metal oxide electrodes," Electrochemistry Communications, vol. 33, 2013, pp. 96-98.
Glaeser et al., "The Kinetics of Ammonia Exchange between Nickel Ammine Complexes and Ammonia in Aqueous and Anhydrous Ammonia Solutions Measured by Nuclear Magnetic Resonance of Nitrogen-14", Inorganic Chemistry, vol. 4, No. 2, Feb. 1965, pp. 206-208.
Gopalakrishnan, "Chimie Douce Approaches to the Synthesis of Metastable Oxide Materials," Chemistry of Materials, vol. 7, No. 7, Jul. 1995, pp. 1265-1275.
Gummow, R J et al., "Lithium Extraction From Orthorhombic Lithium Manganese Oxide and the Phase Transformation to Spinel," Mat. Res. Bull., vol. 28, 1993, pp. 1249-1256.
Gummow, R.J. et al., "Improved capacity retention in rechargeable 4 V lithium/lithiummanganese oxide (spinel) cells," Solid State Ionics, vol. 69, 1994, pp. 59-67.
Gutierrez, A. et al., "Understanding the Effects of Cationic and Anionic Substitutions in Spinel Cathodes of Lithium-Ion Batteries," Journal of The Electrochemical Society, 160 (6), 2013, pp. A901-A905.
Han, Ah Reum et al., "Soft Chemical Dehydration Route to Carbon Coating of Metal Oxides: Its Application for Spinel Lithium Manganate," J. Phys. Chem. C, 2007, vol. 111, pp. 11347-11352.
Hayashi, N. et al., "Cathode of $LiMg_yMn_{2-y}O_4$ and $LiMg_yMn_{2-y}O_{4-\delta}$, Spinel Phases for Lithium Secondary Batteries," Journal of The Electrochemical Society, 146 (4), 1999, pp. 1351-1354.
He, Wei et al., "Improved electrochemical performances of nanocrystalline $Li[Li_{0.2}Jm_{0.54}Ni_{0.13}Co_{0.13}]O_2$ cathode material for Li-ion batteries" RSC Advances, 2012, vol. 2, pp. 3423-3429.
Hong, Jihyun et al., "Critical Role of Oxygen Evolved from Layered Li-excess Metal Oxides in Lithium Rechargeable Batteries," Chem. Mater., 2012, 24 (14), pp. 2692-2697; together with Supporting Information—12 pages.
Hou, Peiyu et al., "A high energy density Li-rich positive-electrode material with superior performances via a dual chelating agent co-precipitation route," J. Mater. Chem. A, 2015, 3, pp. 9427-9431.
Hou, Peiyu et al., Supporting Information "A high energy density Li-rich positive-electrode material with superior performances via a dual chelating agent co-precipitation route," J. Mater. Chem. A, 2015, vol. 3, 11 pages.
Hua, Chuanshan et al., "Study of full concentration-gradient Li(Ni0.8Co0.1Mn0.1)O2 cathode material for lithium ion batteries," Journal of Alloys and Compounds, vol. 614, 2014, pp. 264-270.
Hua, Weibo et al., "Na-doped Ni-rich $LiNi_{0.5}Co_{0.2}Mn_{0.3}O_2$ cathode material with both high rate capability and high tap density for lithium ion batteries," Dalton Trans., 2014, vol. 43, pp. 14824-14832.
Hwang et al., "Influence of Mn content on the morphology and electrochemical performance of $LiNi_{1-x-y}Co_xMn_yO_2$ cathode materials" J. Mater. Chem., 2003, vol. 13, pp. 1962-1968.
Hwang et al., "Investigation of Changes in the Surface Structure of $Li_{Ni0.8}Co_{0.15}Al_{0.05}O_2$ Cathode Materials Induced by the Initial Charge," Chem. Mater. 2014, vol. 26, pp. 1084-1092.
Hwang et al., "Using Real-Time Electron Microscopy to Explore the Effects of Transition-Metal Composition on the Local Thermal Stability in Charged $Li_xNi_yMn_zCo_{1-y-z}O_2$ Cathode Materials," Chem. Mater., 2015, 27, pp. 3927-3935.
Hy, Sunny et al., "Understanding the Role of Ni in Stabilizing the Lithium-Rich High-Capacity Cathode Material $Li[Ni_xLi_{(1-2x)/3}Mn_{(2-x)/3}]O_2$ ($0 \leq x \leq 0.5$)," Chem. Mater. 2014, 26, pp. 6919-6927.
Irving, H. et al., "The Stability of Transition-metal Complexes," Journal of the Chemical Society, Issue 0, 1953, pp. 3192-3210.
Jarvis, Karalee A. et al., "Atomic Structure of a Lithium-Rich Layered Oxide Material for Lithium-Ion Batteries: Evidence of a Solid Solution", Chem. Mater., 2011, vol. 23, pp. 3614-3621.
Johnson et al. "Structural and electrochemical studies of a-manganese dioxide($\alpha$-$MnO_2$)" Journal of Power Sources 68 (1997) pp. 570-577.
Johnson et al., "Structural Characterization of Layered $Li_xNi_{0.5}Mn_{0.5}O_2$ ($0 \leq x \leq 2$) Oxide Electrodes for Li Batteries," Chem. Mater. 2003, vol. 15, pp. 2313-2322.
Johnson et al., "Synthesis, Characterization and Electrochemistry of Lithium Battery Electrodes: $xLi_2MnO_3 \cdot (1-x)LiMn_{0.333}Ni_{0.333}Co_{0.333}O_2$ ($0 \leq x \leq 0.7$)," Chem. Mater. 2008, vol. 20, pp. 6095-6106.
Johnson et al., "The role of $Li_2MO_2$ structures (M=metal ion) in the electrochemistry of $(x)LiMn_{0.5}Ni_{0.5}O_2 \cdot (1-x)Li_2TiO_3$ electrodes for lithium-ion batteries," Electrochemistry Communications, vol. 4, 2002, pp. 492-498.
Jouanneau et al., "Preparation, Structure, and Thermal Stability of New $Ni_xCo_{1-2x}Mn_x(OH)_2$ ($0 \leq x \leq 1/2$) Phases," Chem. Mater., vol. 15, No. 2, 2003 pp. 495-499.
Ju et al., "Optimization of Layered Cathode Material with Full Concentration Gradient for Lithium-Ion Batteries," J. Phys. Chem. C, 2014, vol. 118, pp. 175-182.

(56) References Cited

OTHER PUBLICATIONS

Kam et al., "Aliovalent titanium substitution in layered mixed Li Ni—Mn—Co oxides for lithium battery applications," J. Mater. Chem., 2011, vol. 21, pp. 9991-9993.

Kam, Kinson C. et al., "Electrochemical and Physical Properties of Ti-Substituted Layered Nickel Manganese Cobalt Oxide (NMC) Cathode Materials," Journal of The Electrochemical Society, 159 (8), 2012, pp. A1383-A1392.

Kang et al., "Effects of Li Content on Structure and Electrochemical Properties of $Li_{1+x}(Ni_{0.5}Mn_{0.5})_{1-x}O_2$ ($0 \le x \le 0.15$) Electrodes in Lithium Cells (1.0-4.8 V)," Journal of The Electrochemical Society, 154 (4), 2007, pp. A268-A274.

Kang et al., "Enhancing the rate capability of high capacity $xLi_2MnO_3 \cdot (1-x)LiMO_2$ (M=Mn, Ni, Co) electrodes by Li—Ni—$PO_4$ treatment," Electrochemistry Communications, vol. 11, 2009, pp. 748-751.

Kang et al., "First-cycle irreversibility of layered Li—Ni—Co—Mn oxide cathode in Li-ion batteries," Electrochimica Acta, vol. 54, 2008, pp. 684-689.

Kang et al., "Investigating the first-cycle irreversibility of lithium metal oxide cathodes for Li batteries," J Mater Sci, 2008, vol. 43, pp. 4701-4706.

Kang et al., "The Effects of Acid Treatment on the Electrochemical Properties of 0.5 $Li_2MnO_3 \cdot 0.5$ $LiNi_{0.44}Co_{0.25}Mn_{0.31}O_2$ Electrodes in Lithium Cells," Journal of The Electrochemical Society, 153 (6), 2006, pp. A1186-A1192.

Kang, Kisuk et al., "Electrodes with High Power and High Capacity for Rechargeable Lithium Batteries," Science, vol. 311, Feb. 17, 2006, pp. 977-980.

Kang, Kisuk et al., "Factors that affect Li mobility in layered lithium transition metal oxides," Physical Review B, vol. 74, 2006, pp. 094105-1-094195-7.

Kestner et al. "An Experimental and Modeling Analysis of Vapor Transport Deposition of Cadmium Telluride", Solar Energy Materials & Solar Cells, 2004, vol. 83, pp. 55-65.

Kim et al., "Design of Nickel-rich Layered Oxides Using d Electronic Donor for Redox Reactions," Chem. Mater. 2015, vol. 27, pp. 6450-6456.

Kim, Chunjoong et al., "Stabilization of Battery Electrode/Electrolyte Interfaces Employing Nanocrystals with Passivating Epitaxial Shells," Chem. Mater. 2015, 27, pp. 394-399.

Kim, H.-J. et al., "Coprecipitation and Characterization of Nickel-Cobalt-Manganese Hydroxides Precursor for Battery Cathode Materials," Abstract #849, 224th ECS Meeting, 2013 The Electrochemical Society, 1 page.

Kim, Hyun-Soo et al. "Enhanced electrochemical properties of $LiNi_{1/3}Co_{1/3}Mn_{1/3}O_2$ cathode material by coating with $LiAlO_2$ nanoparticles," Journal of Power Sources, 161, 2006, pp. 623-627.

Kim, Jeom-Soo et al., "Electrochemical and Structural Properties of $xLi_2MO_3 \cdot (1-x)LiMn_{0.5}Ni_{0.5}O_2$ Electrodes for Lithium Batteries (M=Ti, Mn, Zr; $0 \le x \le 0.3$)," Chem. Mater. 2004, 16, pp. 1996-2006.

Kim, Ji Woo et al., "Unexpected high power performance of atomic layer deposition coated $Li[Ni_{1/3}Mn_{1/3}Co_{1/3}]O_2$ cathodes," Journal of Power Sources, 254, 2014, pp. 190-197.

Kita et al. "Magnetic Properties of Fe/fluorides ($CaF_2$, LiF) Multilayered Thin Films", Journal of Magnetism and Magnetic Materials, 1992, vol. 117, pp. 294-300, North-Holland.

Kong et al., "Multivalent Li-Site Doping of Mn Oxides for Li-Ion Batteries," J. Phys. Chem. C, 2015, vol. 119, pp. 21904-21912.

Kosova, N. V. et al., "Mixed layered Ni—Mn—Co hydroxides: Crystal structure, electronic state of ions, and thermal decomposition," Journal of Power Sources 174, 2007, pp. 735-740.

Kosova, N. V. et al., "Optimization of $Ni^{2+}/Ni^{3+}$ ratio in layered $Li(Ni,Mn,Co)O_2$ cathodes for better electrochemistry," Journal of Power Sources, 174, 2007, pp. 965-969.

Kovanda, František et al., "Mixed oxides obtained from Co and Mn containing layered double hydroxides: Preparation, characterization, and catalytic properties," Journal of Solid State Chemistry, vol. 179, 2006, pp. 812-823.

Kovanda, František et al., "Thermal behaviour of Ni—Mn layered double hydroxide and characterization of formed oxides," Solid State Sciences, vol. 5, 2003, pp. 1019-1026.

Koyama, Yukinori et al., "Crystal and electronic structures of superstructural $Li1-x[Co1/3Ni1/3Mn1/3]O2$ ($0 \le x \le 1$)," Journal of Power Sources 119-121, 2003, pp. 644-648.

Lee et al., "High capacity $Li[Li_{0.2}Ni_{0.2}Mn_{0.6}]O_2$ cathode materials via a carbonate co-precipitation method," Journal of Power Sources 162, 2006, pp. 1346-1350.

Lee et al., "Low-temperature atomic layer deposited $Al2O3$ thin film on layer structure cathode for enhanced cycleability in lithium-ion batteries," Electrochimica Acta 55, 2010, pp. 4002-4006.

Lee et al., "Synthetic optimization of $Li[Ni_{1/3}Co_{1/3}Mn_{1/3}]O_2$ via co-precipitation," Electrochimica Acta, vol. 50, 2004, pp. 939-948.

Li et al., "Improve First-Cycle Efficiency and Rate Performance of Layered-Layered $Li_{1.2}Mn_{0.6}Ni_{0.2}O_2$ Using Oxygen Stabilizing Dopant," ACS Appl. Mater. Interfaces, 2015, 7, pp. 16040-16045.

Li et al., "Synthesis and Characterization of the Lithium-Rich Core-Shell Cathodes with Low Irreversible Capacity and Mitigated Voltage Fade," Chem. Mater. 2015, 27, pp. 3366-3377.

Li, Y. et al., "Understanding Long-Term Cycling Performance of $Li_{1.2}Ni_{0.15}Mn_{0.55}Co_{0.1}O_2$-Graphite Lithium-Ion Cells," Journal of The Electrochemical Society, 160 (5), 2013, pp. A3006-A3019.

Li, Zheng et al., "Stability and Rate Capability of Al Substituted Lithium-Rich High-Manganese Content Oxide Materials for Li-Ion Batteries," Journal of The Electrochemical Society, 159 (2), 2012, pp. A116-A120.

Liang, Jianbo et al., "Topochemical Synthesis, Anion Exchange, and Exfoliation of Co—Ni Layered Double Hydroxides: A Route to Positively Charged Co—Ni Hydroxide Nanosheets with Tunable Composition," Chem. Mater. 2010, vol. 22, pp. 371-378.

Liao, Jin-Yun et al., "Surface-modified concentration-gradient Ni-rich layered oxide cathodes for high-energy lithium-ion batteries," Journal of Power Sources, vol. 282, 2015, 429-436.

Lim, Jae-Hwan et al., "Electrochemical characterization of $Li_2MnO_3$—$Li[Ni_{1/3}Co_{1/3}Mn_{1/3}]O_2$—$LiNiO_2$ cathode synthesized via co-precipitation for lithium secondary batteries," Journal of Power Sources, 189, 2009, pp. 571-575.

Lin, Feng et al., "Surface reconstruction and chemical evolution of stoichiometric layered cathode materials for lithium-ion batteries," Nature Communications 5:3529, doi: 10.1038/ncomms4529, 2014, pp. 1-9.

Liu et al. "Spherical nanoporous $LiCoPO_4/C$ composites as high performance cathode materials for rechargeable lithium-ion batteries," J. Mater. Chem., 2011, 21, pp. 9984-9987.

Liu et al., "Carbon-coated high capacity layered $Li[Li_{0.2}Mn_{0.54}Ni_{0.13}Co_{0.13}]O_2$ cathodes," Electrochemistry Communications 12 (2010), pp. 750-753.

Liu et al., "Conductive Surface Modification with Aluminum of High Capacity Layered $Li[Li_{0.2}Mn_{0.54}Ni_{0.13}]O_2$ Cathodes," J. Phys. Chem. C 2010, 114, pp. 9528-9533.

Liu et al., "Electrochemical and In Situ Synchrotron XRD Studies on $Al_2O_3$-Coated $LiCoO_2$ Cathode Material", Journal of The Electrochemical Society, 2004, vol. 151 (9), pp. A1344-A1351.

Liu et al., "$Li_3V_2(PO_4)_3$-coated $Li_{1.17}Ni_{0.2}Co_{0.05}Mn_{0.58}O_2$ as the cathode materialswith high rate capability for Lithium ion batteries," Electrochimica Acta 147, 2014, pp. 696-703.

Liu et al., "Long cycle life lithium ion battery with lithium nickel cobalt manganese oxide (NCM) cathode," Journal of Power Sources, vol. 261, 2014, pp. 285-291.

Liu et al., "Nickel-Rich Layered Lithium Transitional-Metal Oxide for High-Energy Lithium-Ion Batteries," Angew. Chem. Int. Ed. 2015, vol. 54, pp. 4440-4458.

Liu et al., "Structure Evolution and Electrochemical Performance of $Al_2O_3$-coated $LiNi_{0.4}Co_{0.2}Mn_{0.4}O_2$ During Charge-discharge Cycling," Chem. Res. Chinese Universities 2012, 28(4), pp. 686-690.

Liu et al., "Study on the capacity fading of pristine and $FePO_4$ coated $LiNi_{1/3}Co_{1/3}Mn_{1/3}O_2$ by Electrochemical and Magnetical techniques," Electrochimica Acta 148, 2014, pp. 26-32.

Liu et al., "Understanding the Improvement in the Electrochemical Properties of Surface Modified 5 V $LiMn_{1.42}Ni_{0.42}Co_{0.16}O_4$ Spinel Cathodes in Lithium-ion Cells," Chem. Mater. 2009, 21, pp. 1695-1707.

(56) References Cited

OTHER PUBLICATIONS

Liu Zhaoping et al., "Synthesis, Anion Exchange, and Delamination of Co—Al Layered Double Hydroxide: Assembly of the Exfoliated Nanosheet/Polyanion Composite Films and Magneto-Optical Studies," J. Am. Chem. Soc., 2006, 128, pp. 4872-4880.
Liu, H. et al., "Electrochemical performance of LiFePO$_4$ cathode material coated with ZrO$_2$ nanolayer," Electrochemistry Communications 10 (2008), pp. 165-169.
Luo et al., "Can Zr be Substituted for Co in Co$_{1-z}$Zr$_z$(OH)$_2$ and LiCo$_{1-z}$Zr$_z$O$_2$?, "Journal of The Electrochemical Society, 158, (2), 2011, pp. A110-A114.
Luo et al., "Preparation of Co$_{1-z}$Al$_z$(OH)$_2$(NO$_3$)$_z$ Layered Double Hydroxides and Li(Co$_{1-z}$Al$_z$)O$_2$," Chem. Mater., 2009, vol. 21, pp. 56-62.
Luo et al., "Synthesis, Characterization, and Thermal Stability of of LiNi$_{1/3}$Mn$_{1/3}$Co$_{1/3-z}$Mg$_z$O$_2$, LiNi$_{1/3-z}$Mn$_{1/3}$Co$_{1/3}$Mg$_z$O$_2$, and LiNi$_{1/3}$Mn$_{1/3-z}$Co$_{1/3}$Mg$_z$O$_2$,"Chem. Mater., 2010, vol. 22, pp. 1164-1172.
Luo et al., "The Impact of Zr Substitution on the Structure, Electrochemical Performance and Thermal Stability of Li[Ni$_{1/3}$Mn$_{1/3-z}$Co$_{1/3}$Zr$_z$]O$_2$," Journal of The Electrochemical Society, 158 (4), 2011, pp. A428-A433.
Ma et al., "A highly homogeneous nanocoating strategy for Li-rich Mn-based layered oxides based on chemical conversion," Journal of Power Sources, vol. 277, 2015, pp. 393-402.
Ma et al., "Structural and electrochemical behavior of LiMn$_{0.4}$Ni$_{0.4}$Co$_{0.2}$O$_2$," Journal of Power Sources, 2007, vol. 165, pp. 517-534.
Makimura et al., "Lithium insertion material of LiNi$_{1/2}$Mn$_{1/2}$O$_2$ for advanced lithium-ion batteries," Journal of Power Sources, 119-121, 2003, pp. 156-160.
Manthiram, "Materials Challenges and Opportunities of Lithium Ion Batteries," J. Phys. Chem. Lett., 2011, vol. 2, pp. 176-184.
Markus et al., "Computational and Experimental Investigation of Ti Substitution in Li$_1$(Ni$_x$Mn$_x$Co$_{1-2x-y}$Ti$_y$)O$_2$ for Lithium Ion Batteries," J. Phys. Chem. Lett., 2014, vol. 5, pp. 3649-3655.
McCalla et al., "Formation of Layered-Layered Composites in the Li—Co—Mn Oxide Pseudoternary System during Slow Cooling," Chem. Mater. 2013, 25, pp. 912-918.
McCalla et al., "How Phase Transformations during Cooling Affect Li—Mn—Ni—O Positive Electrodes in Lithium Ion Batteries," Journal of the Electrochemical Society, 160 (8), 2013, pp. A1134-A1138.
McCalla et al., "Lithium loss mechanisms during synthesis of layered Li$_x$Ni$_{1-x}$O$_2$ for lithium ion batteries," Solid State Ionics 219, 2012, pp. 11-19.
McCalla et al., "Structural Study of the Li—Mn—Ni Oxide Pseudoternary System of Interest for Positive Electrodes of Li-Ion Batteries," Chem. Mater., 2013, vol. 25, pp. 989-999.
McCalla et al., "The Role of Metal Site Vacancies in Promoting Li—Mn—Ni—O Layered Solid Solutions," Chem. Mater., 2013, vol. 25, pp. 2716-2721.
McCalla et al., "The spinel and cubic rocksalt solid-solutions in the Li—Mn—Ni oxide pseudo-ternary system," Solid State Ionics, vol. 242, 2013, pp. 1-9.
Meng et al., "Combining Ab Initio Computation with Experiments for Designing New Electrode Materials for Advanced Lithium Batteries: LiNi$_{1/3}$Fe$_{1/6}$Co$_{1/6}$Mn$_{1/3}$O$_2$," Journal of the Electrochemical Society, 151 (8), 2004, pp. A1134-A1140.
Mohanty, Debasish et al., "Structural transformation of a lithium-rich Li$_{1.2}$Co$_{0.1}$Mn$_{0.55}$Ni$_{0.15}$O$_2$cathode during high voltage cycling resolved by in situ X-ray diffraction," Journal of Power Sources, vol. 229, 2013, pp. 239-248.
Mueller-Neuhaus et al., "Understanding Irreversible Capacity in Li$_x$Ni$_{1-y}$Fe$_y$O$_2$ Cathode Materials," Journal of The Electrochemical Society, 147 (10), 2000, pp. 3598-3605.
Mulder et al., "Comparison of commercial battery cells in relation to material properties," Electrochimica Acta, vol. 87, 2013, pp. 473-488.
Myung, Seung-Taek et al., "Progress in High-Capacity Core-Shell Cathode Materials for Rechargeable Lithium Batteries," J. Phys. Chem. Lett., vol. 5, 2014, pp. 671-679.
Naghash et al., "Effect of oxygen non-stoichiometry on the electrochemical performance of lithium manganese oxide spinels," Journal of Power Sources, vol. 102, 2001, pp. 68-73.
Noh et al., "Cathode Material with Nanorod Structure—An Application for Advanced High-Energy and Safe Lithium Batteries," Chem. Mater., 2013, vol. 25, pp. 2109-2115.
Noh et al., "Comparison of the structural and electrochemical properties of layered Li[Ni$_x$Co$_y$Mn$_z$]O$_2$ (x=1/3, 0.5, 0.6, 0.7, 0.8 and 0.85) cathode material for lithium-ion batteries," Journal of Power Sources, 2013, vol. 233, pp. 121-130.
Noh et al., "Formation of a Continuous Solid-Solution Particle and its Application to Rechargeable Lithium Batteries," Adv. Funct. Mater., 2013, vol. 23, pp. 1028-1036.
Ochi et al. "Interface Mixing in Fe/LiF Multilayered Thin Film", Journal of The Physical Society of Japan, Jan. 1992, vol. 61, No. 1, pp. 35-38.
Oh et al., Supporting Information "Superior Long-Term Energy Retention and Volumetric Energy Density for Li-Rich Cathode Materials," Nano Lett., 2014, vol. 14, 12 pages.
Oh, Pilgun et al., "Superior Long-Term Energy Retention and Volumetric Energy Density for Li-Rich Cathode Materials," Nano Lett., 2014, vol. 14, pp. 5965-5972.
Ohzuku et al., "Electrochemistry and Structural Chemistry of LiNiO$_2$ (R3̄m) for 4 Volt Secondary Lithium Cells," J. Electrochem. Soc., 140(7), 1993, pp. 1862-1870.
Ohzuku et al., "High-capacity lithium insertion materials of lithium nickel manganese oxides for advanced lithium-ion batteries: toward rechargeable capacity more than 300 mA h g-1" J. Mater. Chem., 2011, vol. 21, pp. 10179-101888.
Ohzuku et al., "Synthesis and Characterization of Li[Ni$_{1/2}$Mn$_{3/2}$]O$_4$ by Two-Step Solid State Reaction," Journal of the Ceramic Society of Japan, 110 (5), 2002, pp. 501-505.
Oishi, Masatsugu et al., "Direct observation of reversible charge compensation by oxygen ion in Li-rich manganese layered oxide positive electrode material, Li$_{1.16}$Ni$_{0.15}$Co$_{0.19}$Mn$_{0.50}$O$_2$," Journal of Power Sources, 276, 2015, pp. 89-94.
Oka, Y. et al., "High-Temperature Cycling Performance of LiNi$_{1/3}$Co$_{1/3}$Mn$_{1/3}$O$_2$ Cathode with DLC Protective Film," Journal of the Electrochemical Society, 162 (2), 2015, pp. A3032-A3037.
Okada, Shigeto et al., "Fluoride Phosphate Li$_2$CoPO$_4$F as a High Voltage Cathode in Li-ion Batteries," Journal of Power Sources, 146, 2005, pp. 565-569.
Okamoto, Kaoru et al., "X-Ray Absorption Fine Structure Study on Layered LiMO$_2$ (M=Ni, Mn, Co) Cathode Materials," Journal of The Electrochemical Society, 153 (6), 2006, pp. A1120-A1127.
Paik et al., "Lithium and Deuterium NMR Studies of Acid-Leached Layered Lithium Manganese Oxides," Chem. Mater., 2002, vol. 14, pp. 5109-5115.
Palacin et al., "Electrochemical and structural study of the 3.3 V reduction step in defective Li$_x$Mn$_2$O$_4$ and LiMn$_2$O$_{(4-y)}$F$_y$ compounds," Journal of Power Sources 81-82, 1999, pp. 627-631.
Palacin et al., "On the role of defects in decreasing the extra 3.3/3.95 and 4.5 V redox steps in L—Mn—O spinels," Journal of Power Sources, 97-98, 2001, pp. 398-401.
Pan et al., "Recent development of LiNi$_x$Co$_y$O$_2$: Impact of micro/nano structures for imparting improvements in lithium batteries," Trans. Nonferrous Met. Soc. China, vol. 23, 2013, pp. 108-119.
Park et al., "Amorphous Metal Fluoride Passivation Coatings Prepared by Atomic Layer Deposition on LiCoO$_2$ for Li-Ion Batteries," Chem. Mater. 2015, 27, pp. 1917-1920.
Park et al., "Improvement of structural and electrochemical properties of AlF$_3$-coated Li[Ni$_{1/3}$Co$_{1/3}$Mn$_{1/3}$]O$_2$ cathode materials on high voltage region," Journal of Power Sources, vol. 178, 2008, pp. 826-831.
Park et al., "Lithium-manganese-nickel-oxide electrodes with integrated layered-spinel structures for lithium batteries," Electrochemistry Communications, vol. 9, 2007, pp. 262-268.
Patnaik, P., "Handbook of Inorganic Chemicals," 2003, McGraw-Hill, NY, NY, pp. 410-413, 428-429, 486-491, 500, 507-508.
Paulsen et al., "Layered Li—Mn-Oxide with the O2 Structure: A Cathode Material for Li-Ion Cells Which Does Not Convert to Spinel," Journal of The Electrochemical Society, 146 (10), 1991, pp. 3560-3565.

(56) References Cited

OTHER PUBLICATIONS

Pouillerie et al., "The $Li_xNi_{1-y}Mg_yO_2$ (y=0.05, 0.10) system: structural modifications observed upon cycling," Solid State Ionics, vol. 132, 2000, pp. 15-29.

Prasad, R. et al., "Dopant-induced stabilization of rhombohedral LiMnO2 against Jahn-Teller distortion," Physical Review B 71, 2005, pp. 134111-1-134111-11.

Qian et al., "Uncovering the roles of oxygen vacancies in cation migration in lithium excess layered oxides" Phys. Chem. Chem. Phys., 2014, vol. 16, pp. 14665-14668.

Ramasamy et al., "Discharge characteristics of silver vanadium oxide cathodes", Journal of Applied Electrochemistry (2006), vol. 36, pp. 487-497; DOI 10.1007/s10800-005-9103-x.

Rangan, S., et al., "Electronic Structure and Chemical Composition of Candidate Conversion Material Iron Oxifluoride", Abstract #1473, 220th ECS Meeting, © The Electrochemical Society, 1 page.

Rashid, Muhammad et al., "Effect of Relaxation Periods over Cycling Performance of a Li-Ion Battery," Journal of The Electrochemical Society, 162 (2), 2015, pp. A3145-A3153.

Riley, Leah A., "Electrochemical effects of ALD surface modification on combustion synthesized $LiNi_{1/3}Mn_{1/3}Co_{1/3}O_2$ as a layered-cathode material," Journal of Power Sources, 196, 2011, pp. 3317-3324.

Robert, Rosa et al., "Enhancement of the high potential specific charge in layered electrode materials for lithium-ion batteries," J. Mater. Chem. A, 2014, 2, pp. 8589-8598.

Rowe, Aaron W. et al., "Positive Electrode Materials in the Li—Mn—Ni—O System Exhibiting Anomalous Capacity Growth during Extended Cycling," Journal of The Electrochemical Society, 161 (3), 2014, pp. A308-A317.

Saavedra-Arias, Jose J. et al., "Synthesis and electrochemical properties of $Li(Ni_{0.8}Co_{0.1\ Mn0.1})O_2$ cathode material: Ex situ structural analysis by Raman scattering and X-ray diffraction at various stages of charge-discharge process," Journal of Power Sources, 183, 2008, pp. 761-765.

Sekizawa, Oki et al., "Crystal and electronic structure change determined by various method for delithiation process of $Li_x(Ni,Mn)O_2$-based cathode material," Journal of Power Sources, 196, 2011, pp. 6651-6656.

Shen, Chong-Heng et al., "Facile Synthesis of The Li-Rich Layered Oxide $Li_{1.23}Ni_{0.09}Co_{0.12}Mn_{0.56}O_2$ with Superior Lithium Storage Performance and New Insights into Structural Transformation of the Layered Oxide Material during Charge-Discharge Cycle: In Situ XRD Characterization" ACS Appl. Mater. Interfaces, 2014, 6 (8), pp. 5516-5524.

Shunmugasundaram, Ramesh et al., "High Capacity Li-Rich Positive Electrode Materials with Reduced First-Cycle Irreversible Capacity Loss," Chem. Mater. 2015, 27, pp. 757-767.

Son, In Hyuk et al., "Self-Terminated Artificial SEI Layer for Nickel-Rich Layered Cathode Material via Mixed Gas Chemical Vapor Deposition," Chem. Mater. 2015, 27, pp. 7370-7379.

Song, Jie et al., "Role of Oxygen Vacancies on the Performance of $Li[Ni_{0.5-x}Mn_{1.5+x}]O_4$ (x=0, 0.05, and 0.08) Spinel Cathodes for Lithium-Ion Batteries," Chem. Mater., 2012, 24 (15), pp. 3101-3109.

Sun et al., "High-energy cathode material for long-life and safe lithium batteries," Nature Materials, vol. 8, 2009, pp. 320-324.

Sun et al., "Nanostructured high-energy cathode materials for advanced lithium batteries," Nature Materials, vol. 11, 2012, pp. 942-947.

Sun et al., "Synthesis and Characterization of $Li[(Ni_{0.8}Co_{0.1}Mn_{0.1})_{0.8}(Ni_{0.5}Mn_{0.5})_{0.2}]O_2$ with the Microscale Core-Shell Structure as the Positive Electrode Material for Lithium Batteries," J. Am. Chem. Soc., 2005, vol. 127, pp. 13411-13418.

Sun et al., "The Role of $AlF_3$ Coatings in Improving Electrochemical Cycling of Li-Enriched Nickel-Manganese Oxide Electrodes for Li-Ion Batteries," Adv. Mater. 2012, 24, pp. 1192-1196.

Sun, Yang-Kook, "Concentration-Gradient Materials," Energy Storage & Conversion Material Laboratory, Hanyang University, (Mar. 30, 2003), 14 pages.

Tan et al., "Highly enhanced low temperature discharge capacity of $LiNi_{1/3}Co_{1/3}Mn_{1/3}O_2$ with lithium boron oxide glass modification," Journal of Power Sources, vol. 277, 2015, pp. 139-146.

Tarascon et al., "Synthesis Conditions and Oxygen Stoichiometry Effects on Li Insertion into the Spinel $LiMn_2O_4$," Journal of Electrochem. Soc., vol. 141, No. 6, Jun. 1994, pp. 1421-1431.

Thackeray et al., "Advances in manganese-oxide 'composite' electrodes for lithium-ion batteries," J. Mater. Chem., 2005, vol. 15, pp. 2257-2267.

Thackeray et al., "Comments on the structural complexity of lithium-rich $Li_{1+x}M_{1-x}O_2$ electrodes (M=Mn, Ni, Co) for lithium batteries," Electrochemistry Communications 8, 2006, pp. 1531-1538.

Thackeray et al., "$Li_2MnO_3$-stabilized $LiMO_2$ (M=Mn, Ni, Co) electrodes for lithium-ion batteries," J. Mater. Chem., 2007, vol. 17, pp. 3112-3125.

Thackeray et al., "$ZrO_2$-and $Li_2ZrO_3$-stabilized spinel and layered electrodes for lithium batteries," Electrochemistry Communications, vol. 5, 2003, pp. 752-758.

Thackeray, M. M., "Structural Considerations of Layered and Spinel Lithiated Oxides for Lithium Ion Batteries," J. Electrochem. Soc., vol. 142, No. 8, Aug. 1995, pp. 2558-2563.

Thursday Morning, Nov. 3, 2011; Energy Frontiers Focus Topic, Room: 103—Session EN+NS—ThM; "Nanostructures for Energy Storage and Fuel Cells I"; Moderator: J. Lewis, RTI International; 1 page.

Van Bommel et al., "Analysis of the Growth Mechanism of Coprecipitated Spherical and Dense Nickel, Manganese, and Cobalt-Containing Hydroxides in the Presence of Aqueous Ammonia," Chem. Mater., 2009, 21, pp. 1500-1503.

Van Bommel et al., "Synthesis of Spherical and Dense Particles of the Pure Hydroxide Phase $Ni_{1/3}Mn_{1/3}Co_{1/3}(OH)_2$," Journal of The Electrochemical Society, 156 (5), 2009, pp. A362-A365.

Van Der Ven et al. "Lithium Diffusion in Layered $Li_xCoO_2$," Electrochemical and Solid-State Letters, 3 (7) (2000), pp. 301-304.

Wang et al., "High capacity double-layer surface modified $Li[Li_{0.2}Mn_{0.54}Ni_{0.13}Co_{0.13}]O_2$ cathode with improved rate capability," Journal of Mater. Chem., 2009, vol. 19, pp. 4965-4972.

Wang et al., "Synthesis of high capacity cathodes for lithium-ion batteries by morphology-tailored hydroxide co-precipitation," Journal of Power Sources, vol. 274, 2015, pp. 451-457.

Wang et al., "Synthesis of Lithium and Manganese-Rich Cathode Materials via an Oxalate Co-Precipitation Method," Journal of The Electrochemical Society, 160 (5), 2013, pp. A3108-A3112.

Wang et al., "Synthesis optimization of $Li_{1+x}[Mn_{0.45}Co_{0.40}Ni_{0.15}]O_2$ with different spherical sizes via co-precipitation," Powder Technology, vol. 187, 2008, pp. 124-129.

Wei et al., "Kinetics Tuning of Li-ion Diffusion in Layered $Li(Ni_xMn_yCo_z)O_2$," J. Am. Chem. Soc., 2015, vol. 137, pp. 8364-8367.

Wiaderek et al. "Comprehensive Insights into the Structural and Chemical Changes in Mixed-Anion FeOF Electrodes by Using Operando PDF and NMR Spectroscopy", Journal of the American Chemical Society, 2013, 135, pp. 4070-4078.

Wiaderek, K. M., et al. "Comprehensive Insights into the Structural and Chemical Changes in Mixed-Anion FeOF Electrodes by Using Operando PDF and NMR Spectroscopy", Journal of the American Chemical Society, Jan. 8, 2013, 22 pages.

Wilcox et al., "Structure and Electrochemistry of $LiNi_{1/3}Co_{1/3-L\ My}Mn_{1/3}O_2$ (M=Ti, Al, Fe) Positive Electrode Materials," Journal of The Electrochemical Society, 156 (3), 2009, pp. A192-A198.

Wilcox et al., "The Impact of Aluminum and Iron Substitution on the Structure and Electrochemistry of $Li(Ni_{0.4}Co_{0.2-y}M_yMn_{0.4})O_2$ Materials," Journal of The Electrochemical Society, 156 (12) 2009, pp. A1011-A1018.

Wolf-Goodrich et al., "Tailoring the surface properties of $LiNi_{0.4}Mn_{0.4}Co_{0.2}O_2$ by titanium substitution for improved high voltage cycling performance," Phys.Chem.Chem.Phys., 2015, vol. 17, pp. 21778-21781.

Woo et al., "Improvement of electrochemical and thermal properties of $Li[Ni_{0.8}Co_{0.1}Mn_{0.1}]O_2$ positive electrode materials by multiple metal (Al, Mg) substitution," Electrochimica Acta, 54, 2009, pp. 3851-3856.

(56) References Cited

OTHER PUBLICATIONS

Wu et al., "Effect of $Ni^{2+}$ Content on Lithium/Nickel Disorder for Ni-Rich Cathode Materials," ACS Appl. Mater. Interfaces, 2015, vol. 7, pp. 7702-7708.

Wu et al., "Effect of precursor and synthesis temperature on the structural and electrochemical properties of $Li(Ni_{0.5}Co_{0.2}Mn_{0.3})O_2$," Electrochimica Acta, 75, 2012, pp. 393-398.

Wu et al., "Sol-gel Synthesis of $Li_2CoPO_4F/C$ Nanocomposite as a High-Power Cathode Material for Lithium Ion Batteries," Journal of Power Sources, vol. 220, 2012, pp. 122-129.

Wu et al., "Structural stability of chemically delithiated layered $(1-z)Li[Li_{1/3}Mn_{2/3}]O_2$—$zLi[Mn_{0.5-y}Co_{2y}]O_2$ solid solution cathodes," Journal of Power Sources, 183, 2008, pp. 749-754.

Xiang et al., "Understanding the Effect of $Co^{3+}$ Substitution on the Electrochemical Properties of Lithium-Rich Layered Oxide Cathodes for Lithium-Ion Batteries," J. Phys. Chem. C, 2014, 118, pp. 21826-21833.

Xiong et al., "A modified LiF coating process to enhance the electrochemical performance characteristics of $LiNi_{0.8}Co_{0.1}Mn_{0.1}O_2$ cathode materials," Materials Letters, 110, 2013, pp. 4-9.

Xu et al., "Identifying surface structural changes in layered Li-excess nickel manganese oxides in high voltage lithium ion batteries: A joint experimental and theoretical study," Energy Environ. Sci., 2011, DOI: 10.1039/c1ee01131f; 11 pages.

Yabuuchi et al., "High-capacity electrode materials for rechargeable lithium batteries: $Li_3NbO_4$-based system with cation-disordered rocksalt structure," PNAS, vol. 112, No. 25, Jun. 23, 2015, pp. 7650-7655.

Yabuuchi et al., "Novel lithium insertion material of $LiCo_{1/3}Ni_{1/3}Mn_{1/3}O_2$ for advanced lithium-ion batteries," Journal of Power Sources 119-121, 2003, pp. 171-174.

Yan et al., "Atomic-Resolution Visualization of Distinctive Chemical Mixing Behavior of Ni, Co, and Mn with Li in Layered Lithium Transition-Metal Oxide Cathode Materials," Chem. Mater., 2015, 27 (15), pp. 5393-5401.

Yan et al., "Recent progress in Li-rich layered oxides as cathode materials for Li-ion batteries," RSC Adv., 2014, 4, pp. 63268-63284.

Yang, Feifei et al., "Nanoscale Morphological and Chemical Changes of High Voltage Lithium-Manganese Rich NMC Composite Cathodes with Cycling," Nano Lett., 2014, 14, pp. 4334-4341.

Yang, Xiao-Qing et al., "Crystal structure changes of $LiMn_{0.5}Ni_{0.5}O_2$ cathode materials during charge and discharge studied by synchrotron based in situ XRD," Electrochemistry Communications, vil. 4, 2002, pp. 649-654.

Yang, Yuan et al., "A membrane-free lithium/polysulfide semi-liquid battery for large-scale energy storage," Energy Environ. Sci., 2013, vol. 6, pp. 1552-1558.

Yano et al., "Surface Structure and High-Voltage Charge/Discharge Characteristics of Al-Oxide Coated $LiNi_{1/3}Co_{1/3}Mn_{1/3}O_2$ Cathodes," Journal of The Electrochemical Society, 162 (2), 2015, pp. A3137-A3144.

Ye et al., "Ni-induced stepwise capacity increase in Ni-less Li-rich cathode materials for high performance lithium ion batteries," Nano Research, 2014, DOI: 10.1007/s12274-014-0563-3; 24 pages.

Yin et al., "X-ray/Neutron Diffraction and Electrochemical Studies of Lithium De/Re-Intercalation in $Li_{1-x}Co_{1/3}Ni_{1/3}Mn_{1/3}O_2$ (x=0→1)", Chem. Mater. 2006, 18, pp. 1901-1910.

Yoon et al. "Investigation of the Charge Compensation Mechanism on the Electrochemically Li-Ion Deintercalated $Li_{1-x}Co_{1/3}Ni_{1/3}Mn_{1/3}O_2$ Electrode System by Combination of Soft and Hard X-ray Absorption Spectroscopy", J. Am. Chem. Soc., 2005, vol. 127, pp. 17479-17487.

Yoon et al., "Electronic structural changes of the electrochemically Li-ion deintercalated $LiNi_{0.8}Co_{0.15}Al_{0.05}O_2$ cathode material investigated by X-ray absorption spectroscopy," Journal of Power Sources, 174, 2007, pp. 1015-1020.

Yoon et al., "Improved Performances of $Li[Ni_{0.65}Co_{0.08}Mn_{0.27}]O_2$ Cathode Material with Full Concentration Gradient for Li-Ion Batteries," Journal of The Electrochemical Society, 162 (2), 2015, pp. A3059-A3063.

Yoon et al., "In Situ X-ray Absorption Spectroscopic Study on $LiNi_{0.5}Mn_{0.5}O_2$ Cathode Material during Electrochemical Cycling," Chem. Mater., 2003, vol. 15, pp. 3161-3169.

Yoon et al., "Investigation of the Local Structure of the $LiNi_{0.5}Mn_{0.5}O_2$ Cathode Material during Electrochemical Cycling by X-Ray Absorption and NMR Spectroscopy," Electrochemical and Solid-State Letters, 5 (11), 2002, pp. A263-A266.

Yoon et al., "Li MAS NMR and in situ X-ray studies of lithium nickel manganese oxides," Journal of Power Sources 119-121, 2003, pp. 649-653.

Yu, Haijun et al., "Study of the lithium/nickel ions exchange in the layered $LiNi_{0.42}Mn_{0.42}Co_{0.16}O_2$ cathode material for lithium ion batteries: experimental and first-principles calculations" Energy Environ. Sci., 2014, vol. 7, pp. 1068-1078.

Yue, Peng et al., "A low temperature fluorine substitution on the electrochemical performance of layered $LiNi_{0.8}Co_{0.1}Mn_{0.1}O_{2-z}F_z$ cathode materials," Electrochimica Acta, vol. 92, 2013, pp. 1-8.

Yue et al., "Effect of fluorine on the electrochemical performance of spherical LiNi0.8Co0.1Mn0.1O2 cathode materials via a low temperature method", Powder Technology, vol. 237, 2013 pp. 623-626.

Yue et al., "Growth mechanisms for spherical mixed hydroxide agglomerates prepared by co-precipitation method: A case of $Ni_{1/3}Co_{1/3}Mn_{1/3}(OH)_2$", Journal of Alloys and Compounds, vol. 619, 2015, pp. 846-853.

Zhang et al., "Self-Assembled Hollow Spheres of $\beta$-$Ni(OH)_2$ and Their Derived Nanomaterials," Chem. Mater., 2009, vol. 21, pp. 871-883.

Zhang et al., "Surface nitridation of Li-rich layered $Li(Li_{0.17}Ni_{0.25}Mn_{0.58})O_2$ oxide as cathode material for lithium-ion battery", J. Mater. Chem., 2012, vol. 22, pp. 13104-13109.

Zhao et al., "Enhanced Electrochemical Performance of $Li[Li_{0.2}Ni_{0.2}Mn_{0.6}]O_2$ Modified by Manganese Oxide Coating for Lithium-Ion Batteries," Electrochemical and Solid-State Letters, vol. 14 (1), 2011, pp. A1-A5.

Zhou et al., "Advantages of Simultaneous Substitution of Co in $Li[Ni_{1/3}Mn_{1/3}Co_{1/3}]O_2$ by Ni and Al," Electrochemical and Solid-State Letters, 12 (4), 2009, pp. A81-A83.

Zhou et al., "Coprecipitation Synthesis of $Ni_xMn_{1-x}(OH)_2$ Mixed Hydroxides," Chem. Mater., vol. 22, No. 3, 2010, pp. 1015-1021.

Zhou et al., "Solid-State Synthesis as a Method for the Substitution of Al for Co in $LiNi_{1/3}Mn_{1/3}Co_{(1/3-z)}Al_zO_2$," Journal of The Electrochemical Society, 156 (10), 2009, pp. A796-A801.

Zhou et al., "The effect of Al substitution on the reactivity of delithiated $LiNi_{1/3}Mn_{1/3}Co_{(1/3-z)}Al_zO_2$ with non-aqueous electrolyte," Electrochemistry Communications 10 (2008), pp. 1168-1171.

Zhu et al., "Positive Electrode Passivation by LiDFOB Electrolyte Additive in High-Capacity Lithium-Ion Cells," Journal of The Electrochemical Society, 159 (12), 2012, pp. A2109-A2117.

* cited by examiner

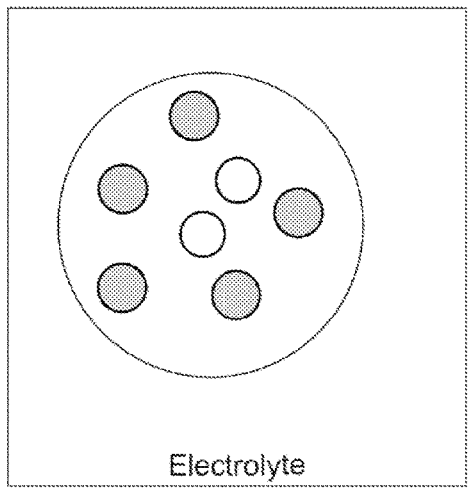
Electrolyte
Discharged
FIG. 3A
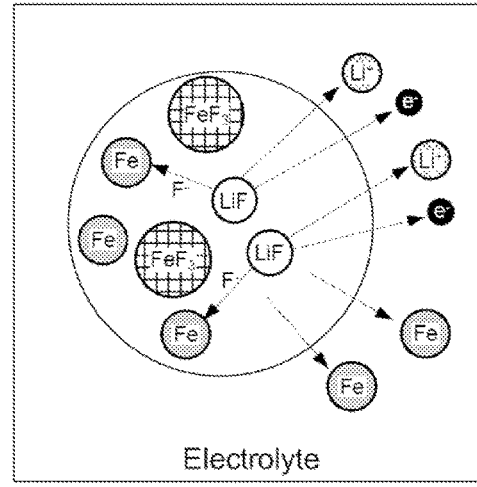
Electrolyte
Charging
FIG. 3B
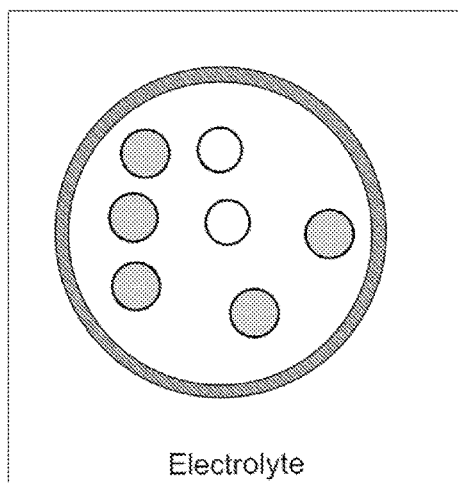
Electrolyte
Discharged
FIG. 4A
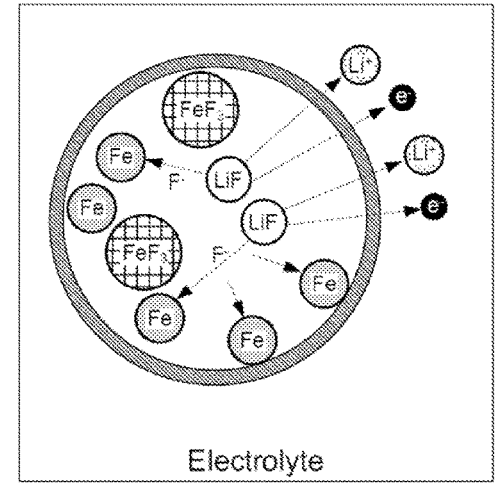
Electrolyte
Charging
FIG. 4B
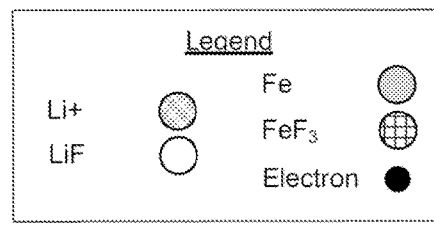

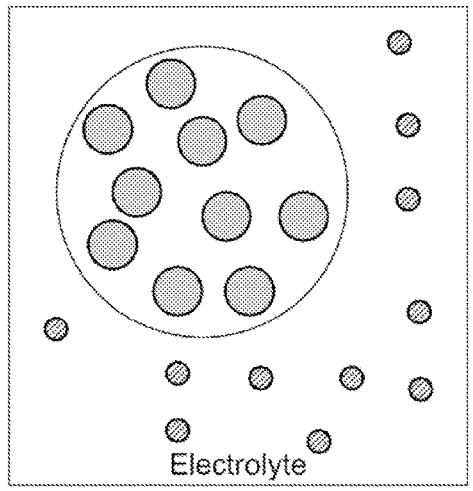
FIG. 5A
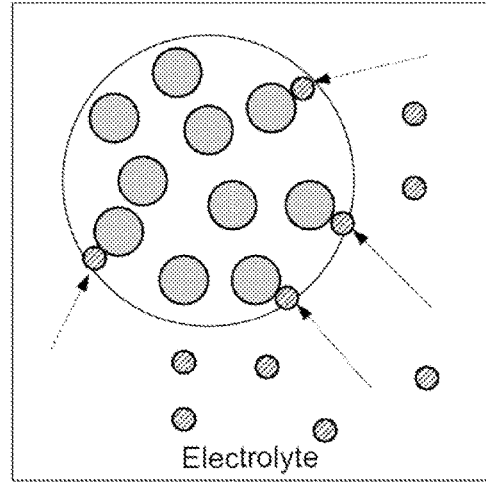
FIG. 5B
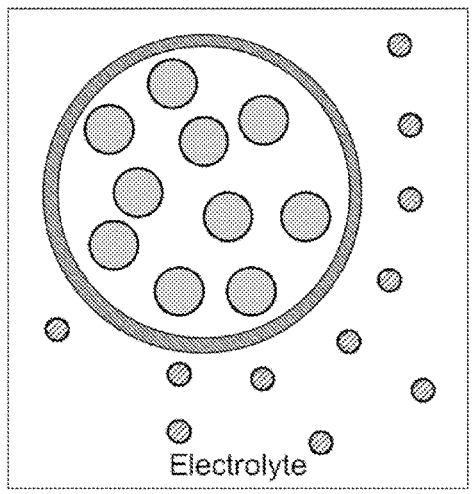
FIG. 6A
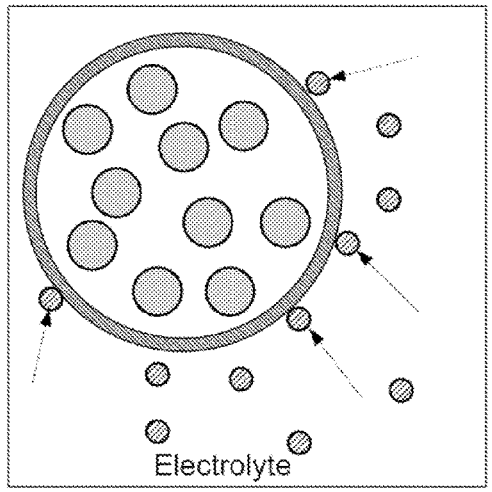
FIG. 6B
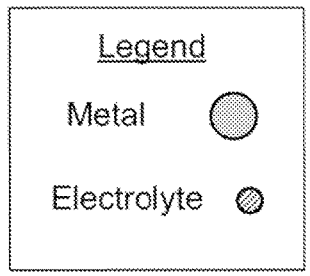

US 10,511,012 B2

PROTECTIVE COATINGS FOR CONVERSION MATERIAL CATHODES

RELATED APPLICATION INFORMATION

This application is a continuation of U.S. patent application Ser. No. 14/272,518, filed on May 8, 2014, and titled "PROTECTIVE COATINGS FOR CONVERSION MATERIAL CATHODES," which is a continuation-in-part of U.S. patent application Ser. No. 13/922,214, filed on Jun. 19, 2013, and titled "NANOSTRUCTURED MATERIALS FOR ELECTROCHEMICAL CONVERSION REACTIONS," which claims benefit of the following U.S. Provisional Patent Applications under 35 U.S.C. § 119(e): U.S. Provisional Patent Application No. 61/674,961, filed Jul. 24, 2012, and titled "NANOSCALE LITHIUM COMPOUND AND METAL ELECTRODES," and U.S. Provisional Patent Application No. 61/814,821, filed Apr. 23, 2013, and titled "NANOSTRUCTURED MATERIALS FOR ELECTROCHEMICAL CONVERSION REACTIONS." Each of the prior applications is incorporated by reference herein in its entirety and for all purposes.

BACKGROUND OF THE INVENTION

Many battery types have been developed and used, with their respective advantages and disadvantages. Due to its high charge density, lithium has been used in various battery types. In a rechargeable lithium-ion battery, lithium ions move from the negative electrode to the positive electrode during discharge. Unfortunately, conventional battery systems and their manufacturing and processes result in relatively high-cost, low-energy-density batteries that do not meet market demands for many applications.

Another type of battery employs a conversion material, which undergoes a conversion reaction with lithium or another transport ion. Conversion materials may have lower cost and higher energy density than conventional lithium-ion batteries but some aspects of their performance require improvement.

SUMMARY

One aspect is an energy storage device including an anode, an electrolyte, and a cathode, which includes a plurality of coated electrochemically active material particles. Each particle has a core which includes conversion material and the coating. In many embodiments, the coating selectively isolates the conversion material from the electrolyte and the capacity of the active material is greater than about 300 mAh/g. In some embodiments, the cathode further includes an ion conductor and/or an electron conductor. In some embodiments, the cathode further includes a current collector. In some embodiments, the particles have a median diameter of between about 100 nm and about 1000 nm. In certain embodiments, the particles have a median diameter of between about 200 nm and about 300 nm.

In many embodiments, the conversion material includes a sulfide, oxide, halide, phosphide, nitride, chalcogenide, oxysulfide, oxyfluoride, sulfur-fluoride, or sulfur-oxyfluoride. The conversion material may include a lithium compound of these anions (particularly in the discharged state) and/or a metal compound of these anions (particularly in the charged state). Examples of suitable metals include iron, manganese, copper, and cobalt. In some embodiments, the conversion material contains a fluoride such as ferric fluoride, or ferrous fluoride, or $LiFeF_3$, or $Li_3FeF_6$, in a charged state.

In various embodiments, the conversion material may be characterized as a metal component and a lithium compound component intermixed with the metal component. In some embodiments, the metal component is iron, nickel or copper. In some embodiments, the lithium compound component is a lithium halide, lithium sulfide, lithium sulfur-halide, lithium oxide, lithium nitride, lithium phosphide, or lithium selenide.

In various embodiments, the median thickness of the coating is between about 0.5 nm and about 15 nm, across all the particles. In some embodiments, the coating may include two or more layers, each layer having a median thickness between about 0.5 nm and about 15 nm. As examples, the coating may include an oxide, a phosphate, or a fluoride. In some embodiments, the coating as formed is partially lithiated. In some embodiments, the coating as fabricated is no more than 50% lithiated. In some embodiments, the coating is lithiated by intercalation, alloy incorporation, ionic bond formation, or mixture formation. In some embodiments, the coating includes aluminum oxide ($Al_xO_y$) or aluminum phosphate ($Al_x(PO_4)_y$) and/or aluminum fluoride ($AlF_x$), which may or may not be lithiated. For example, the coating may include $Al_2O_3$, $AlPO_4$, $AlF_3$ and/or stoichiometric variants of any of these. In many embodiments, the coating is deposited using bath coating, spray coating, or atomic layer deposition at a temperature less than about 300° C. In some embodiments, the coating is deposited using spray coating or precipitation. It should be understood that the coating materials disclosed herein may vary slightly from the recited stoichiometries.

The coating may have an electronic conductivity of at least about $10^{-8}$ S/cm. In some embodiments, the coating has an ionic conductivity of iron(II) ions of no greater than about $10^{-8}$ S/cm. In some embodiments, the coating has an ionic conductivity of lithium ions of at least about $10^{-8}$ S/cm.

The coating may have a diffusion coefficient for lithium ions between about $10^{-10}$ and about $10^{-5}$ cm²/s. In some embodiments, the coating has a diffusion coefficient for iron(II) ions between about $10^{-14}$ and about $10^{-9}$ cm²/s. In many embodiments, the median coating coverage is at least about 90% of the surface area of the particles.

Another aspect of this disclosure is an energy storage device including an anode, an electrolyte, and a cathode, which includes an ion conductor, a current collector, electrochemically active conversion material, and a coating. In many embodiments, the coating selectively isolates the electrochemically active material from the electrolyte, and the capacity of the active conversion material is greater than about 300 mAh/g. In some embodiments, the cathode forms a substantially continuous sheet, substantially coextensive with and overlapping the electrolyte.

In many embodiments of this aspect, the conversion material includes a sulfide, oxide, halide, phosphide, nitride, chalcogenide, oxysulfide, oxyfluoride, sulfur-fluoride, or sulfur-oxyfluoride. The conversion material may include a lithium compound of these anions (particularly in the discharged state) and/or a metal compound of these anions (particularly in the charged state). Examples of suitable metals include iron, nickel, manganese, copper, and cobalt. In some embodiments, the conversion material contains a fluoride such as nickel fluoride, copper fluoride, ferric fluoride or ferrous fluoride.

In various embodiments of this aspect, the conversion material may be characterized as a metal component and a lithium compound component intermixed with the metal component. In many embodiments, the metal component is iron, nickel, copper, or an alloy of one of those metals. In various embodiments, the lithium compound component is a lithium halide, lithium sulfide, lithium sulfur-halide, lithium oxide, lithium nitride, lithium phosphide, or lithium selenide.

The coating may include an oxide, a phosphate, or a fluoride. In some embodiments, the coating is lithiated. In some embodiments, the coating is partially lithiated. In some embodiments, the coating is at least about 50% lithiated. In various embodiments, the coating includes aluminum oxide ($Al_xO_y$), or aluminum phosphate ($Al_x(PO_4)_y$), and/or aluminum fluoride ($AlF_x$), which may or may not be lithiated. For example, the coating may include $Al_2O_3$, $AlPO_4$, and/or $AlF_3$. In many embodiments, the coating is deposited using bath coating, spray coating, or atomic layer deposition at a temperature less than about 300° C. In some embodiments, the coating is deposited using spray coating or precipitation.

The coating in this aspect may have an electronic conductivity of at least about $10^{-8}$ S/cm. In some embodiments, the coating has an ionic conductivity of iron(II) ions of no greater than about $10^{-8}$ S/cm. In some embodiments, the coating has an ionic conductivity of lithium ions of at least about $10^{-8}$ S/cm. The coating may have a diffusion coefficient for lithium ions between about $10^{-10}$ and about $10^{-5}$ cm$^2$/s. In some embodiments, the coating has a diffusion coefficient for iron(II) ions between about $10^{-14}$ and about $10^{-9}$ cm$^2$/s. In some embodiments, the thickness of the coating is between about 0.5 nm and about 15 nm. In some embodiments, the coating includes two or more layers, each layer having a thickness between about 0.5 nm and about 15 nm.

Another aspect of this disclosure is a method of preparing an electrochemically active material component of a cathode in an energy storage device by providing electrochemically active material particles, each particle including a core which includes conversion material; and depositing a coating on each particle, such that the coating includes one of $Al_xO_y$, $AlF_x$, or $Al_x(PO_4)_y$. For example, the coating may include $Al_2O_3$, $AlPO_4$, and/or $AlF_3$. In some embodiments, the coating is deposited by spray coating, or bath coating, or ALD. In many embodiments, the coating is deposited to a thickness of between about 0.5 nm and about 15 nm. In some embodiments, the coating includes two or more layers, each layer having a thickness between about 0.5 nm and about 15 nm.

Another aspect is a method of preparing an electrochemically active material component of a cathode in an energy storage device by providing electrochemically active material particles, each particle including a core including conversion material; and depositing a coating on each particle, such that the coating is partially lithiated. In many embodiments, the coating is deposited to a thickness of between about 0.5 nm and about 15 nm. In some embodiments, the coating includes two or more layers, each layer having a thickness between about 0.5 nm and about 15 nm. In some embodiments, the coating is deposited using spray coating, bath coating, or ALD. In some embodiments, the coating includes one of $Al_xO_y$, $AlF_x$, or $Al_x(PO_4)_y$. For example, the coating may include $Al_2O_3$, $AlPO_4$, and/or $AlF_3$. In some embodiments, the coating is deposited at a temperature less than about 300° C.

Another aspect is a method of fabricating a cathode of an energy storage device, by providing an electrochemically active material layer including conversion material on a substrate, and depositing a coating on the substrate by physical vapor deposition (PVD), where the coating includes one of $Al_xO_y$, $AlF_x$, or $Al_x(PO_4)_y$. For example, the coating may include $Al_2O_3$, $AlPO_4$, and/or $AlF_3$. In many embodiments, the coating is deposited to a thickness of between about 0.5 nm and about 15 nm. In some embodiments, the coating includes two or more layers, each layer having a thickness between about 0.5 nm and about 15 nm. In some embodiments, the coating is deposited using spray coating, bath coating, or ALD. In some embodiments, the coating is deposited at a temperature less than about 300° C.

These and other aspects are described further below with reference to the drawings.

BRIEF DESCRIPTION OF THE DRAWINGS

FIGS. 3A and 3B are schematic illustrations of a metal migration phenomenon.

FIGS. 4A and 4B are schematic illustrations of cathodes in accordance with disclosed embodiments.

FIGS. 5A and 5B are schematic illustrations of an electrolyte reaction phenomenon.

FIGS. 6A and 6B are schematic illustrations of cathodes in accordance with disclosed embodiments.

DETAILED DESCRIPTION

Introduction

Figure 1A:
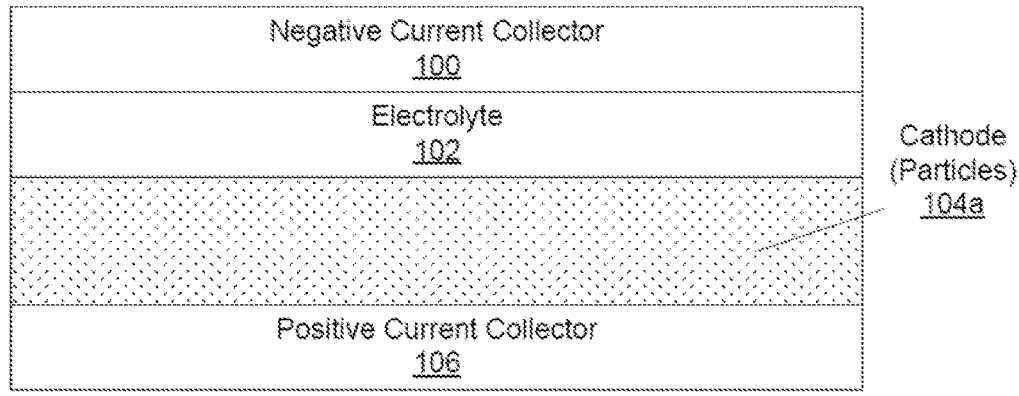
FIGS. 1A and 1B are schematic illustrations of electrochemical cells.

The following description is presented to enable one of ordinary skill in the art to make and use the disclosed embodiments and to incorporate it in the context of particular applications. Various modifications, as well as a variety of uses in different applications will be readily apparent to those skilled in the art, and the general principles defined herein may be applied to a wide range of embodiments. Thus, the disclosed embodiments are not intended to be limited to the embodiments presented, but are to be accorded the widest scope consistent with the principles and novel features disclosed herein.

In the following detailed description, numerous specific details are set forth in order to provide a more thorough understanding of the disclosed embodiments. However, it will be apparent to one skilled in the art that the disclosed embodiments may be practiced without necessarily being limited to these specific details. In other instances, well-known structures and devices are shown in block diagram form, rather than in detail, in order to avoid obscuring the disclosed embodiments.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35

U.S.C. § 112(f). In particular, the use of "step of" or "act of" in the claims herein is not intended to invoke the provisions of 35 U.S.C. § 112(f).

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Batteries and their electrodes undergo electrochemical transitions during discharge and, in the case of secondary or rechargeable batteries, charge. Due to its high charge density, lithium has been used in various battery types. A lithium-ion battery may include a cathode of insertion material or intercalation material. Insertion or intercalation material may be molecules which may be included between other molecules. In a rechargeable lithium-ion battery, lithium ions move from the anode (or negative electrode) to the cathode (or positive electrode) during discharge. Unfortunately, conventional lithium-ion batteries typically have a relatively high cost and low energy density, and therefore may not meet demands for many applications. The present disclosure concerns cathodes having coatings, which may outperform not only intercalation materials but also uncoated conversion materials. In some cases, the coating prevents a metal material from leaving cathode particles and/or prevents electrolyte from detrimentally reacting with components in the cathode particles. As a consequence, the material exhibits increased capacity and increased ion conductivity. In one example, the conversion material is ferric fluoride in a lithium-$FeF_3$ cell and the coating is a thin material such as aluminum oxide or lithium oxide.

Cathodes contain materials that participate in reactions that facilitate charge and discharge to produce electrical energy, and such materials may be broadly termed "active materials" or "electrochemically active materials." In various embodiments, about 90% of a cathode may include active material. Cathodes may contain high capacity active material that reversibly undergoes a redox reaction at a high rate over many cycles of charge and discharge. Such materials are sometimes referred to herein as "conversion" materials. They generally have lower cost and higher energy density than cathode materials in conventional lithium-ion batteries. Another example of an active material is an intercalation material. As used herein, a "conversion" material is one that, in an electrochemical reaction with lithium, may undergo a phase change and at least a portion of the metal component undergoes a change of oxidation state. A conversion reaction may be represented as Li+AB → LiA+B. A conversion material as used herein is distinguished from a formation material (Li+A → LiA) or an intercalation material (Li+AB → LiAB).

In general, intercalation and/or conversion materials may be used in battery systems. For example, a cathode material may be used for intercalation or conversion with lithium. Intercalation materials, which can be prepared at a macro scale or at a nano scale, typically have relatively low energy density (e.g., less than about 800 Wh/kg of active material).

Conversion materials, in contrast, can provide much higher energy density (e.g., about 1000 Wh/kg to 2500 Wh/kg of active material). Battery systems and structures utilizing conversion material are described in U.S. patent application Ser. No. 14/207,493, filed on Mar. 12, 2014, titled "IRON, FLUORINE, SULFUR COMPOUNDS FOR BATTERY CELL CATHODES"; U.S. Provisional Patent Application No. 61/674,961, filed on Jul. 24, 2012, and titled "NANOSCALE LITHIUM COMPOUND AND METAL ELECTRODES"; and U.S. patent application Ser. No. 13/922,214, filed on Jun. 19, 2013, and titled "NANOSTRUCTURED MATERIALS FOR ELECTROCHEMICAL CONVERSION REACTIONS," all of which are incorporated by reference herein in their entireties.

Cell Structure Types

In various embodiments, the cathode includes particles of electrochemically active material. FIG. 1A shows an example of a cell format, which includes negative current collector 100, electrolyte 102, cathode 104a including particles, and positive current collector 106. The negative current collector 100 contacts the electrolyte 102, which in turn contacts the cathode layer including its constituent particles 104a. The cathode layer of particles 104a also contacts the positive current collector 106. The cathode may include an additive to improve electronic conductivity between the active cathode particles and the positive current collector. Such an additive may be a carbon particle or a mixed electron-ion conductor (MEIC).

An electrolyte separates the anode from the cathode, is ionically conductive, and is electronically resistive. It allows transport of ions that participate in electrochemical reactions at the anode and cathode during charge and discharge. Some batteries contain a single electrolyte, which contacts the anode and the cathode. Other batteries contain two or more physically separate electrolytes having different compositions. For example, a battery may have an anolyte contacting the anode and a catholyte contacting the cathode, where the anolyte and catholyte are separated by in ionically conductive barrier that prevents mixing. Electrolytes typically exist in a liquid, solid, or gel state. Batteries containing two different electrolytes may employ different phases. For example, a catholyte may be solid while the remainder of the electrolyte (which may be an anolyte) may be a liquid. As used herein, the term 'electrolyte' includes anolyte, catholyte, separator electrolyte, and any other material having the above characteristics in a battery.

In some embodiments, the cell includes a single liquid phase electrolyte, often in conjunction with an intercalation type anode. In such embodiments, a porous separator may be used to prevent contact between the anode and cathode.

In some embodiments, a two-phase electrolyte may be used. In one example, the cathode includes a liquid catholyte surrounding the particles of active cathode material, and the catholyte may be separated from the anode by a layer of solid state electrolyte. The catholyte and cathode particles together form a cathode layer as depicted in layer 104a and the electrolyte layer may correspond to layer 102 as shown in FIG. 1A. The liquid phase catholyte material is conductive to ions but may be insufficiently conductive to electrons, in which case an additive, such as carbon or another electronically conductive material, may be added to the cathode. In embodiments employing lithium or another metal anode, the solid state portion of the separator or electrolyte may help prevent metal dendrites from forming.

Catholyte compositions may include carbonate electrolytes (e.g., EC (ethylene carbonate), DEC (diethyl carbonate), DMC (dimethyl carbonate), EMC (ethyl methyl carbonate), VC (vinylene carbonate), FEC (fluoroethylene carbonate), PC (propylene carbonate) with salts such as LiTFSI (lithium bis(trifluoromethanesulfonyl)imide), LiPF6 (lithium hexafluorophosphate), LiBOB (lithium bis(oxalato) borate), LiODFB (lithium oxalyldifluoroborate), LiFAP (lithium fluoroalkylphosphate), LiFSI (lithium bis(fluorosulfonyl)imide), etc.) or non-carbonate electrolytes (e.g., ionic liquids, siloxanes, ethers, nitriles, glymes, etc.). Catholytes may have high voltage and low voltage stability (down to about 1V since the cathode may operate down to a low voltage limit, and up to about 4.5V or greater). Some species for catholyte compositions have high temperature stability, such as siloxanes and other organosilicons.

As mentioned, a solid phase electrolyte may be used. Various solid phase electrolytes are described in U.S. Provisional Patent Application No. 61/778,455, filed on Mar. 13, 2013, and U.S. patent application Ser. No. 14/207,493, filed on Mar. 12, 2014, titled "IRON, FLUORINE, SULFUR COMPOUNDS FOR BATTERY CELL CATHODES" which are incorporated herein by reference in their entireties. Examples of solid phase electrolytes that conduct $Li^+$ include $Li_{10}XP_2S_{12}$ (LXPS, X=Si, Ge, Sn, and combinations thereof), $Li_{10}SiP_2S_{12}$ (LSPS), and LiPON (lithium phosphorus oxynitride). Carbon or carbon materials may be added to improve the electronic conductivity.

Figure 1B:
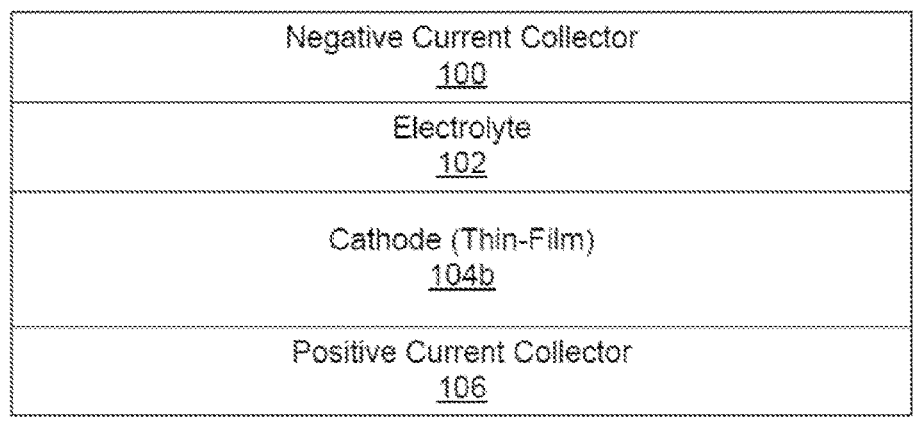

FIG. 1B schematically depicts a thin-film cell format. In various embodiments, a thin-film of electrochemically active cathode material 104b is provided between a positive current collector 106 and a thin protective layer (not shown but described in more detail below). The cathode thin film may be a continuous and non-particulate layer. The protective layer may contact an electrolyte 102, which may be in solid phase or liquid phase. The electrolyte 102, in turn, contacts an anode or negative current collector 100. If the electrolyte 102 contacts the negative current collector 100, it may do so only in the discharged state. In a charged state, a metallic anode (not shown) may be deposited in between the electrolyte 102 and the negative current collector 100. Lithium is one example of such a metallic anode material. In various embodiments, the cathode layer may have a thickness of about 1 micrometer or less, or about 500 nanometers or less, or about 200 nanometers or less.

Conversion Materials

When considered across a range of states of charge, the conversion material may be viewed as including an oxidizing species, a reducing cation species, and a metal species. These species are sometimes referred to herein as constituents or components. As disclosed herein, such materials also include a protective coating layer on the surface of the cathode that partially isolates or protects the conversion material from the electrolyte and thereby improves conductivity. This section describes conversion materials in general terms usually without reference to coatings, which are described in a later section.

The oxidizing species is typically a strongly electronegative element, compound, or anion. Examples of oxidizing species anions include halide ions (fluorides, chlorides, bromides, and iodides), oxide ions, sulfide ions, and the like. The reducing cation species is typically an electropositive element or cation such as lithium, sodium, potassium, or magnesium, and ions thereof. The metal species is typically less electropositive than the reducing cation species. Transition metals are sometimes used as the metal species. Examples include cobalt, copper, nickel, manganese, and iron.

The conversion material may contain two or more oxidizing species, two or more reducing cation species, and/or two or more metal species. In some embodiments, the discharged conversion material includes a metal component and a lithium compound component.

Cathode conversion materials may exist in a discharged state, a charged state, or an intermediate charge state. In some cases, a battery is designed or operated so that full discharge is never attained. Thus, if the fully charged conversion material is ferric fluoride ($FeF_3$), for example, the "fully" discharged cathode may contain a mixture of elemental iron (Fe), lithium fluoride (LiF), possibly some ferric fluoride ($FeF_3$), and possibly some ferrous fluoride ($FeF_2$). The use of "discharged" or "discharged state" herein is a relative term, referring only to a state of a conversion material that is more discharged than a charged state of the conversion material. The use of "charged" or "charged state" herein refers to a state of a conversion material that is more charged than a corresponding discharged state of the material.

In the discharged state, the metal species is generally more reduced than in the charged state. For example, the metal species may be an elemental state or have a lower oxidation state (e.g., +2 rather than +3). Further, during discharge, the oxidizing species may pair with the reducing cation species and unpair from the metal species. Also during discharge, the reducing cation species may tend to move into the cathode where it becomes oxidized by pairing with the oxidizing species. Pairing is typically manifest by formation of a chemical bond, such as a covalent or ionic bond.

In certain implementations, the conversion material in the discharged state includes an elemental metal material, one or more oxidizing species, and a reducing cation material. As an example, the discharge state may include at least an elemental metal such as iron (Fe) and a reducing cation halide such as lithium fluoride (LiF). The components of the discharged conversion material may be intimately distributed with one other in the discharged material. These materials may be intermixed or distributed at a scale of about 20 nm or smaller.

In the charged state, the metal species may tend to pair with the oxidizing species, often forming a compound. During charging, the oxidizing species tends to unpair from the reducing cation species and pair with the metal species. The reducing cation species tend to move out of the cathode and migrate and/or diffuse to the anode, where they exist in a more strongly reduced state (e.g., as an elemental metal such as lithium metal, or lithium inserted in a matrix of carbon or silicon).

As an example, during charge, elemental iron (Fe) may pair with fluorine anions ($F^-$) to form ferric fluoride ($FeF_3$) and/or ferrous fluoride ($FeF_2$). The cathode may also include $LiFeF_3$, $Li_3FeF_6$, or similar lithiated compound in a charged state. In some examples, the lithiated iron compound has a lithium to iron atomic ratio of between about 1:1 and about 3:1. Concurrently, fluoride anions ($F^-$) may unpair from a reducing cation metal species such as lithium of lithium fluoride (LiF). The newly freed lithium cation ($Li^+$) may then migrate and/or diffuse to the anode, where it is reduced to elemental lithium (Li) or a lithium intercalation material.

Chemical Reaction and Properties

In the charged state, the conversion material contains a compound of a metal. In some embodiments, the electrochemical charge-discharge reaction at the cathode may be represented, without stoichiometry considerations, by the following reaction:

$$M + LiX \longleftrightarrow MX + Li^+ + e^- \quad (1)$$

where M is the metal species and X is the oxidizing species, e.g., an anion or electron-rich species of an element such as a halide, oxygen, sulfur, phosphorus, nitrogen, selenium, or a combination of such elements. In a specific example, the oxidizing species is a combination of a halogen ion and a chalcogen ion (e.g., fluoride and sulfide). In certain variations of the above chemical reaction, lithium is replaced with sodium ($Na^+$), potassium ($K^+$), magnesium ($Mg^+$), or another electropositive metal ion. Certain disclosed embodiments use a redox reaction of lithium ions with a metal fluoride as a source of energy in cathode materials.

The metal compound MX present in the charged cathode material may react with lithium ions according to a discharge path described above. Typically, the discharge reaction is associated with a relatively large Gibbs free energy when considering the full cell reaction Li+MX→LiX+M. The Gibbs free energy corresponding to the cell voltage of the reaction is given by $$\Delta G_{rxn} = -E*n*F \quad (2)$$

where E is the voltage, n is the number of electrons that react, and F is the Faraday constant. In certain embodiments, the Gibbs free energy of the reaction is at least about 500 kJ/mol or at least about 750 kJ/mol, or at least about 1 MJ/mol. This provides a very high available energy for a battery and compares favorably with that of a standard lithium insertion (or lithium intercalation, depending on the electrode matrix) cathode material, such as lithium cobalt oxide ($LiCoO_2$), lithium manganese oxide ($LiMnO_2$), lithium titanate ($Li_2TiO_3$), and the like used in conventional lithium ion batteries.

In certain implementations, the voltage of a fully charged cathode as described in the disclosed embodiments is at least about 2.0V compared to a lithium metal electrode, or at least about 3.0V compared to a lithium metal electrode, or at least about 4.0V compared to a lithium metal electrode, or at least about 4.5V compared to a lithium metal electrode.

Electrode Capacity

The conversion materials disclosed herein combine during discharge with multiple lithium ions per transition metal. During charge, intercalation reactions involve at most one lithium ion per transition metal (e.g., as lithium is reduced from $Li^+$ to $Li^0$, cobalt oxidizes from $Co^{3+}$ to $Co^{4+}$), whereas in conversion materials such as those with ferric fluoride ($FeF_3$), three lithium ions react per transition metal. In fact, most insertion compounds react half a lithium ion per transition metal because the electrode structure becomes unstable if more than ½ of the lithium is extracted. Thus, the transition metal electrode materials disclosed herein provide a significantly higher capacity (e.g., about 700 mAh/g or greater) than conventional electrode materials (e.g., 140 mAh/g for $LiCoO_2$). The capacity is available even at high rates and over many cycles when the electrode possesses suitably high ionic and electronic conductivity as disclosed herein.

In certain embodiments, the cathode conversion material, as fabricated, has a specific capacity of at least about 600 mAh/g of the fully charged cathode material. In some embodiments, the cathode material maintains this fully charged capacity over multiple cycles. The fully charged material is the stoichiometric metal compound, MX. For example, the cathode material may maintain a capacity of at least about 600 mAh/g when discharged at a rate of at least about 200 mA/g of fully charged cathode material.

In some implementations, the material maintains this capacity at higher discharge rates of at least about 600 mA/g of fully charged cathode material. In certain embodiments, the material maintains the capacity at discharge rates of up to about 6000 mA/g of fully charged cathode material. This discharge rate may be maintained at a constant value or may vary over discharge without dropping below, e.g., 200 mA/g.

In some embodiments, the cathode material maintains a high capacity at high rates (e.g., at least about 600 mAh/g at 200 mA/g) over multiple charge-discharge cycles. High capacity performance may be achieved when cycling over a range of temperatures, e.g., from about 0° C. to 100° C., or about 20° C. to 100° C. In some cases, the electrode material is able to maintain such a high rate capacity over about 10 cycles or more. Often it will be able to maintain this high rate capacity even longer, e.g., over about 20 cycles or more, or over about 50 cycles or more, or over about 100 cycles or more, or over about 500 cycles or more. In each cycle, the cathode material discharges the full 600 mAh/g charge. Such cycling may be conducted such that the voltage of the cathode is between 4V and 1V vs. Li/Li'. In some embodiments, the charge rate may be higher than 200 mA/g, higher than 600 mA/g, or higher than 6000 mA/h, and the material maintains a capacity of about at least 600 mAh/g. High capacity performance may be achieved when cycling over a range of temperatures, e.g., from about 0° C. to 100° C., or about 20° C. to 100° C.

In certain embodiments, the conversion material provides a capacity of greater than about 350 mAh/g of active material when cycled between 1V and 4V vs. a lithium metal anode at about 100° C. with a charge/discharge rate of 200 mA/g. In other embodiments, the electrode material provides a capacity of greater than about 500 mAh/g, or greater than about 600 mAh/g, or greater than about 700 mAh/g. In each case, the capacity value is for the active material cycled in the voltage range of 1V to 4V vs. a lithium metal anode when cycled at about 100° C. with a charge/discharge rate of 200 mA/g. In another embodiment, the electrode materials described herein provide a capacity of between about 350 mAh/g and about 750 mAh/g when cycled between 1V and 4V against a lithium metal anode at about 100° C. with a charge/discharge rate of 200 mA/g. In another embodiment, the electrode materials may have a specific capacity of greater than about 400 mAh/g when discharged between 1V and 4.5V vs. a standard lithium metal electrode (Li/Li+) at a rate of 400 mA/g and a temperature of 120° C., or between 1.5V and 4V vs. Li at a rate greater than 1 C and a temperature above 50° C.

In certain implementations, a battery containing a cathode as described herein has an energy density of at least about 50 Wh/kg or between about 50 and 1000 Wh/kg when measured at a temperature of 100 degrees Celsius when cycled between 1V and 4V vs. Li and at a current density of at least about 200 mA/g of cathode active material. In another embodiment, a device as described herein has an energy density of between about 100 and 750 Wh/kg when measured as described. In another embodiment, a device as described herein has an energy density of between about 250 and 650 Wh/kg when measured as described. In another embodiment, a device as described herein has an energy density of greater than about 250 Wh/kg when measured as described. As used herein, energy density is the energy density at the device level; i.e., the total energy stored in the device divided by the mass of the device, where the mass of the device includes the mass of the anode, cathode, electrolyte, current collectors and packaging of the device. From a volumetric perspective, in certain embodiments, the device has an energy density of at least about 600 Wh/L under the conditions set forth above. While many of the parameters presented herein are presented for electrodes operated at a temperature of 100 C, it should be understood that the parameters may in some instances be achieved at lower temperatures, such as 60 C, 30 C, 10 C, or 0 C.

In certain embodiments, a cathode as described herein has an electrode energy density of between about 500 and 2500 Wh/kg when measured at a temperature of 100° C. In another embodiment, a cathode as described herein has an electrode energy density of between about 800 and 1750 Wh/kg. In another embodiment, a cathode as described herein has an energy density of between about 1000 and 1600 Wh/kg. In another embodiment, a cathode as described herein has an energy density of greater than about 1000 Wh/kg. As used herein, electrode energy density is the energy density at the electrode level; i.e., the total energy stored in the device divided by the mass of the cathode in the discharged state, where the mass of the electrode includes the mass of the electrochemically active conversion material, lithium, positive current collector, and any electrochemically inactive components in the cathode such as ion or electron conductor additives and any protective coating on the active material.

In some cases, cathodes fabricated from high capacity conversion materials have an average discharge voltage greater than about 2V vs. lithium metal when discharged under above conditions (100° C. and a charge/discharge rate of 200 mA/g). In some embodiments, cathodes fabricated from such conversion materials have an average discharge voltage greater than about 2.2 V vs. lithium metal when discharged under above conditions.

Voltage hysteresis is the difference between the discharge voltage and the charge voltage, both varied as a function of state of charge. It represents the inefficiency of the battery—energy lost to heat, often due to sluggishness of either ion transport or reactions. The inefficiencies are manifest as overvoltages required to drive the reactions, which cause the discharge voltage to be lower than the open circuit voltage and the charge voltage to be higher than the open circuit voltage. Low hysteresis means that the battery is efficient.

In certain embodiments, devices employing the conversion cathode materials described herein provide an average voltage hysteresis of less than 1V in the voltage range of 1V to 4V vs. a lithium metal electrode at about 100° C. with a charge/discharge rate of 200 mA/g. In another version, such devices provide an average voltage hysteresis of less than 0.7V when cycled between 1V and 4V vs. a lithium metal electrode at about 100° C. with a charge/discharge rate of 200 mA/g. In an embodiment, the devices provide an average voltage hysteresis of less than about 1V when cycled between 1V and 4V vs. a lithium metal electrode at about 100° C. with a charge/discharge rate of 600 mA/g. In an embodiment, the devices provide an average voltage hysteresis of less than about 1V when cycled between 1.5V and 4V vs. a lithium metal electrode at about 50° C. with a charge/discharge rate of 200 mA/g. In certain embodiments, this hysteresis level is maintained for at least 10 cycles, or at least 30 cycles, or at least 50 cycles, or at least 100 cycles.

Function and Structure of Conversion Materials

The cathode material that contains an elemental metal or alloy and a lithium compound (in a discharged state) or a metal compound (in the charged state) may be provided in the form of extremely small particles or nanodomains.

The size scale of the conversion material components in a charged or discharged state may influence the relevant electrochemical properties of the materials. Conversion materials with components separated by very small distances, sometimes on the order of the atomic scale, may possess certain performance benefits as compared to conversion materials with components separated by greater distances. In some embodiments, the components are separated by a distance no greater than about 20 nm. The term "nanostructured" is sometimes used to refer to conversion materials in charged or discharged states in which the component materials are separated from another at a scale of about 20 nm or less.

In some embodiments, in the discharged state, the conversion material contains discrete domains of an elemental metal (or an alloy thereof) and a lithium compound. In various embodiments, these domains are contained in particles, which may be coated as described herein. The domains may be in the interiors or cores of the particles.

Various components of the conversion material may be mixed and/or otherwise exist at nanostructured scale. The individual domains may be nanodomains. Nanodomains may have an average or median characteristic dimension of about 20 nm or less, or about 10 nm or less, or about 5 nm or less. Using ferric fluoride ($FeF_3$) as an example conversion material, the nanodomains may be primarily iron (Fe) and lithium fluoride (LiF) in the discharged state. In the charged state, the nanodomains are primarily ferric fluoride ($FeF_3$). Domains may be compositionally homogenous (e.g., containing exclusively metal species) or inhomogeneous (e.g., composed of a combination of metal species, oxidizing species, and reducing cation species). In both states, the nanodomains may be crystalline or amorphous/glassy.

In some embodiments, the discrete domains of metal or alloy are present in small particles or other discrete structures. In some embodiments, the discrete domains of metal or alloy are embedded in a continuous matrix of the lithium compound. In some embodiments, the domains of the cathode have a very tight distribution, e.g., a standard deviation of about 50% or less. In some implementations, at least about 90% of the domains in the electrode have a characteristic dimension of between about 1 nm and about 5 nm. In some embodiments, the domains' characteristic dimension has a $d_{50}$ value of about 20 nm or less, or about 10 nm or less, or about 5 nm or less, where $d_{50}$ is defined as the characteristic dimension at which 50% of the domains are smaller. The domains may be present in these sizes at any point in the life of the cathode. In some examples, the domains are present in these sizes in the cathode as fabricated. In some examples, the domains are present in these sizes after the first discharge of the cathode, or after the first full charge/discharge cycle of the cathode. In certain embodiments, the average size of the domains of the cathode do not vary in characteristic dimension by more than about 500%, or by about 100% over multiple cycles (e.g., 10 cycles, 50 cycles, 100 cycles, or 500 cycles).

In the charged state, the cathode conversion material may maintain the general morphological characteristics present in the discharged state. These characteristics include component separation distance (e.g., particle or crystallite size), matrix structure (e.g., glassy or amorphous), etc. In certain embodiments, a conversion material has a glassy or amorphous morphology, which is associated with high cationic and/or electronic conductivity. In some cases, the material will expand in the discharged state. Depending on the material, the volume change may be about 5% or greater, or about 10% or greater.

In various embodiments, the conversion material is formed or mixed such that its components are separated on a scale of about 1 nm or less, and such materials may be characterized as glassy or amorphous. A glassy material may be viewed as one that is substantially non-crystalline, substantially uniform in composition, and substantially lacking in long-range order. In some examples, a glassy conversion material is substantially homogeneous (compositionally and/or morphologically) within a volume of 1000 $nm^3$.

In one example, ferric fluoride ($FeF_3$) in a charged conversion material may be characterized by a glassy or amorphous structure and being substantially homogeneous with no or minimal crystalline structure. In some examples, in the discharged state, the conversion material may include a glassy compound of lithium, sodium, and/or magnesium.

Such glassy or amorphous structures may be provided as particles, layers, etc. Within the particles or layers, the domains of component metal, oxidizing, and reducing cation species are, on average, separated from one another by a distance no greater than about 20 nm. In some cases, particles having a glassy or amorphous state may be substantially unagglomerated. In other cases, at least some of the particles form agglomerates.

The extremely small constituent separation distances described herein provide a relatively short diffusion/migration path for the lithium or other electropositive ions to move from the outside of a particle or domain to the reactive metal compound sites within a particle or domain during discharge, or from a lithium compound within the particle or domain to the particle or domain surface during charge. During charge, lithium ions may leave lithium fluoride, for example, and transport to the exterior of the domain where they contact the electrolyte. After leaving a particle or domain, a lithium ion may have to contact some other ion conductive matrix in the electrode before reaching the electrolyte.

Conversely, on discharge, lithium ions undergo a journey from the electrolyte of the body of the electrode, where they may travel some distance before reaching a destination domain, which they enter and pass into before finding a reactive metal compound site. Only after this multistage transport does the lithium ion participate in the redox reaction to generate electrochemical energy (discharge). The reverse path is traversed during charge. Using small separation distances of active material permits the cathode to operate with improved rate performance that is not available in conventional batteries.

A further benefit derived from the extremely small compound separation distances is the comparatively shorter diffusion distance between the metal atoms and the anions. As the metal and anion atoms are larger and more massive, their transport is generally slower than that of lithium. The provided nanostructure puts metal atoms in close proximity to anions, reducing the distance they must diffuse.

An additional challenge to realizing the potential benefits of conversion materials arises from the high surface area to mass ratio of very small particles. The large surface area, as a function of mass of reactive material, results in a relatively large fraction of the active material converting to a solid electrolyte interface (SEI) layer, which extracts much of the available lithium and presents it in an unusable form. It also therefore results in a relatively short cycle life as the SEI layer may continue to grow for a few cycles. The SEI that forms around a particle which undergoes significant volume changes during cycling may sometimes crack, providing a fresh surface that must be covered by an SEI layer. The growing SEI contains mass that does not contribute to the energy stored in the battery and may present a barrier to lithium transport, thus reducing the rate performance of the battery.

Example Electrodes with Conversion Materials

Figure 2A:
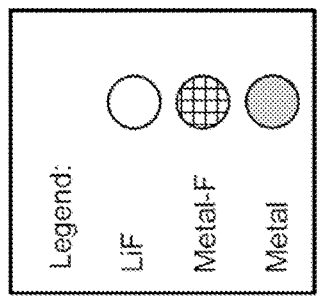
FIG. 2A depicts four examples of conversion materials having various nanodomain and particle formats.
Figure 2A:
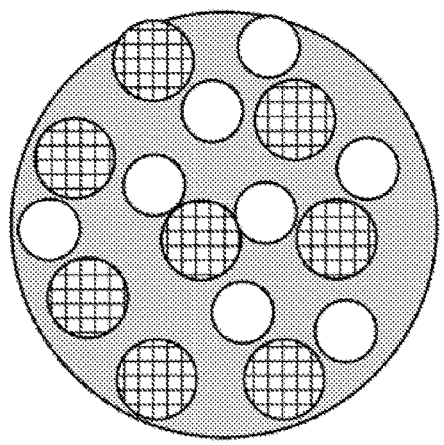
Figure 2A:
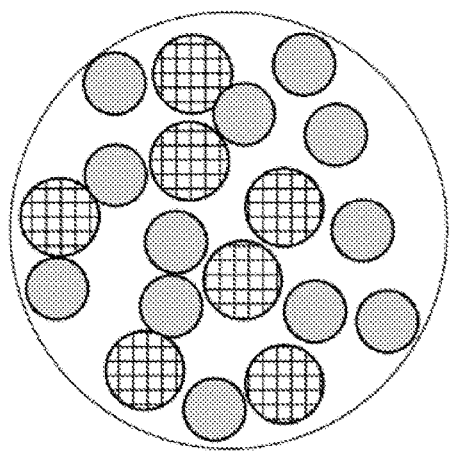
Figure 2A:
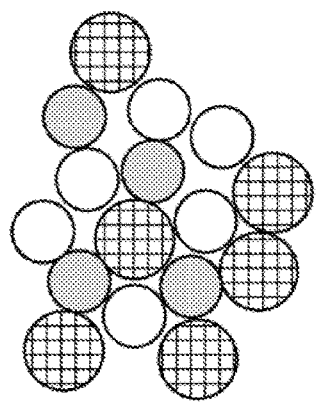
Figure 2A:
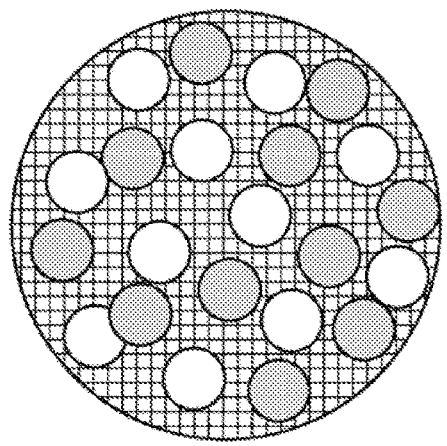

FIG. 2A depicts four examples of electrode formats with conversion materials. Many variations, alternatives, and modifications are possible. The particles or domains described above are nanostructured (e.g., separated from one another by less than about 20 nm length scale), and these particles or domains may be combined to form primary and secondary particle structures shown in Examples 1-4 in FIG. 2A. While not depicted in these figures, the depicted particles may be coated with a protective material as described elsewhere herein.

Example 1 (top left of FIG. 2A) depicts an embodiment in which the electrode active material includes non-encapsulated nanodomains of lithium fluoride, elemental metal, and metal fluoride. Such material may exist at any state of charge, but will most typically exist at or near full discharge. Example 2 (top right) depicts an electrode format in which metal fluoride nanoparticles and lithium fluoride nanoparticles are encapsulated in an elemental metal matrix. In each of the encapsulation examples, the encapsulation unit may exist as distinct particles or as a continuous layer. Example 3 (bottom left) illustrates a format in which a metal fluoride matrix encapsulates lithium fluoride nanodomains and elemental metal nanodomains. Example 4 (bottom right) depicts a format in which lithium fluoride encapsulates metal fluoride particles or nanodomains and elemental metal particles or nanodomains.

Figure 2B:
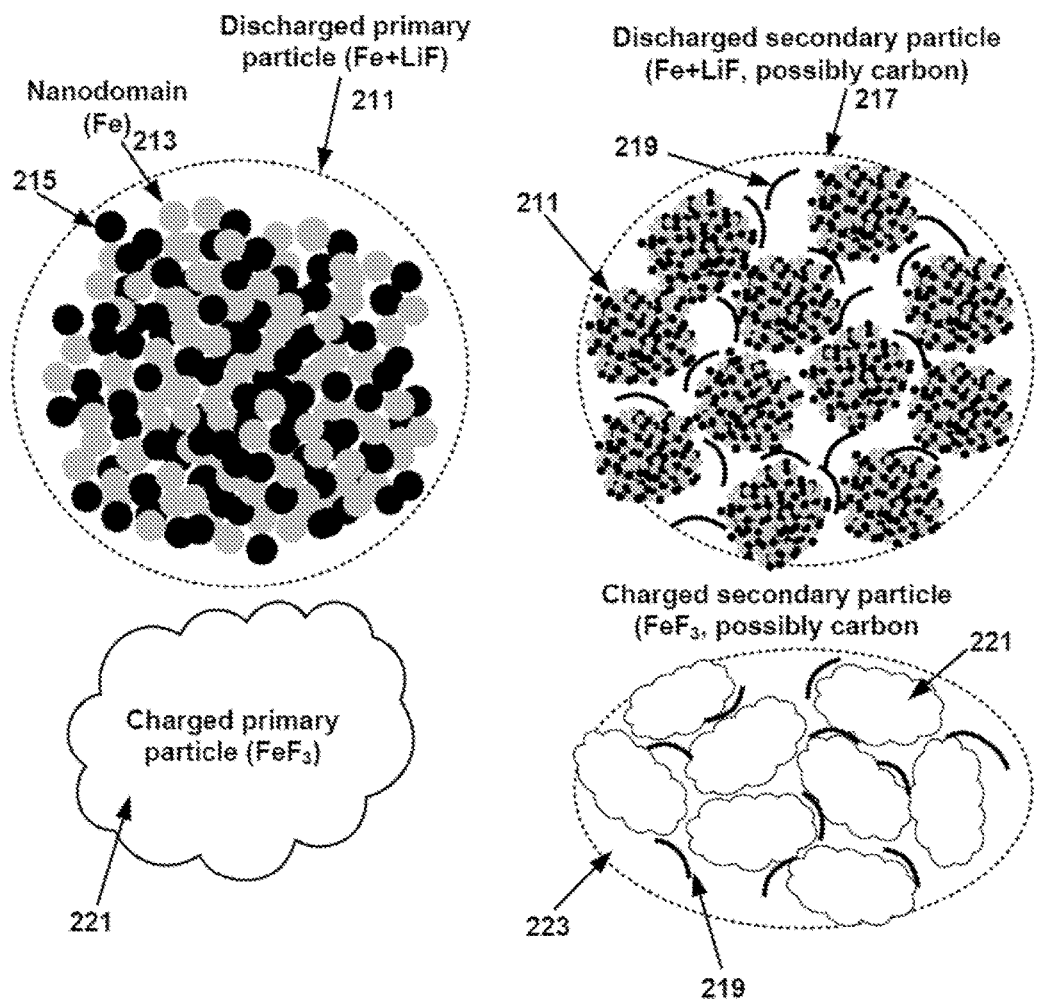
FIG. 2B depicts additional examples of particle and nanodomain structures that may be employed in ferric fluoride and related conversion materials.

FIG. 2B depicts additional examples of particle and nanodomain structures that may be employed in ferric fluoride and related conversion materials. In the example of FIG. 2B, the structure in the upper left side is a primary particle 211 that may be found in a discharged cathode. The primary particle 211 includes discrete nanodomains of iron metal 213 and lithium fluoride 215. Often, a primary particle has a characteristic cross-sectional dimension of about 100 nm or less. As mentioned, the nanodomains that make up a primary particle have cross-sectional dimensions of about 20 nm or less (e.g., about 5 nm or less). In some embodiments, a primary particle has a median diameter of between about 100 nm and about 1000 nm, or between about 200 nm and about 300 nm. The median diameter is defined as the distance for which about 50% of the sample volume is contained within particles with diameter smaller than that distance. In some cases, the nanodomains are glassy or compositionally homogeneous.

The top right structure in FIG. 2B depicts a secondary particle 217 (not drawn to scale) of discharged ferric fluoride (FeF3) conversion material. Secondary particles are made up of primary particles 211, such as those presented in the top left structure, and possibly particles of an ionically conductive material and/or electronically conductive material 219. Secondary particles may be agglomerates or clumps of primary particles and optionally particles of ionically/electronically conductive materials. In some implementations, secondary particles are present in a slurry used to coat a positive current collector when forming the cathode. In certain embodiments, secondary particles have a cross-sectional dimension of about 0.1 micrometers to about 5 micrometers. All dimensions presented in the discussion of FIG. 2B are median values. Any of the primary and/or secondary particles depicted in FIG. 2B may be coated with an isolating coating as described elsewhere herein.

The lower left and lower right structures presented in FIG. 2B represent primary particle 221 and a secondary particle 223, respectfully, of fully charged ferric fluoride (FeF3) conversion material. Other conversion materials may be substitute for ferric fluoride FeF3 and its discharge products in the structures presented in FIG. 2B.

Composition of Conversion Materials: Metal Component

In some embodiments, the "conversion reaction" may be written as

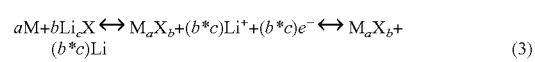

$$a\text{M} + b\text{Li}_c\text{X} \leftrightarrow \text{M}_a\text{X}_b + (b*c)\text{Li}^+ + (b*c)e^- \leftrightarrow \text{M}_a\text{X}_b + (b*c)\text{Li} \qquad (3)$$

The left side of Reaction 3 represents the cathode active materials in the discharged state, where the cathode active component includes a metal component M, and a lithium compound component $Li_nX$. In this reaction, c is the formal oxidation state of anion X.

The right side of Reaction 3 represents the system in the charged state, where cathode active materials have been converted into the metal compound component $M_aX_b$ and the Li ions leave the cathode through the electrolyte, and electrons are provided to the external circuit.

X is generally any anionic species forming stable compounds $Li_nX$ and $M_aX_b$, with lithium and metal M respectively. Examples of suitable oxidizing species anions X in the conversion materials corresponding to Reaction 1 include oxygen (O), sulfur (S), nitrogen (N), phosphorous (P), fluorine (F), selenium (Se), chlorine (Cl), iodine (I), and combinations thereof.

Examples of suitable metal species M include transition metals, aluminum, and bismuth. In some cases, the metal is selected from the first row of transition metals. Specific examples of transition metals that may be used include bismuth (Bi), aluminum (Al), vanadium (V), chromium (Cr), copper (Cu), iron (Fe), cobalt (Co), manganese (Mn), nickel (Ni), ruthenium (Ru), titanium (Ti), silver (Ag), molybdenum (Mo), and tungsten (W). In certain implementations, the metal component is selected from iron (Fe), copper (Cu), manganese (Mn), and cobalt (Co). In a certain embodiments, the metal component is iron. In some embodiments, the metal component is copper. In some embodiments, the metal component is cobalt.

Alloys of such metals may also be used. Examples of such alloys include iron alloyed with cobalt and iron alloyed with manganese. In certain embodiments, the metal component includes a mixture or alloy of a first metal and a second metal. In certain implementations of mixed metal component, the metal component includes separate nanodomains of the first metal and the second metal. In another embodiment, the metal component includes nanodomains of a mixture or alloy of the first and second metals. In certain embodiments, the first metal is Fe and the second metal is Cu.

Generally the lithium compound component is any lithium compound that upon charging of the device yields (i) lithium ions that migrate to the anode, and (ii) anions that react with the metal component to provide a metal compound component. In the charged state, therefore, the cathode material includes a metal compound component. The anion in the lithium compound may generally be any anion that forms the lithium compound in the discharged state and the metal compound in the charged state. In certain implementations, the lithium compound is a lithium halide, lithium sulfide, lithium sulfur-halide, lithium oxide, lithium nitride, lithium phosphide, lithium hydride, lithium selenide, or mixtures thereof. In certain embodiments, the lithium compound is a lithium halide. In one version the lithium compound is lithium fluoride.

Specific examples of metal compounds $M_aX_b$ that may be used include, without limitation, the compounds listed in Table 1.

TABLE 1

Example Metal Compounds for Conversion Materials

| | X=O | X=S | X=N | X=P | X=F |
|---|---|---|---|---|---|
| Bi | | | | | $BiF_3$ |
| Ti | | | | | $TiF_3$ |
| V | | | | | $VF_3$ |

TABLE 1-continued

Example Metal Compounds for Conversion Materials

| | X=O | X=S | X=N | X=P | X=F |
|---|---|---|---|---|---|
| Cr | $Cr_2O_3$ | CrS | CrN | | $CrF_3$ |
| Mn | $MnO_2$, $Mn_2O_5$, MnO | MnS | | $MnP_4$ | |
| Fe | $Fe_2O_3$, FeO | $FeS_2$, FeS | $Fe_3N$ | FeP | $FeF_3$, $FeF_2$ |
| Co | $Co_3O_4$, CoO | $CoS_2$, $Co_{0.92}S$, $Co_9S_8$ | CoN, $Co_3N$ | $CoP_3$ | $CoF_2$, $CoF_3$ |
| Ni | NiO | $NiS_2$, NiS, $Ni_3S_2$ | $Ni_3N$ | $NiP_3$, $NiP_2$, $Ni_3P$ | $NiF_2$ |
| Cu | CuO, $Cu_2O$ | CuS, $Cu_2S$ | | $CuP_2$, $Cu_3P$ | $CuF_2$ |
| Mo | $MoO_3$, $MoO_2$ | $MoS_2$ | | | |
| W | | $WS_2$ | | | |
| Ru | $RuO_2$ | | | | |

Examples of suitable charged state cathode materials include sulfides, oxides, halides, phosphides, nitrides, chalcogenides, oxysulfides, oxyfluorides, sulfur-fluorides, and sulfur-oxyfluorides. In various embodiments, the charged conversion material includes one or more of the following: AgF; $AlF_3$; $BiF_3$; $B_2O_3$; $CO_3O_4$; CoO; $CoS_2$; $CO_{0.92}S$; $Co_3S_4$; $Co_9S_8$; CoN; $Co_3N$; $CoP_3$; $CoF_2$; $CoF_3$; $Cr_2O_3$; $Cr_3O_4$; CrS; CrN; $CrF_3$; CuO; $Cu_2O$; CuS; $Cu_2S$; $CuP_2$; $Cu_3P$; $CuF_2$; $Fe_2O_3$; FeO; FeOF; $FeS_2$; FeS; $Fe_2S_2F_3$; $Fe_3N$; FeP; $FeF_2$; $FeF_3$; $Ga_2O_3$; $GeO_2$; $MnO_2$; $Mn_2O_3$; $Mn_2O_5$; MnO; MnS; $MnS_2$; $MnP_4$; $MnF_2$, $MnF_3$, $MnF_4$, $MoO_3$; $MoO_2$; $MoS_2$; $Nb_2O_5$; NiO; $NiS_2$; NiS; $Ni_3S_2$; $Ni_3N$; $NiP_3$; $NiP_2$; $Ni_3P$; $NiF_2$; PbO; $RuO_2$; $Sb_2O_3$; $SnF_2$; $SnO_2$; $SrO_2$; $TiS_2$; $TiF_3$; $V_2O_3$; $V_2O_5$; $VF_3$; $WS_2$; $ZnF_2$; and combinations thereof. As an example, a suitable cathode material is, in the charged state, ferric fluoride ($FeF_3$) in very small particles, which may be the size of a quantum dot (e.g., about 5 nm in the smallest cross-section) or in a glassy or amorphous state. In certain implementations, the metal compound component is $FeF_x$, where x is between 1 and 3. In certain embodiments, the metal compound component is $CuF_x$, where x is between 1 and 3. In certain implementations, the metal compound component is $CoF_x$, where x is between 1 and 3.

The conversion material may be discharged with a cation that undergoes an exothermic reaction with the conversion material. The cation is often low-cost and lightweight (relative small atomic mass). Lithium is not the only example. Other examples include magnesium (Mg) and sodium (Na).

In certain embodiments, the three elements are intimately intermixed on an atomic scale. The relative amounts of the lithium compound component and the metal component can vary widely, but should be appropriate for a battery cell. For example, the components may be provided in relative amounts that do not introduce substantial unused material that will not contribute to electrochemical energy conversion or enhance conductivity. In some embodiments where iron is used as the metal component, the mole ratio of iron to lithium in the cathode active material is about 2 to 8, or about 3 to 8. In some embodiments employing valence 2 metals such as copper, the mole ratio of metal to lithium in the cathode active material is about 1 to 5. In various implementations, the conversion material is characterized by an iron (Fe) to fluorine (F) to lithium (Li) ratio of from about 1:1.5:1.5 to 1:4.5:4.5. As an example for ferric fluoride ($FeF_3$) conversion material and Li cation, the conversion material when created, or when in the discharged state, may be an amorphous mixture of lithium (Li), iron (Fe), and fluorine (F) in the ratio of approximately 3:1:3 (Li$_3$FeF$_3$).

Composition of Conversion Materials: Lithium Metal Component

In some embodiments, at some point in the state of charge of the electrode, the cathode includes an active component that includes a lithium metal compound component. Generally, the lithium metal compound component is any compound that includes lithium, a non-lithium metal, and an anion. Upon charging the device, the lithium metal compound component yields lithium ions that migrate to the anode and a metal compound.

In some embodiments, the reaction may be written as $$Li_d M_e X_f \leftrightarrow dLi^+ + de^- + M_e X_f \leftrightarrow dLi + M_e X_f \quad (4)$$

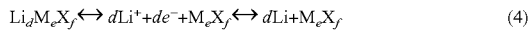

The left side of Reaction 4 represents the cathode active materials in the discharged state, where the cathode active component includes a lithium metal component Li$_d$M$_e$X$_f$ and the right side of Reaction 4 represents the system in the charged state, where the cathode active materials have been converted into the metal compound component M$_e$X$_f$, and the Li ions are provided for diffusion through the electrolyte to the anode and the electrons are provided to the external circuit. In Reaction 4, all of the lithium in the lithium metal compound is converted to lithium ions. In another embodiment, less than all of the lithium in the lithium metal component is converted to lithium ions. One version of such a reaction is given by Reaction 5:

$$Li_d M_e X_f \leftrightarrow gLi^+ + ge^- + Li_{d-g} M_e X_f \quad (5)$$

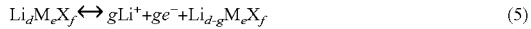

where g<d. Depending on the thermodynamic and kinetic stability of the Li$_{d-g}$M$_e$X$_f$ compound, such compound may exist as Li$_{d-g}$M$_e$X$_f$ or may be a mixture of one or more of a lithium compound, a metal compound, and a lithium metal compound.

In certain embodiments, the lithium metal compound component is a lithium metal oxide, a lithium metal sulfide, a lithium metal nitride, a lithium metal phosphide, a lithium metal halide or a lithium metal hydride, or mixtures thereof. In certain implementations, the lithium metal compound component is a lithium metal halide. In certain embodiments, the lithium metal compound component is a lithium metal fluoride. In certain implementations, the lithium iron compound component is a lithium iron fluoride. In certain embodiments, the lithium metal compound component is a lithium copper fluoride. In one version the lithium metal compound component is a lithium cobalt fluoride. In one version the lithium metal compound component is a lithium nickel fluoride.

Composition of Cathodes: Conducting Component

In some embodiments, the cathode includes a mixed electron-ion conducting component ("MEIC component") together with an active component as described above. The MEIC component may generally be made of any material that is compatible with the other materials of the device and allows electron and lithium ion transport sufficient for operation of the device. In certain implementations, the MEIC component is a material having an electronic conductivity of 10$^{-7}$ S/cm or greater at the device operating temperature. In certain embodiments, the MEIC component is a material having a lithium ion conductivity of 10$^{-7}$ S/cm or greater at the device operating temperature.

Examples of materials that may be used as the MEIC component include, without limitation, lithium titanates, lithium iron phosphates, vanadium oxides, cobalt oxides, manganese oxides, lithium suphides, molybdenum sulphides, iron sulphides, LiPON, MoO$_3$, V$_2$O$_5$, carbon, copper oxides, lithium insertion compounds such as LiCoO$_2$, Li(CoMn)O$_2$, LiMn$_2$O$_4$, Li(CoNiMn)O$_2$, Li(NiCoAl)O$_2$, or other materials having relatively high lithium ion conductivity. In certain implementations, the MEIC component is made of the same material as that of the solid state electrolyte. In certain embodiments, the MEIC component is made of a different material than that of the solid state electrolyte. The MEIC component may itself possess electrochemical activity (e.g., MoO$_3$ or V$_2$O$_5$) or may not show electrochemical activity (e.g., LiPON). In certain implementations, the MEIC is LiPON.

If the cathode includes an MEIC component, the minimum amount of MEIC component will generally be the amount that allows sufficient lithium ion and electron transport for functioning of the device. The maximum amount will be that amount of MEIC that provides an electrochemically active cathode material with the required specific capacity or other electrical characteristics when operating at required rates, voltage windows, and states of charge. In certain embodiments of the devices including an MEIC, the minimum amount of MEIC is about 1% or about 5% of the cathode material by weight. In one version of the devices including an MEIC, the maximum amount of MEIC is about 50% or 25% of the cathode material by weight.

The MEIC material may be provided in the electrode in various forms. In one example, small particles of MEIC are mixed with the electrochemically active particles and compressed. In another example, the MEIC arrays into vertical wires. The MEIC may include at least two materials, one having high electron conductivity and another having high ionic conductivity.

In some embodiments of the device, the cathode includes an electron conductor dispersed to increase the electron conductivity of the electrode. In some embodiments, the component has an electron conductivity value about 10$^{-7}$ S/cm. This compound may be a carbon or metal compound in some embodiments. Examples of forms of carbon that may be employed include graphite, activated carbon, nanotubes, nanofibers, nanowires, graphene, graphene oxide, etc. A cathode may include active material with about 10% or about 20% of an electron conductor by weight or less. Examples of such material may be nanowires, nanoparticles, and nanocrystals and materials may be oriented in the direction from the electrode to the electrolyte, or may be randomly dispersed. In certain embodiments, the material forms a percolating network throughout the cathode.

In some embodiments, the cathode includes a Li ionic conductor dispersed to increase the ion conductivity of the electrode. Example materials may be nanowires, nanoparticles, or nanocrystals. These may be oriented in the direction from the electrode to the electrolyte, or may be randomly dispersed. The ion material may be formed in coverings around active material particles. In certain embodiments, the material forms a percolating network throughout the cathode. In some embodiments, the material has an ion conductivity of at least 10$^{-7}$ S/cm, or at least 10$^{-5}$ S/cm, or at least 10$^{-4}$ S/cm at the operating temperature of the device. A non-limiting list of example materials includes lithium iron phosphate, carbon, Li$_2$O—SiO$_2$—ZrO$_2$, Li—Al—Ti—P—O—N, LiMO$_2$, Li$_{10}$GeP$_2$S$_{12}$, Li$_{1.5}$Al$_{0.5}$Ge$_{1.5}$(PO$_4$)$_3$, Li$_7$La$_3$Zr$_2$O$_{12}$, Li$_9$SiAlO$_8$, Li$_3$Nd$_3$Te$_2$O$_{12}$, Li$_5$La$_3$M$_2$O$_{12}$ (M=Nb, Ta), Li$_{5+x}$M$_x$La$_{3-x}$Ta$_2$O$_{12}$ (M=Ca, Sr, Ba), LiPON, lithium sulfide, lithium iron sulfide, iron sulfide, lithium phosphate, Lisicon, thio-lisicon, glassy structures, lanthanum lithium titanate, garnet structures, β" alumina, and lithium solid electrolytes. In some embodiments, the ion conductivity of the material is at least greater than the ion conductivity of the electrolyte. The ion conductor may be present in amounts of about 20% or less or about 10% or less of the active material in the cathode.

Anode

The anode may generally be made of any material that is compatible with the other materials of the device and which may store lithium atoms or ions when the device is in the charged state and may provide lithium ions for incorporation into the cathode when the device is in the discharged state. In certain embodiments, the anode active material is lithium metal. In another embodiment, the anode is lithium silicide, Li—Sn, or other high capacity, low voltage material that alloys with lithium. In an embodiment, the anode is lithium intercalated into a carbon component, such as graphite. In various embodiments, the anode active material is a material capable of inserting lithium ions at a higher reversibility capacity than carbon, such as tin, magnesium, germanium, silicon, oxides of these materials, and the like.

In some embodiments, the anode is a porous material that allows lithium plating into the pores, thereby relieving the swelling stress. Swelling stress may occur if the anode, such as lithium, plates on the electrolyte, thereby causing swelling. In some embodiments, the pores are carbon nanotubes, carbon buckyballs, carbon fibers, activated carbon, graphite, porous silicon, aerogels, zeolites, or xerogels.

In certain implementations, the anode is formed in situ during the first charge cycle of the battery. In a case where the device is fabricated in the discharged state with a lithiated cathode, the first charge cycle extracts lithium from the cathode and deposits lithium on the anode side. In the case where the anode is a lithium metal anode, the anode is thereby formed in situ by plating on the anode current collector. In this case, the anode current collector may be a metal that does not alloy with or react with lithium. A non-limiting list of examples for anode current collector material includes TaN, TiN, Cu, Fe, stainless steel, steel, W, Ni, Mo, or alloys thereof. In certain embodiments, there is an excess of lithium in the device as fabricated on the cathode. In another embodiment, there is an excess of lithium in the device as fabricated on the anode side, possibly in the anode current collector. An excess of lithium may be desirable to prolong the cycle life to the battery, as some lithium will inevitably be lost due to side reactions, alloying with current collectors or in reactions with air and/or water that leak into the device. In certain embodiments, there is an encapsulation that substantially prevents ingress of air and water into the active materials. The encapsulation may be LiPON, an oxide, nitride, oxynitride, resin, epoxy, polymer, parylene, metal such as Ti or Al, or multilayer combinations thereof.

Current Collectors

The devices described herein include optional positive and/or negative electrode current collectors. The current collectors generally may be made of any material capable of delivering electrons to the anode or the cathode from the external circuit or delivering electrons to the external circuit from the anode and cathode. In certain implementations, the current collectors are made of a highly electronically conductive material such as a metal. In certain embodiments, the device does not include a cathode current collector and electrons are transferred to and from the cathode directly to the external circuit. In certain implementations, the device does not include an anode current collector and electrons are transferred to and from the anode directly to the external circuit. In certain embodiments, the device does not include either a cathode current collector or an anode current collector.

In certain implementations, the negative electrode current collector is copper. In certain embodiments, the negative current collector is a copper alloy. In certain implementations, the negative current collector is copper alloyed with a metal selected from nickel, zinc and aluminum or copper coated on a metal or polymer foil. In certain implementations, the current collector is copper and also includes a layer of a non-copper metal disposed between the copper and the cathode or anode material. In certain embodiments, the positive current collector is copper and also includes a layer of nickel, zinc or aluminum disposed between the copper and the anode material.

In certain embodiments, the positive current collector is aluminum. In certain implementations, the positive current collector is aluminum or an aluminum alloy. In certain embodiments, the positive current collector is aluminum and also includes a layer of a non-aluminum metal disposed between the aluminum and the cathode or anode material. In certain embodiments, the current collector is steel or stainless steel. In certain implementations, the current collector is steel or stainless steel and also includes a layer of a non-steel metal disposed between the steel and the cathode or anode material. The cathode current collector and negative electrode current collector may be different materials chosen among those enumerated above or any other suitable material.

Thin Film Cathodes

In some embodiments, a thin film of electrochemically active cathode material is formed between a positive current collector and the electrolyte, which in turn contacts an anode or anode current collector. Optionally, an MEIC component may also be included. Any active component and MEIC component described above may be used. The thin film may be a continuous layer, which may be deposited by sputtering. Alternatively, it may be a layer including particles and/or nanodomains and is optionally held together by a binder. In some embodiments, the thin film cathode has a thickness of between about 2.5 nm and about 500 nm, or between about 5 nm and 300 nm, or about 200 nm or greater.

In certain embodiments, the cathode may contain a first thickness of lithium fluoride material configured in either amorphous or polycrystalline state. The cathode may also include a first plurality of nucleated iron metal species overlying the first thickness of lithium fluoride material. The cathode may also have a second thickness of lithium fluoride material formed overlying the first plurality of iron metal species. The second thickness of lithium fluoride material may be configured in either an amorphous or polycrystalline state to cause formation of a lithiated conversion material. The cathode region may be characterized by an energy density of greater than 80% to about 100% of a theoretical energy density of the cathode region. In some embodiments, the plurality of metal species nucleated overlying the first thickness of lithium fluoride material causes formation of exposed regions of the first thickness of lithium fluoride material, or a thinner region of iron metal species disposed between a pair of the plurality of iron metal species. For example, each of the first thickness of lithium fluoride material or the second thickness of lithium fluoride material may be between about 30 nm and 0.2 nm. Each of the first plurality of iron metal species may have a diameter of about 5 nm to 0.2 nm. The plurality of first iron metal species may be spatially disposed evenly overlying the thickness of the first thickness of lithium fluoride material. The entire thin film cathode may be coated with an isolating coating as described herein. Typically, such coating resides adjacent to the electrolyte, e.g., electrolyte 102 in FIG. 1B.

Iron Migration

While charging, the metal component (e.g., iron) of the conversion material may escape from the cathode and enter the electrolyte. In some cases, the metal may ultimately come into contact with the anode and create a short circuit between the anode and cathode and rendering the battery inoperable. Iron may transport out of the cathode in various forms such as a zero valence atom, iron(II) ion, iron(III) ion, and any combination thereof.

FIG. 3A is a schematic illustration of the effect of iron migration. While the figure shows a particle of conversion material, which contains many such particles, the concept applies to thin-films of conversion material as well. In FIG. 3A, a section of a discharged cell is depicted. In the discharged state, the particle includes metal atoms, such as iron, and metal halides, such as lithium fluoride. For purposes of this illustration, iron as a zero valence atom, an iron(II) ion, or an iron(III) ion are all labeled as "Fe" or "Metal."

FIG. 3B schematically depicts the particle shown in FIG. 3A but while charging. When charging, lithium fluoride undergoes an electrochemical reaction leaving fluoride ions in the particle, which subsequently bind to iron in the particle, while lithium ions and electrons leave the particle, with the lithium ions entering the electrolyte and traveling to the anode. The electrons exit the cathode though a current collector. The depiction also shows some iron undesirably escaping the particle before it can bind to any fluoride ions in the particle left by the lithium fluoride. These iron atoms and/or ions may stay in the electrolyte or transport to the anode, where they may accumulate to cause a short circuit. Either way, the exiting iron becomes unavailable to provide capacity. Therefore, it would be desirable to maintain iron atoms inside the particle or layer but allow lithium ions and electrons to flow freely in and out of the particle or layer.

Provided herein are coatings for electrochemically active conversion material that limit or prevent iron egress from cathode particles or layers and thereby improve efficiency of conversion materials in energy storage devices. Coatings prevent iron from leaving the cathode particles such that iron does not escape into the electrolyte. In some embodiments, the electrochemically active cathode material contains a collection of particles, each having a core including the conversion material and the coating.

FIGS. 4A and 4B schematically illustrate the effect of using a coating according to certain disclosed embodiments. FIG. 4A depicts a particle of conversion material in electrolyte. A coating may be deposited on the outer surface of a particle, and/or between the conversion material and the electrolyte. In FIG. 4A, the coating is represented by the dark outer layer surrounding the particle itself. In some embodiments, the coating may be deposited on a cathode layer, thereby forming a thin layer between the cathode layer and electrolyte, such as in a thin-film electrode. In some embodiments, the cathode forms a substantially continuous sheet, substantially coextensive with and overlapping the electrolyte.

While charging, as depicted in FIG. 4B, lithium fluoride is electrochemically reduced such that lithium ions leave the particles, electrons leave the particles, and fluorine ions react with iron to form compounds such as ferric fluoride ($FeF_3$). As shown, iron escape is at least partially prevented by the coating, but the coating is selectively permeable to both lithium ions and electrons to promote conductivity and allow for the effective use of the cell as an energy storage device. As compared to FIG. 3B, iron atoms or ions that were able to escape from a particle or conversion material without a coating are now prevented from escaping the conversion material due to the additional coating. Generally, "selectively isolate" means isolating a component of a particle from some species but not others. As shown in FIG. 4B, the coating selectively isolates a conversion material by at least partially preventing iron from entering the electrolyte, while permitting lithium ions and electrons to enter and leave.

Electrolyte Reaction

Conversion materials may also be susceptible to a reaction with the electrolyte on the surface of particles or thin-films. Reaction 6 provides an example of a reaction that may occur between the cathode and a sulfur-containing electrolyte:

$$MF_x + S \rightarrow M_{1-y}S_{1-y} + F_{x-y} + S_y \qquad (6)$$

where M is a metal such as any of those described above. As an example, Reaction 7 provides an example of a reaction that may occur between a cathode including ferric fluoride and an electrolyte:

$$FeF_2 + 2S \rightarrow FeS_2 + F_2 \qquad (7)$$

FIGS. 5A and 5B are example schematic illustrations of this phenomenon. In FIG. 5A, a particle of conversion material including metal atoms is shown in electrolyte with various electrolyte molecules surrounding the particle. This state may exist soon after the fabricated cathode is brought in contact with the electrolyte. Next, in FIG. 5B, after the cathode has remained in contact with the electrolyte for some time, electrolyte molecules at the surface of the particle may enter the particle and/or interact with the particle surface. Either way, they undergo reaction with metal at the surface of the particles and conversion material, thereby rendering the particle and conversion material less effective as an energy storage unit.

Provided herein are coatings for cathode conversion materials that limit or prevent electrolyte interaction with conversion materials and thereby improve efficiency of conversion materials in energy storage devices. Coatings isolate conversion material from electrolyte in particles and/or thin-film layers, and may provide various benefits such as increased cycle lifetime and increased efficiency.

FIGS. 6A and 6B are schematic illustrations of the effect of using coatings to prevent electrolyte reactions. In FIG. 6A, a particle containing conversion material or metals is shown with electrolyte molecules located outside of the particle. A coating may be deposited on the outer surface of a particle, or between the conversion material and the electrolyte. In FIG. 6A, the coating is represented by the dark outer layer surrounding the particle itself. In some embodiments, the coating may be deposited on the cathode, thereby forming a thin layer between the cathode layer and electrolyte, such as in a thin-film electrode. FIG. 6B depicts the effective use of the coating. Arrows show the paths that some of the electrolyte molecules may exhibit toward the particle, where they would react with metal on the surface of the particle, but, due to the coating, are unable to react with the surface of the particle, and therefore unable to undergo a reaction that decreases efficiency. The coating selectively isolates the components in the particle.

While the discussion in this section focuses on reaction of conversion material with electrolyte, it applies equally to reactions of conversion material with other cell components such as cathode binders, MEIC materials, electron conductor additives, and ion conductor additives. Also, the electrolyte that interacts with the conversion material may be fashioned as a catholyte or a single electrolyte for the entire cell.

Fusion of Active Material

In a particle format, two or more particles of conversion material (e.g., primary materials) may fuse to form a larger particle when a high current is run to activate the active material. In some embodiments, the fusion of particles may result in larger conversion material particles, which decreases the conductivity of the electrode because ions and electrons travel a longer distance when larger particles are used in the cathode.

Provided herein are coatings for cathode conversion materials that prevent particle fusion and improve ionic and electronic conductivity. The coatings are not active material and therefore coated particles that are close to each other while a high current is run will not be fused together and particles remain their small sizes. Thus, coatings prevent primary particles from fusing during charging and discharging.

Coating Materials

The coating material may include one or more of the following classes of chemicals: oxides, phosphates, and fluorides. Specific examples of materials that may be used as coatings include aluminum oxide ($Al_xO_y$ or $Al_2O_y$, $y \leq 3$ (e.g., $Al_2O_3$)), lithium oxide ($Li_xO$, $x \leq 2$), titanium oxide ($TiO_x$, $x \leq 2$), silicon oxide ($SiO_x$, $x \leq 2$), iron oxide ($Fe_2O$, $x \leq 3$), aluminum phosphate ($AlPO_x$, $x \leq 4$; or $Al_x(PO_4)_y$ (e.g., $AlPO_4$)), iron phosphate ($FePO_x$, $x \leq 4$), lithium fluoride ($Li_xF$, $0.8 \leq x \leq 1.2$), aluminum fluoride ($AlF_x$, $x \leq 3$ (e.g., $AlF_3$)), and carbon. For example, the coating may be aluminum oxide ($Al_2O_3$), or aluminum phosphate ($AlPO_4$), or aluminum fluoride ($AlF_3$).

During fabrication or initial cycling, lithium ions embed in the coating, and thereafter the coatings maintain good cycle capacity. An initial lithiating operation (e.g., an initial cycle) may be employed to form a pre-lithiated coating material. Examples of lithiated coating materials include lithiated aluminum oxide ($Al_2O_3$), lithiated aluminum phosphate ($AlPO_4$), and lithiated aluminum fluoride ($AlF_3$), or mixtures thereof. A lithiated coating may be defined as a coating including lithium, which may be intercalated, alloyed, mixed, or otherwise incorporated in the coating. Examples of lithiated aluminum oxide coatings include lithium reductively intercalated into aluminum oxide (e.g., $LiAl_2O_3$), lithium oxide alloyed with aluminum oxide (e.g., $Li_3Al_{(2-x)}O_3$), lithium aluminum oxide compounds (e.g., $LiAlO_2$, $Li_4Al_2O_5$), and lithium oxide mixed with aluminum oxide (e.g., $Li_2O \cdot Al_2O_3$). In certain embodiments, x is between about 1 and 6. Similar lithium to metal ratios may be employed in other coating compositions. Use of pre-lithiated coatings increases the coatings' lithium ion conductivity and allows use of the full capacity of the conversion material without requiring lithiation during each cycle in normal operation. An example of a pre-lithiation level may be about 50%, which is the level of lithiation where lithium ion conductivity is the highest. Lithiated coatings may be fabricated to have sufficient lithium available to immediately conduct, but not so much lithium that a substantial amount of conduction sites in the coating are filled. Thus, a 50% lithiated coating results in high conductivity because sites are formed including lithium, but are only half-filled.

Coating Properties

The layer of coating material should be as thin as possible without sacrificing its function to protect the conversion materials or cathode. A thin coating should be used because the coating material typically does not provide electrochemical energy capacity, and effectively presents dead weight/volume in the cell if too thick. In many embodiments, the coating material layer has a median thickness between about 0.5 nm and about 15 nm, depending on the size of the cathode or cathode particles. In some embodiments, the coating material layer median thickness is between about 1 nm and about 10 nm, or between about 2 nm and about 7 nm.

Coating material used in disclosed embodiments may also have a porosity between about 0% and about 30%. The porosity may be chosen to provide good lithium ion permeability but poor metal atom or metal ion and electrolyte permeability. The coating may have a diffusion coefficient for lithium ions between about $10^{-10}$ and about $10^{-5}$ cm$^2$/s. In some embodiments, the coating has a diffusion coefficient for iron(II) ions between about $10^{-14}$ and about $10^{-10}$ cm$^2$/s. Conversion material having coatings may have a lower active material loss rate than conversion material without such coatings. The chemical structure of the coating material may also be crystalline, semicrystalline, and/or amorphous.

The ionic conductivity of the coating material with respect to iron(II) ions may be no greater than about $10^{-10}$ S/cm or no greater than about $10^{-8}$ S/cm. Coated conversion materials may be relatively ionically conductive to lithium ions. Resulting ionic conductivity of the coating material with respect to lithium ions may be at least about $10^{-8}$ S/cm or at least about $10^{-7}$ S/cm. In some embodiments, the coated material may have a sufficient Li ion conductivity such that the battery capacity when discharged at 1 C rate is at least 60% of the capacity as when discharged at a C/3 rate. Coated conversion materials may also be relatively electronically conductive. The electronic conductivity of the coating material may be at least about $10^{-8}$ S/cm or at least about $10^{-7}$ S/cm. In certain embodiments, the active material of the coated conversion materials has an energy density of at least about 800 Wh/kg, or at least about 1000 Wh/kg. In a coating with two or more layers, each layer may have a different ionic and electronic conductivity. For example, a bilayer coating may have a high-conductivity inner layer and a lower-conductivity outer layer.

In many embodiments, coatings may be continuous over the entire surface of the particle or entire surface of the cathode material. In some embodiments, coatings may be discontinuous on the surface of the particle or cathode material. In many embodiments, coatings may have a median coverage of at least about 80% of the surface area, or at least about 90% of the surface area.

The coating may include one or more layers such as a bilayer. In some embodiments, the coating may include two or more layers. In a bilayer coating, one of the layers may block iron or copper diffusion. In some embodiments, one of the layers may be a good electronic conductor. In an embodiment where one layer blocks iron diffusion and another layer provides good electronic conductivity, electrons may flow around the perimeter of the cathode layer or particle in a manner that allows their egress into the interior of the particle at various points of entry on the particle surface. In a coating including one or more layers, each layer of the coating may have a median thickness between about 0.5 nm and about 15 nm, depending on the size of the cathode or cathode particles. In some embodiments, the median thickness of each layer is between about 1 nm and about 10 nm, or between about 2 nm and about 7 nm.

FABRICATION METHODS

Various classes of methods of forming coatings may be used. Coating material may be prepared on charged or discharged conversion material, or in an unlithiated or lithiated conversion material. Further, the coating may be applied in a lithiated, partially lithiated, or unlithiated form. In many embodiments, the coating is deposited at a low temperature, for example less than about 300° C., or less than about 200° C., to prevent agglomeration of components within a discharged cathode conversion material.

The coatings may be formed on conversion materials as fabricated, such as in-situ as the active material is being formed, or coatings may be applied to previously fabricated conversion material particles, in which case conversion material particles having above-described properties are initially formed.

Coatings may be deposited or fabricated using processes such as spray coating, sol-gel, colloidal dispersion, precipitation reaction, physical or chemical adsorption, mechanical alloying or milling, physical deposition, physical vapor deposition (PVD), chemical vapor deposition (CVD), atomic layer deposition (ALD), and the like. Processes such as PVD, CVD, and ALD may be performed with or without the assistance of a plasma. When coating particles, a fluidized bed process may be employed, particularly with processes such CVD and ALD.

Spray Coating

To perform spray coating, a solution of coating salts is prepared in an appropriate solvent (water, methanol, ethanol, or isopropyl alcohol). In some embodiments, the solution includes lithiated iron fluoride, which may have a lithium to iron atomic ratio of between about 1:1 and about 3:1. Aluminum oxide ($Al_2O_3$) may be formed from aluminum nitrate ($Al(NO_3)_3 \cdot 9\ H_2O$) directly. A phosphate film ($AlPO_4$) may be formed by mixing aluminum nitrate and phosphoric acid ($H_3PO_4$). A fluoride film ($AlF_3$) may be formed from aluminum nitrate and ammonium fluoride ($NH_4F$) or ammonium hydrogen difluoride ($NH_4HF_2$). Lithiated forms of the films may be formed by including the appropriate amount of lithium nitrate ($LiNO_3$). The solution is then spray-deposited using an atomizer spray nozzle or nebulizer onto a heated substrate above the boiling point of the solvent.

To perform spray coating, a solution of coating precursors is prepared in an appropriate solvent (water, methanol, ethanol, or isopropyl alcohol). Aluminum oxide ($Al_2O_3$) may be formed from aluminum nitrate ($Al(NO_3)_3.9H_2O$) directly. The phosphate film ($AlPO_4$) maybe formed by mixing aluminum nitrate and phosphoric acid ($H_3PO_4$). A fluoride film ($AlF_3$) maybe formed from aluminum nitrate and ammonium fluoride ($NH_4F$) or ammonium hydrogen difluoride ($NH_4HF_2$). The lithiated forms of the films maybe formed by including the appropriate amount of lithium nitrate ($LiNO_3$) or other suitable lithium compound. The solution is then mixed with the active material and spray-dried through a heated atomizer and the particles are collected in a cyclone or an electrostatic device.

Precipitation

To perform a precipitation reaction, solutions are prepared with an aluminum compound dissolved in a suitable solvent such as toluene. The aluminum compound can be a halide such as $AlCl_3$, $AlBr_3$, or $AlI_3$. Optionally, a lithium compound can be included to produce a lithiated coating. In some embodiments, the lithium compound is a lithiated iron fluoride with a lithium to iron atomic ratio of between about 1:1 and about 3:1. Separately, a second coating component is dissolved in a suitable solvent. In one example for fabricating an aluminum phosphate coating, a solution of 85 wt % phosphoric acid in water is mixed in dimethylcarbonate. The active material to be coated is then suspended in a suitable solvent such as toluene. The active material may be prepared using a mixture of lithiated iron fluoride with 6-aminohexanoic acid or benzylamine in a solvent such as toluene. The precursor solutions are then added to the solution, optionally via a metered method such as a syringe pump or addition funnel. Many other precursors may be suitable for fabricating coated cathodes in accordance with the disclosed embodiments. For example, a coating of aluminum oxide can be formed by the liquid-phase reaction of trimethylaluminum (TMA) and water. Similarly, the lithium compound can be an organometallic precursor such as butyllithium.

Precursors for a precipitation reaction can also be formed in situ by reaction or decomposition of a starting material. For example, an aluminum alkoxide such as aluminum methoxide or aluminum isopropoxide can be used as the source for an aluminum oxide synthesis, optionally with heat and/or added water assisting in the decomposition. In another example, aluminum acetylacetonate is reacted with an amine such as benzylamine to form aluminum oxide.

Adsorption

To perform an adsorption reaction, the active material is dispersed in a suitable solvent such as toluene or an alcohol, and then contacted with nanoparticles of a suitable coating material under conditions which permit the coating particles to adsorb to the active material surface. The coating particles may be between about 0.5 and about 500 nm, or between about 0.5 and about 50 nm, or between about 0.5 and about 5 nm. In some embodiments, the slurry may be heated prior to contacting the nanoparticles of coating material. In some embodiments, the slurry is contacted with nanoparticles under conditions leading to formation of particles free in solution, which adsorb the cathode particle. In some embodiments, the reaction takes place primarily at the particle surface so as to form only as a coating material. In some embodiments, the coating particles can first be formed in a separate reactor using either dry powder, which resuspends in the solvent containing the active material, or a pre-formed suspension in a suitable solvent and then subsequently added to the active material. Alternatively, the coating particles can be formed in situ by a reaction of suitable precursors. For example, an aluminum alkoxide such as aluminum methoxide or aluminum isopropoxide can be used as the source for an aluminum oxide synthesis, optionally with heat and/or added water assisting in the decomposition. In another example, aluminum acetylacetonate is reacted with an amine such as benzylamine to form aluminum oxide.

Atomic Layer Deposition (ALD)

To perform ALD, the active material to be coated may be suspended in a fluidized bed reactor and heated to a suitable temperature. In some embodiments, the active material may be a lithiated iron fluoride with a lithium to iron atomic ratio of between about 1:1 and about 3:1. One example forms an aluminum oxide coating via the reaction of TMA with water at about 150° C. to about 200° C., for example 180° C. In this process, TMA is fed into the reactor to coat the particle surfaces, optionally using a residual gas analyzer (RGA) at the outlet of the reactor to detect when TMA is able to reach the exit of the reactor, which indicates complete surface reactivity. The reactant is then changed to $H_2O$ and the process gas is flowed until water saturates the particle surfaces, again optionally detected by an RGA. The two reactants are then alternated until the desired thickness or weight coating is obtained.

Other Fabrication Techniques

To create a coating via PVD, a substrate to be coated is placed in a sputter chamber. A target of aluminum is then sputtered in an oxidizing environment, such as an oxygen plasma. Aluminum oxide ($Al_2O_3$) will then be deposited on the substrate.

When the conversion material is formed first prior to application of the coating, various processes may be suitable for fabricating such material. Some fabrication techniques employ exclusively material synthesis. Other processes employ exclusively coating of the conversion material on a substrate. Examples of material synthesis processes include sol gel synthesis, one pot synthesis, bottom-up synthesis, and melt spinning Examples of substrate coating process include slot-die, spin coating, dip coating, doctor blade, metering rod, slot casting, screen printing, inkjet printing, aerosol jet, knife-over roll, comma coating, reverse comma coating, tape casting, slip casting, gravure coating, and microgravure coating. Various processes employ a hybrid of synthesis/coating. Suitable processes for particle formation/downsizing include dry milling, wet milling, high energy milling, or bottom-up chemical synthesis.

In certain embodiments, a coated conversion material for a cathode is prepared using a process in which one or more precursors or reactants are contacted in solid phase, also referred to as "solid phase synthesis." Examples include hot pressing, cold pressing, isostatic pressing, sintering, calcining, spark plasma sintering, flame pyrolysis, combustion synthesis, plasma synthesis, atomization, and melt spinning Some solid phase syntheses involve grinding and mixing of bulk precursor materials. The bulk materials are ground to very small dimensions and then combined or otherwise mixed and reacted as necessary to form the desired composition. Milling may be performed via jet milling, cryomilling, planetary milling (Netzsch, Fritsch), high energy milling (Spex), and other milling techniques. In some embodiments, the ground and mixed particles are calcined. An examples of solid phase synthesis processes for producing iron fluoride conversion materials are set forth in U.S. Provisional Patent Application No. 61/814,821, filed Apr. 23, 2013, and titled "NANOSTRUCTURED MATERIALS FOR ELECTROCHEMICAL CONVERSION REACTIONS," and U.S. Provisional Patent Application No. 61/803,802, filed Mar. 21, 2013, and titled "METHOD FOR FORMING IRON FLUORIDE MATERIAL," both of which are incorporated herein by reference in its entirety.

In certain embodiments, the conversion material is produced using a deposition technique such as evaporation, sputtering, Chemical Bath Deposition (CBD), or vapor phase deposition technique such as PVD, ALD, or CVD. In one method described herein, the devices are fabricated by sputtering using an Endura 5500 by Applied Materials of San Jose, Calif.

In certain embodiments, the devices are fabricated by sequential deposition of the anode current collector, anode (optional), electrolyte, cathode, coating, and cathode current collector on a substrate. In certain implementations, there is no separate substrate and the anode, electrolyte, cathode, coating, and cathode current collector are deposited directly on the anode current collector. In one version, there is no separate substrate and the cathode, coating, electrolyte, anode, and anode current collector are deposited directly on the cathode current collector.

The following is a list of examples of suitable conversion material fabrication methods categorized by the process environment:

Vacuum processes, including sputtering, evaporation, reactive evaporation, vapor phase deposition, chemical vapor deposition (CVD), plasma-enhanced CVD (PECVD), metal organic CVD (MOCVD), atomic layer deposition (ALD), plasma-enhanced ALD (PEALD), molecular beam epitaxy (MBE), ion-beam-assisted deposition (IBAD), and pulsed laser deposition (PLD).

Wet synthesis, including chemical bath deposition (CBD), electroplating, spraying and in situ formation, Langmuir, Langmuir-Blodgett, layer-by-layer, electrostatic spray deposition, ultrasonic spray deposition, aerosol spray pyrolysis, sol gel synthesis, one pot synthesis, and other bottom-up methods.

Dry synthesis, including pressing, hot pressing, cold pressing, isostatic pressing, sintering, spark plasma sintering, flame pyrolysis, combustion synthesis, plasma synthesis, atomization, and spin-melting.

Top-down methods, such as jet milling, wet/dry milling, planetary milling, and high energy milling.

Other methods, such as precipitation, colloidal dispersion, physical or chemical adsorption, and mechanical alloying.

Applications

The devices described herein may generally be used in any application requiring energy storage. The devices may be particularly well suited for in applications such as in electric vehicles, hybrid electric vehicles, consumer electronics, medical electronics, and grid storage and regulation.

EXPERIMENTAL

Energy Retention and Energy Density

Figure 7A:
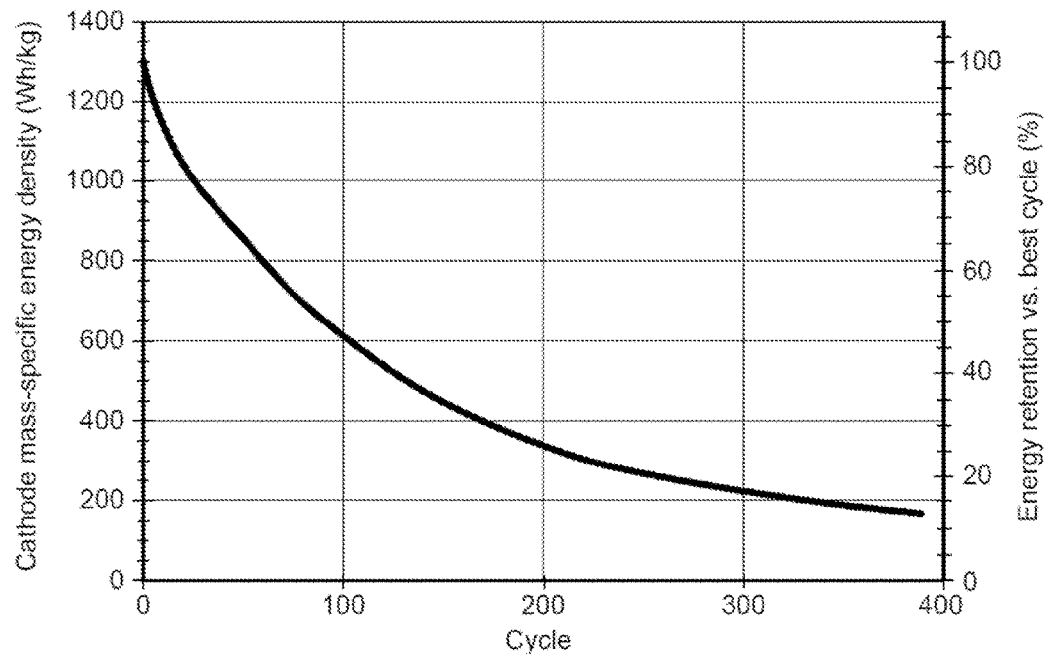
FIGS. 7A and 7B are plots of energy density and energy retention for experimental results in accordance with disclosed embodiments.
Figure 7B:
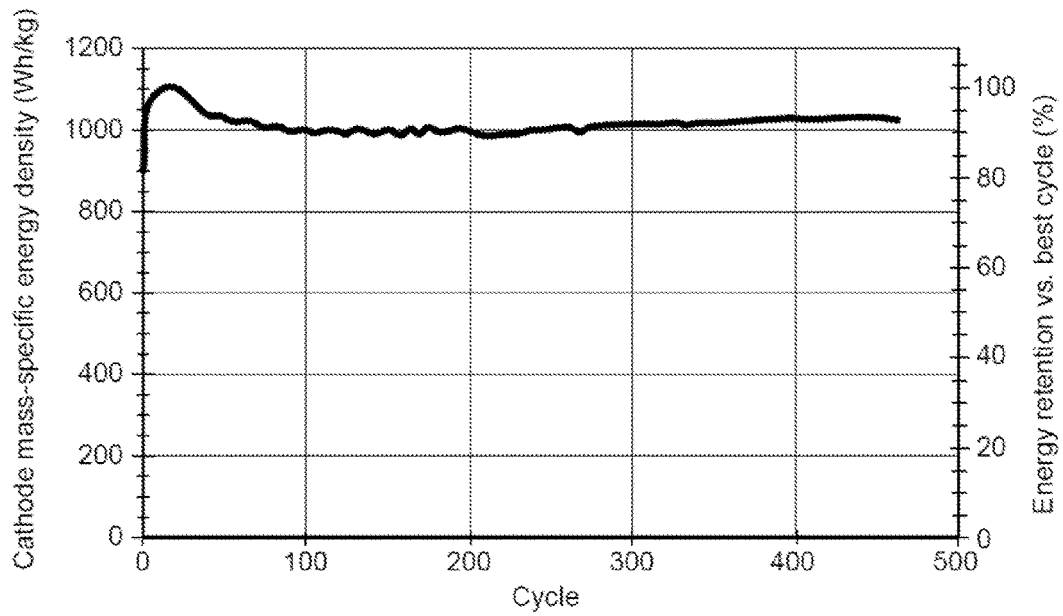

An experiment was conducted to evaluate the energy retention and energy density over cycles for both uncoated and coated conversion materials according to disclosed embodiments. An uncoated cathode including iron and lithium fluoride was fabricated for an energy storage device. To compare, a 2 nm and 4 nm layer of $FeF_3$ was deposited as a coating on cathode particles of another energy storage device including iron and lithium fluoride using atomic layer deposition (ALD). The energy density and energy retention were measured over cycles of charge and discharge. FIG. 7A depicts the nominally poor cycle life of the energy storage device at high temperature without a protective coating layer on the cathode particles. By contrast, FIG. 7B depicts a dramatically improved cycle life of the energy storage device at high temperature with the protective coating layer on cathode particles. Note significant difference in energy retention beyond 400 cycles of charge and discharge. No substantial decrease in energy retention was observed for the coated conversion materials.

Spray Coating

In one example, 5 g of lithiated iron fluoride was weighed out and added to 20 g of isopropanol. The lithiated iron fluoride had a lithium to iron atomic ratio of 1:1. The solution was vigorously mixed to produce a slurry. Then 11 mL of an 0.5 M solution of $Al(NO_3)_3.9H_2O$ in isopropanol was added to the slurry. This mixture was used as-is to prepare an $Al_2O_3$ coating in one example. In another example, there was a further addition of 7.4 mL of a 1.0 M solution of $H_3PO_4$ in isopropanol to prepare a mixture to form an $AlPO_4$ coating. In yet another example, there was a further addition of 5.5 mL of 1.0 M $LiNO_3$ to prepare a mixture to form a lithiated $AlPO_4$ coating with a lithium to aluminum atomic ratio of 1:1. In each case, the mixture was then sprayed through a 0.7 mm atomizing nozzle on an inlet heated to 200° C., collected in a cyclone, dried, and collected.

In another example, a solution was prepared by mixing 113 mg of $H_3PO_4$, 52 mg $LiNO_3$, and 188 mg of Al(NO$_3$)$_3$.9H$_2$O in 10 mL of ethanol. Then 420 L of the solution was mixed with 45.80 ml, of additional ethanol. A 4"×4" substrate containing lithiated iron fluoride having a 3:1 lithium to iron atomic ratio to be coated was held onto a heated stage using a vacuum chuck. The stage was heated to 225° C. Using a Burgener Mira Mist nebulizer (from Burgener Research Inc. of Mississauga, Ontario, Canada), 31.1 grams of the spray solution was deposited by rastering the substrate in the ±X direction while rastering the nebulizer in the ±Y direction.

Precipitation

In one example, 5 g of lithiated iron fluoride was weighed out and added to 50 mL of toluene under an argon atmosphere. The lithiated iron fluoride had a lithium to iron atomic ratio of 3:1. The solution was vigorously mixed to produce a slurry. One syringe was loaded with 2.75 mL of a 2.0 M solution of AlBr$_3$ and a second syringe was loaded with 27.5 mL of a 0.2 M solution of H$_3$PO$_4$ in dimethylcarbonate. These mixtures were used to prepare an aluminum phosphate coating in one example. In another example, a lithiated aluminum phosphate coating was prepared by loading one syringe with 2.75 mL of a solution that included 2.0 M AlBr$_3$ and 1.0 M LiBr and loading the second syringe with 27.5 mL of a 0.2 M solution of H$_3$PO$_4$ in dimethylcarbonate. The lithiated aluminum phosphate coating was prepared to a lithium to aluminum atomic ratio of 1:2. In each case, syringe pumps were used to add both solutions dropwise over the course of 60 minutes, and then the product was centrifuged, washed with toluene, dried, and collected.

In one example, 5 g of lithiated iron fluoride was weighed out and added to 50 mL of toluene under an argon atmosphere. The lithiated iron fluoride had a lithium to iron atomic ratio of 3:1. The solution was heated to 80° C. and stirred vigorously to produce a slurry. One syringe was loaded with a solution of 5.4 g of aluminum acetylacetonate in 40 mL toluene and a second syringe was loaded with a solution of 6 g of benzylamine in 15 mL toluene. Syringe pumps were used to add both solutions dropwise over the course of 60 minutes, and then the solution was centrifuged, rinsed with toluene, dried, and collected.

In one example, 5 g of lithiated iron fluoride was weighed out and added to 25 mL of benzylamine under an argon atmosphere. The lithiated iron fluoride had a lithium to iron atomic ratio of 3:1. The solution was heated to 130° C. and stirred vigorously to produce a slurry. A syringe was loaded with a solution of 5.4 g of aluminum acetylacetonate in 40 mL benzylamine. A syringe pump was used to add the solution dropwise over the course of 60 minutes, and then the solution was centrifuged, rinsed with toluene, dried, and collected.

In one example, 0.8 g of lithiated iron fluoride was weighed out and added to 20 mL of benzylamine under an argon atmosphere. The lithiated iron fluoride had a lithium to iron atomic ratio of 3:1. The solution was heated to 130° C. and stirred vigorously to produce a slurry. A syringe was loaded with a solution of 0.43 g of aluminum acetylacetonate in 5 mL benzylamine. A syringe pump was used to add the solution dropwise over the course of 15 minutes. The solution was held at 130° C. for an additional 120 minutes, then centrifuged, rinsed with toluene, dried, and collected.

In one example, 1.0 g of lithiated iron fluoride was weighed out and added to a solution of 0.032 g of 6-aminohexanoic acid in 25 mL of toluene under an argon atmosphere. The lithiated iron fluoride had a lithium to iron atomic ratio of 3:1. The solution was heated to 80° C. and stirred vigorously to produce a slurry. A syringe was loaded with a solution of 0.22 g benzylamine, 0.53 g aluminum acetylacetonate, and 10 mL of toluene. A syringe pump was used to add the solution dropwise over the course of 60 minutes. The solution was held at 80° C. for an additional 60 minutes, then centrifuged, rinsed with toluene, dried, and collected.

Atomic Layer Deposition

In one example, 50 g of lithiated iron fluoride was weighed out and added to a fluidized bed ALD reactor from ALD Nanosolutions of Broomfield, Colo. under an argon atmosphere. In one example, the lithiated iron fluoride had a lithium to iron atomic ratio of 3:1. In another example, the lithiated iron fluoride had a lithium to iron atomic ratio of 1:1. The gas flow was adjusted to ensure adequate suspension of the particles with minimal loss of fines. The reactor was heated to 200° C. TMA was introduced into the chamber by feeding into the circulating argon flow. A RGA was used to observe the byproducts of the surface reaction, and the TMA feed was stopped when TMA was observed by the RGA. H$_2$O was introduced into the chamber by feeding H$_2$O vapor into the circulating argon flow. Again, a RGA was used to observe the byproducts of the surface reaction, and the H$_2$O feed was stopped when H$_2$O was observed by the RGA. The process was repeated for a number of steps to achieve the desired coating thickness. In one example, the process was repeated for 10 cycles to deposit a coating having a thickness of approximately 1 nm.

Physical Vapor Deposition

In one example, an aluminum source was prepared by bonding a high purity (>99.9%) aluminum target (3 inch diameter disc with a thickness of 0.25 inch or 0.125 inch) onto a backing plate. The target was then mounted into a sputtering chamber using the Endura 5500 by Applied Materials of San Jose, Calif. The substrate, which contained lithiated iron fluoride having a lithium to iron atomic ratio of 3:1, was then introduced into the chamber and a vacuum was pulled on the chamber with a base pressure less than 10$^{-7}$ Torr. An Ar/O$_2$ plasma was then ignited using a magnetron. The plasma then reactively sputtered the aluminum source to deposit Al$_2$O$_3$ onto the substrate. The thicknesses were determined by the length of the plasma pulse. Times were on the order of less than a few minutes for a thickness of 10 nm or less.

CONCLUSION

Although the foregoing embodiments have been described in some detail for purposes of clarity of understanding, it will be apparent that certain changes and modifications may be practiced within the scope of the appended claims. It should be noted that there are many alternative ways of implementing the processes, systems, and apparatus of the present embodiments. Accordingly, the present embodiments are to be considered as illustrative and not restrictive, and the embodiments are not to be limited to the details given herein.

What is claimed is:

1. An energy storage device comprising:
a. an anode,
b. an electrolyte, and
c. a cathode comprising:
a plurality of coated electrochemically active material particles, each electrochemically active material particle comprising:
a core comprising a conversion material, and
a coating surrounding the core comprising the conversion material, wherein the coating selectively isolates the conversion material from the electrolyte, wherein the electrochemically active material particles have a capacity that is greater than 300 mAh/g;

wherein the coating has a median coating coverage surrounding the core comprising the conversion material that is at least 90% of the surface area of the core comprising the conversion material; and wherein the core comprising the conversion material comprises conversion material in the charged state;

wherein the conversion material comprises a fluoride of a metal; and wherein the metal is iron, manganese, nickel, copper, or cobalt; wherein the coating surrounding the core comprises lithium oxides, lithium halides, lithium alloys, or combinations thereof.

2. The energy storage device of claim 1, wherein the device has a capacity when discharged at 1 C that is at least 60% of its capacity when discharged at C/3.

3. The energy storage device of claim 1, wherein the coating surrounding the core comprises two or more layers, each layer having a thickness between about 0.5 nm and about 15 nm.

4. The energy storage device of claim 1, wherein the cathode further comprises
an ion conductor, and
a current collector.

5. The energy storage device of claim 4, wherein the cathode forms a continuous sheet overlapping the electrolyte.

6. The energy storage device of claim 1, wherein the conversion material comprises nanocrystalline domains having a median size of <20 nm.

7. The energy storage device of claim 6, wherein the conversion material is a mixture of two metal fluorides.

8. The energy storage device of claim 4, wherein the conversion material comprises nanocrystalline domains having a median size of <20 nm.

9. The energy storage device of claim 1, wherein the core comprising conversion material comprises $FeF_3$.

10. The energy storage device of claim 1, wherein the coating completely surrounds the core comprising the conversion material.

* * * * *